US006643699B1

(12) United States Patent
Liver

(10) Patent No.: US 6,643,699 B1
(45) Date of Patent: Nov. 4, 2003

(54) COMPUTERIZED METHOD FOR COMPUTING THE OVERALL SPLITTING COST OF A DATA STRUCTURE USING BLOCKING ISLAND CONTOUR MAP OF A NETWORK-LEVEL GRAPH

(75) Inventor: Beat Liver, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/522,965

(22) Filed: Mar. 10, 2000

(30) Foreign Application Priority Data

Mar. 10, 1999 (EP) .............................. 99104725

(51) Int. Cl.[7] ........................................... G06F 15/173
(52) U.S. Cl. ..................... 709/226; 709/223; 709/224; 709/227; 709/238; 709/239; 709/240; 709/241; 709/242; 370/237; 370/238; 370/255; 370/351
(58) Field of Search ................................ 709/201, 223, 709/224, 226, 227, 238–242; 370/237, 238, 255, 351

(56) References Cited

U.S. PATENT DOCUMENTS

| 5,561,790 | A | * | 10/1996 | Fusaro ........................ 703/26 |
| 5,995,503 | A | * | 11/1999 | Crawley et al. ............. 370/351 |
| 6,314,093 | B1 | * | 11/2001 | Mann et al. ................. 370/351 |
| 6,321,271 | B1 | * | 11/2001 | Kodialam et al. ........... 709/241 |
| 6,333,918 | B1 | * | 12/2001 | Hummel ..................... 370/238 |
| 6,370,119 | B1 | * | 4/2002 | Basso et al. ................. 370/252 |
| 6,456,600 | B1 | * | 9/2002 | Rochberger et al. ........ 370/255 |
| 6,498,778 | B1 | * | 12/2002 | Cwilich et al. ............. 370/216 |
| 6,510,139 | B1 | * | 1/2003 | Yoshida ....................... 370/238 |

FOREIGN PATENT DOCUMENTS

WO    WO 98/46040    * 10/1998    ........... H04Q/11/04

OTHER PUBLICATIONS

Frei & Faltings, "intelligent Agents for natwork management", IEE Colloquium on AI for network management Systems, London, UK, Apr. 14, 1997.*
Sato & Nakamura, "An Efficient Route generation Algorithm for Distributed Multi–layered network", 3rd IEEE Symposium on Computers and Communications, Athens, greece, Jun. 30–Jul. 2, 1998.*
Waters & Bishop, "delay Considerations in Multicast routing for ATM Networks", 10th UK teletraffic Symposium, 10th performance Engineering telecommunications network, Martlesham Heath, UK, Apr. 14–16, 1993.*
Torrieri, "Algorithms for Finding an Optimal Set of Short Disjoint paths in a Communication Network", IEEE Transactions on Communications, v 40, issue 11, Nov. 1992.*
Berthe et al., "Abstraction methods for Resource allocation", Technical Report No. TR–94/47, Feb. 1994.*

* cited by examiner

Primary Examiner—Nabil El-Hady
(74) Attorney, Agent, or Firm—Douglas W. Cameron; Anne V. Dougherty

(57) ABSTRACT

A computer method and a computer system with readable medium (including a hardcoded system) encoded with a computerized method of computing a Blocking island Controu Map for a network graph of a network is provided. The method comprises the acts of ordering links; using the ordered links to abstract restrictive costs, thus identifying critical links, and using the links to make decisions concerning the network.

2 Claims, 45 Drawing Sheets

```
computeBICM(InOut G, InOut β())

Ξ ← ⟨G,β()⟩
for all e ∈ ε do aPs(e)←0;aPs(e)←0
for all v ∈ V do
    ν(v)←nil
    If ∃e ∈ ε, aPoint(e) = v ∨ zPoint(e) = v then Iv←Iv ∪ {v}
end for all
for all e ∈ ε  do ν(e)←nil; λ(v)←nil
W←sort(ε,β())
while W ≠ 0  do
    Q←0
    B←pop(W)
    for all e ∈ B do
        X←0
        for all v ∈ {aPoint(e), zPoint(e)} do
            if φ(β(e), v, e) = 0 then X ←X ∪ {vβ(e)(v)}
        end for all
        Q←Q ⊎ merge(Ξ, X, {e}, φ(β(e), aPoint(e), e)∪φ(β(e), zPoint(e), e), true)
    end for all
    while Q ≠ 0 do updateLinks(Ξ, pop(Q), nil)
end while
return Ξ
```

FIG. 8B

```
merge(InOut Ξ,χ,ℒ,ℛ, optional fromscratch = false)
    if |χ| = 1 then
        N←pop(χ);N'←N
    else if |χ| = 0 then
        // usage ensures ℒ≠0, as |χₐ| > 0
        N←⟨"Nβ(first (ℒ))                ",0⟩;β(N)←β(first(ℒ))
                |ℋ 𝒩[β(first(ℒ))]|+1
        N'←N
    else
        // usage ensures |χ| ≤ 2, where both are at the same level
        N←pop(χ); N'←pop(χ)
        for all e ∈ Γ (N') do
            if aPoint(e) = N' then aPoint(e) ←N
            else if zPoint(e) = N' then zPoint(e) ←N
            if N'∈ aPs(e) then aPs(e) ←aPs(e) \ {N'}
            else if N'∈ zPs(e) then zPs(e) ←zPs(e) \ {N'}
                if marker(N') ≠ nil then
                    marker(N) ← marker(N')
                    node(marker(N)) ← N
                end if
        end for all
        ℛ ←ℛ ∪ val(N')
    end if
    val(N) ← val(N) ∪ ℒ ⊎ ℛ
    for all x ∈ ℒ ∧ val(ν(x)) ≠ nil do val(ν(x)) ← val(ν(x)) \ {x}
    if fromscratch = false then
        for all x ∈ ℛ ∧ val(ν(x)) ≠ nil do val(ν(x)) ← val(ν(x)) \ {x}
    end if
    for all x ∈ ℒ ∪ ℛ do ν(x) ← N
    for all M ∈ χ do val(M) ← 0; deleteEmptyNode(Ξ,M)
    return N
```

FIG. 9C updateLinks(InOut $\Xi$,InOut $N_1, N_2$, optional *update* = false $C \leftarrow \text{sort} (\Gamma^{\beta(N1)} (N_1) \uplus \uplus_{v \in} \text{val}_{vertice(N1)} \Gamma^{\beta(N1)} (v), \chi_{N1}())$ while $C \neq 0$ do
   $\mathcal{L} \leftarrow pop(C)$
   while $\chi_{N1}$ (first($\mathcal{L}$)) = $N_1$ do
     if *update* = false then
       for all $l \in \mathcal{L} \wedge$ aPoint($l$) = $N_1 \wedge$ zPoint($l$) = $N_1$ do
         deleteAbstractLink($\Xi,l,\lambda(l)$)
       end for all
     end if
     $\mathcal{L} \leftarrow pop(C)$
   end while
   if $|\mathcal{L}| > 1$ then
     $L \leftarrow$ createAbstractLink($\Xi, N_1, \chi_{N1}(\text{first}(\mathcal{L})), \mathcal{L}$)
   else
     $L \leftarrow$ first($\mathcal{L}$)
   $\Gamma(N_1) \leftarrow \Gamma(N_1) \uplus \mathcal{L}$ if $\chi_{N1}(L) =$ aPoint($L$) $\wedge$ zPoint($L$) $\neq N_1$ then
     if *update* = true $\wedge$ aPoint($L$) == $N_2$ then
       aPoint($L$) $\leftarrow N_1$
     else
       zPs($L$) $\leftarrow$ zPs($L$) $\uplus \{N_1\}$ else if $\chi_{N1}(L) =$ zPoint($L$) $\wedge$ aPoint($L$) $\neq N_1$ then
     if *update* = true $\wedge$ zPoint($L$) == $N_2$ then
       aPoint($L$) $\leftarrow N_1$
     else
       aPs($L$) $\leftarrow$ aPs($L$) $\uplus \{N_1\}$
     end if
   end if
end while

FIG. 10B deleteAbstractLink(InOut$\Xi$,$L$,InOut $L_a$)
  for all $N \in \{aPoint(L), zPoint(L)\} \cup aPs(L) \cup zPs(L)$ do
    $\Gamma(N) \leftarrow \Gamma(N) \setminus \{L\}$
  end for all
  $b \leftarrow \min(\beta(aPoint(L)), \beta(zPoint(L)))$
  $b_a \leftarrow 0$ if $L_a \neq nil$ then
    $b_a \leftarrow \min(\beta(aPoint(L_a)), \beta(zPoint(L_a)))$
    $val(L_a) \leftarrow val(L) \cup val(L_a) \setminus \{L\}$
  end if
  for all $e \in val(L)$ do
    if $\lfloor e \rfloor = b$ then $\lfloor e \rfloor \leftarrow b_a$
    $\lambda(e) \leftarrow L_a$
    $\Gamma(aPoint(e)) \leftarrow \Gamma(aPoint(e)) \setminus \{L\}$
    $\Gamma(zPoint(e)) \leftarrow \Gamma(zPoint(e)) \setminus \{L\}$
  end for all
  delete $L$ if $\lambda(L) \neq nil$ then checkHigherLevelAbstractLink($\Xi, \lambda(L)$)

where checkHigherLevelAbstractLink(InOut $\Xi, L$)
  if $|val(L)| \leq 1$ then
    deleteAbstractLink($\Xi, L, \lambda(L)$)
  end if

FIG. 11B

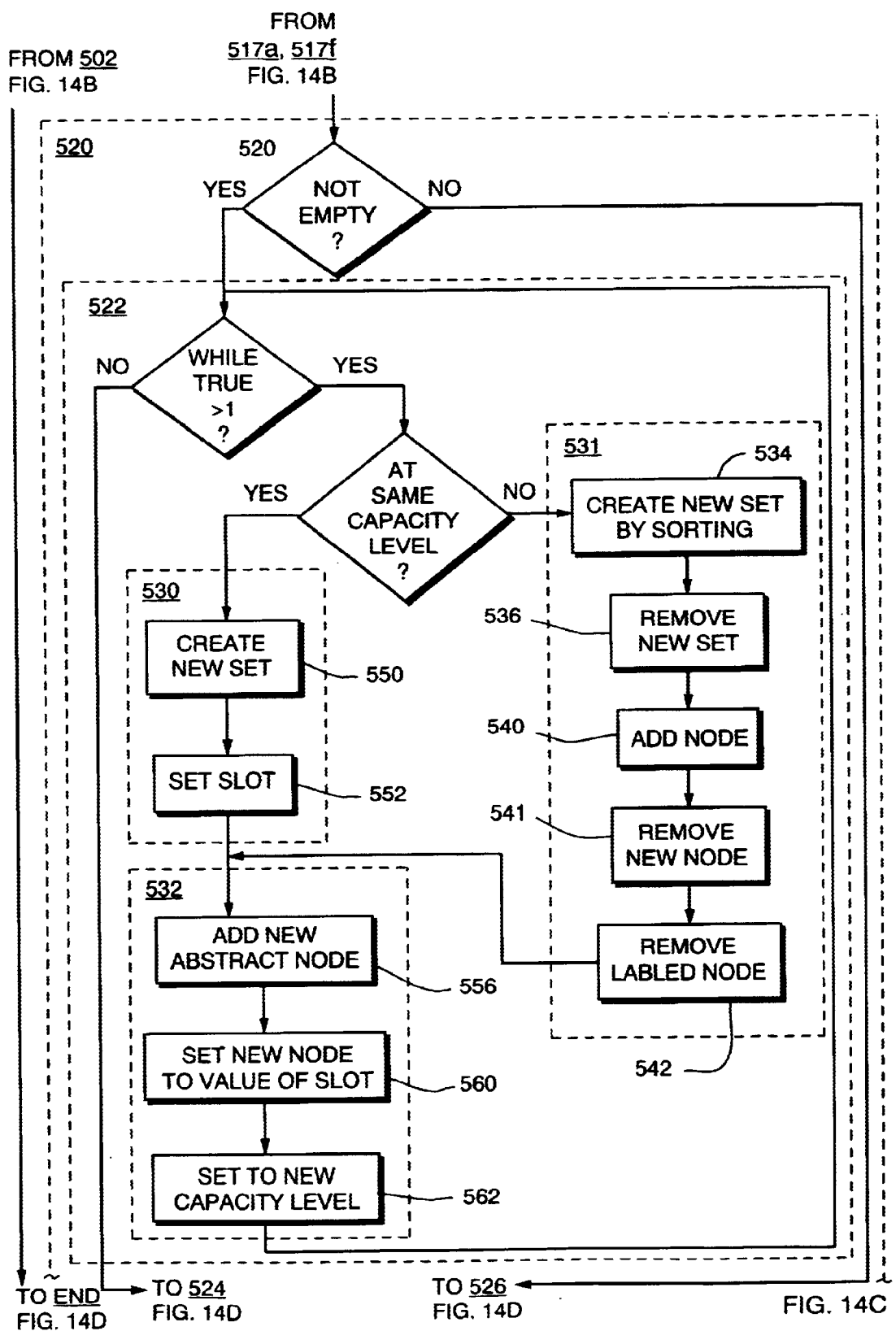

modifyFreeCapacity(InOut $\Xi$, InOut $l$, $b$)

if $(b = -1 \lor b \leq \beta^*(l)) \land \beta(l) \neq b$ then $X_b \leftarrow 0; X_e \leftarrow 0; X_a \leftarrow 0; \mathcal{P} \leftarrow 0; \mathcal{M} \leftarrow 0$ if $\beta(l) > b$ then $sm \leftarrow \langle \text{"Mark"}, v(l) \rangle$; marker$(v(l)) \leftarrow sm$ for $v \in \{aPoint(l), zPoint(l)\}$ do if $v(v) \neq nil$ then entryPoint$(X_a, X_e, X_b, v(v), nil, b)$; moveNode$(\Xi, \mathcal{P}, \mathcal{M}, v, l, b)$ else $\mathcal{P} \leftarrow \mathcal{P} \cup \{v\}$ end for $\beta(l) \leftarrow b$; $N \leftarrow$ merge$(\Xi, X_e, \{l\}, X_b \cup \mathcal{P})$ if $|\text{val}(v(l))| = 2 \land v(l) \notin X_e$ then $n \leftarrow$ first(val$(v(l)) \setminus (V \cup \varepsilon))$ if $v(v(l)) \neq nil$ then val$(v(v(l))) \leftarrow \{n\} \cup$ val$(v(v(l))) \setminus \{v(l)\}$ $v(n) \leftarrow v(v(l))$ if $v(l) \in X_a$ then if $v(v(l)) \neq nil$ then $X_a \leftarrow X_a \cup \{v(v(l))\}$ $X_a \leftarrow X_a \setminus \{v(l)\}$ else if $v(l) \in X_b$ then $X_b \leftarrow \{n\} \cup X_b \setminus \{v(l)\}$ if $sm \neq nil \land$ node$(sm) = v(l)$ then node$(sm) \leftarrow n$; below$(sm) \leftarrow$ true; marker$(n) \leftarrow sm$; marker$(v(l)) \leftarrow nil$ end if if $X_a \neq 0$ then while$|X_a| > 1$ do if $\beta(\text{first}(X_a)) \neq \beta(\text{first}(X_a \setminus \text{first}(X_a)))$ then $X'_a \leftarrow$ sort$(X_a, \beta())$; $v(N) \leftarrow$ pop$(X'_a)$

FROM 14E $\text{val}(\text{first}(X'_a)) \leftarrow \text{val}(\text{first}(X'_a)) \setminus \{N\}$ if $v(v(N)) \neq nil$ then $X'_a \leftarrow X'_a \uplus \{v(v(N))\}; \text{val}(v(v(N))) \leftarrow \text{val}(v(v(N))) \setminus \{v(N)\}$ end if else $X'_a \leftarrow \uplus_{y \in X_a} \{v(Y)\} \setminus \{nil\}$ $v(N) \leftarrow \text{merge}(\Xi, X_a, 0, 0); \text{updateLinks}(\Xi, v(N), nil)$ end if $\text{val}(v(N)) \leftarrow \text{val}(v(N)) \cup \{N\}; N \leftarrow v(N); X_a \leftarrow X'_a$ end while $v(N) \leftarrow \text{first}(X_a); \text{val}(\text{first}(X_a)) \leftarrow \text{val}(\text{first}(X_a)) \cup \{N\}$ end if if $sm \neq nil \wedge \text{node}(sm) \neq nil$ then if $\text{below}(sm) = \text{true}$ then $\text{node}(sm) \leftarrow v(\text{node}(sm))$ if $\text{node}(sm) \neq nil$ then $\text{split}(\Xi, l, b, \text{node}(sm))$ end if if $b = -1$ then for all $n \in \text{val}(v(l)) \setminus (\mathcal{V} \cup \varepsilon)$ do $v(u) \leftarrow nil$ $\text{val}(v(l)) \leftarrow 0; \text{deleteEmptyNode}(v(l))$ end if

FIG. 14F

```
entryPoint(InOut X_a, InOut X_e, InOut X_b, X, X_b, b)
  if β(X) = b then
    X_e ← X_e ⊎ {X}
    if v(X) ≠ nil then X_a ← X_a ⊎ {v(X)}
  else if β(X) > b then
    if v(X) ≠ nil then
      entryPoint(X_a, X_e, X_b, v(X), X, b)
    else
      X_b ← X_b ⊎ {X}
    end if
  else
    X_a ← X_a ⊎ {X}
    if X_b ≠ nil then X_b ← X_b ⊎ {X_b}
  end if
```

FIG. 15C

```
moveNode(InOut Ξ, InOut P, InOut M, v, l, b)
  S ← sort(Γ_network(v), β()) // S is a set of sets
  if l ∈ first(S) then
    //l determines v's current position
    if ∃e first(S), β(e) > b ∨ ∃e ∈ first(S \ first(S)), β(e) > b then
      // the second edge's capacity is exceeding b if ν(e) ≠ ν(v) then
        val(ν(e)) ← val(ν(e)) ∪ {v}
        val(ν(v)) ← val(ν(v)) \ {v}; M ← M ∪ {v}
        ν(v) ← ν(e)
      end if
    else
      //l determines new position of v, but l not yet moved
      P ← P ∪ {v}
      val(ν(v)) ← val(ν(v)) \ {v}; M ← M ∪ {v}
    end if
  else
    if β(first(first(S))) < b then
      //l determines new position of v, but l not yet moved
      val(ν(v)) ← val(ν(v)) \ {v}
      P ← P ∪ {v}
    end if
  end if
```

FIG. 16B map($\Xi,N,\mathcal{M},c(.,.)$, InOut;$\mathcal{V}_N$, InOut; $\varepsilon_N$, InOut; $h$, optional $b = \infty$ )

$\mathcal{V}_N \leftarrow \{N\}$
  while $c(\mathcal{V}_N,b)$ do
    for all $v \in \{n|n \in \mathcal{V}_N \setminus \mathcal{V} \land \beta(n) < b\}$ do $\mathcal{V}_N \leftarrow \mathcal{V}_N \cup \mathrm{val}_{vertices}(v)$
  end while
  $\mathcal{V}_N \leftarrow \mathcal{V}_N \cup \mathcal{M}$
  $h \leftarrow \min_{n \in \mathcal{V}_N} \beta(n)$
  $\varepsilon_N \leftarrow \{e|e \in \uplus_{v \in \mathcal{V}_N} \Gamma^h(v) \land \mathrm{aPoint}^h(e) \in \mathcal{V}_N \land \mathrm{zPoint}^h(e) \in \mathcal{V}_N\}$

FIG. 19B

DFS($v,\mathcal{V}_N,\varepsilon_N$, InOut $\mathcal{V}_C$, InOut $\varepsilon_C$, $h$, $b$)

if $v \notin \mathcal{V}_C$ then $\mathcal{V}_C \leftarrow \mathcal{V}_C \cup \{v\}$
  for all $e \in \Gamma^h(v) \land e \in \varepsilon_N \land \beta(e) \geq b$ do
    if $e \notin \varepsilon_C$ then
      $\varepsilon_C \leftarrow \varepsilon_C \cup \{e\}$
      DFS(first($\{\mathrm{aPoint}^h(e), \mathrm{zPoint}^h(e)\} \setminus \{v\}$),$\mathcal{V}_N,\varepsilon_N,\mathcal{V}_C,\varepsilon_C,h,b$)
    end if
  end for all

FIG. 20

```
split(InOut Ξ, InOut l, b, N, InOut M)
  if l ∈ val(N) then return false
  if |val(N)| = 0 then
    deleteEmptyNode(Ξ, N)

if v(N) ≠ nil then updateLinks(Ξ, v(N), nil, true)
  end if
  $\mathcal{V}_N \leftarrow 0; \varepsilon_N \leftarrow 0; c(x,y) \triangleq |x| \leq 1; h \leftarrow 0$
  map(Ξ, N, M, c(x,y), $\mathcal{V}_N, \varepsilon_N, h$)
  $\mathcal{V}_{C_1} \leftarrow 0; \varepsilon_{C_2} \leftarrow 0$
  DFS(first($\mathcal{V}_N$), $\mathcal{V}_N, \varepsilon_N, \mathcal{V}_{C_1}, \varepsilon_{C_1}$, aPoint$^h$(), zPoint$^h$(), $\Gamma^h$(), h, β(N))
  if $\mathcal{V}_N = \mathcal{V}_{C_1}$ then return false
  $\mathcal{V}_{C_2} \leftarrow \mathcal{V}_N \setminus \mathcal{V}_{C_1}$
  $\mathcal{L} \leftarrow \{l | l \in \varepsilon_N \land$ aPoint$^h$(l) $\in \mathcal{V}_{C_1} \land$ zPoint$^h$(l) $\in \mathcal{V}_{C_2}\}$
  $\mathcal{L} \leftarrow \mathcal{L} \cup \{l | l \in \varepsilon_N \land$ aPoint$^h$(l) $\in \mathcal{V}_{C_2} \land$ zPoint$^h$(l) $\in \mathcal{V}_{C_1}\}$
  $\varepsilon_{C_2} \leftarrow \varepsilon_N \setminus (\varepsilon_{C_1} \cup \mathcal{L})$
  $b \leftarrow β(N)$
  $\mathcal{W} \leftarrow \{e | e \in$ val(N) $\land e \in \varepsilon\}$
  $\varepsilon_{C_1} \leftarrow \{e | e \in \mathcal{W} \land$ aPoint(e) $\in \mathcal{V}_{C_1} \lor$ zPoint(e) $\in \mathcal{V}_{C_1}\}$
  $\varepsilon_{C_1} \leftarrow \varepsilon_{C_1} \uplus \{e | e \in \mathcal{W} \land v_b$(aPoint(e)) $\in \mathcal{V}_{C_1} \lor v_b$(zPoint(e)) $\in \mathcal{V}_{C_1}\}$
  $\varepsilon_{C_2} \leftarrow \{e | e \in \mathcal{W} \land$ aPoint(e) $\in \mathcal{V}_{C_2} \lor$ zPoint(e) $\in \mathcal{V}_{C_2}\}$
  $\varepsilon_{C_2} \leftarrow \varepsilon_{C_2} \uplus \{e | e \in \mathcal{W} \land v_b$(aPoint(e)) $\in \mathcal{V}_{C_2} \lor v_b$(zPoint(e)) $\in \mathcal{V}_{C_2}\}$
  If $|\mathcal{V}_{C_1}| = 1$ then $N_1 \leftarrow$ first($\mathcal{V}_{C_1}$) else $N_1 \leftarrow$ merge(Ξ, 0, $\varepsilon_{C_1}, \mathcal{V}_{C_1}$, true)
  if $|\mathcal{V}_{C_2}| = 1$ then $N_2 \leftarrow$ first($\mathcal{V}_{C_2}$) else $N_2 \leftarrow$ merge(Ξ, 0, $\varepsilon_{C_2}, \mathcal{V}_{C_2}$, true)
  if $|\mathcal{L}| > 1$ then createAbstractLink(Ξ, $N_1, N_2, \mathcal{L}$)
  v($N_1$) $\leftarrow$ v(N); v($N_2$) $\leftarrow$ v(N)
  val(v(N)) $\leftarrow$ val(v(N)) $\cup \{N_1, N_2\}$
  updateLinks(Ξ, $N_1$, N, true); updateLinks(Ξ, $N_2$, N, true)
  val(N) $\leftarrow$ 0; deleteEmptyNode(Ξ, N)

if v(N) ≠ nil ∧ β(v(N)) > b then split(Ξ, l, b, v(N), 0)
  return true
```

FIG. 21C

```
existence-p(InOut Ξ,a,z,b)
    n_a ← ν(a); n_z ← ν(z)
    while n_a ≠ n_z ∧ n_a ≠ nil ∧ n_z ≠ nil do
        while β(n_a) = β(n_z) ∧ na ≠ n_z ∧ n_a ≠ nil ∧ n_z ≠ nil do
            na ← ν(n_a); n_z ← ν(n_z)
        end while
        while β(n_a) > β(n_z) ∧ n_a ≠ nil ∧ n_z ≠ nil do n_z ← ν(n_z)
        while β(n_a) < β(n_z) ∧ n_a ≠ nil ∧ n_z ≠ nil do n_a ← ν(n_a)
    end while
    if na = n_z ∧ n_a ≠ nil ∧ β(n_a) ≥ b then return n_a
    else return nil
```

FIG. 22

```
route(InOut Ξ, a, z, b, optional k = ∞, lr = 0)
    N ← existence-p(Ξ, a, z, b)
    if N = nil then return 0
    𝒫 ← HDFSpath(Ξ, N, 0, a, z, b, k, lr)
    for all e ∈ 𝒫 \ 𝒱 do modifyFreeCapacity(Ξ, e, b)
    return 𝒫
```

FIG. 23

```
HDFSpath(InOut Ξ, N, L, a, z, b, optional k = ∞, lr = 0, con = false
  if a = z then return 0
  $\mathcal{V}_N \leftarrow 0; \varepsilon_N \leftarrow 0; c(x,y) \stackrel{\text{def}}{=} [x \setminus \mathcal{V} \neq 0 \land |x| < k]; h \leftarrow \infty$
  if N ∉ 𝒱 then
    map(Ξ, N, 0, (c(x,y), $\mathcal{V}_N, \varepsilon_N, h$)
  else
    $\mathcal{V}_N \leftarrow \mathcal{V}_N \cup \{N\}$
    if L ∈ ε then
      if con = true then return {L, {aPoint(L), zPointL] \ {N}}
      else return {N, L< {aPoint(L), zPointL} \ {N}}
    else if N = a then return 0
  end if
  if L = nil then
    $\mathcal{P}_h \leftarrow$ shortestPath(Ξ, $\mathcal{V}_N, \varepsilon_N, v_h(a), \{v_h(z)\}, b, h, lr$)
  else
    if L ∈ ε then
      Z ← {v|v ∈ {aPoint(l), zPoint(l)} ∧ v ∉ $\mathcal{V}_N$}
      $\mathcal{P}_h \leftarrow$ shortestPath(Ξ, $\mathcal{V}_N, \varepsilon_N, a, Z, b, h, lr$) ∪ {L} ∪ Z
    else
      $\varepsilon_L \leftarrow 0; \varepsilon_L \leftarrow$ mapLink(Ξ, L, h)
      $\mathcal{V}_L \leftarrow \uplus_{l \in \varepsilon_L} \{aPoint^h(l), zPoint^h(l)\}$
      $\mathcal{P}_h \leftarrow$ shortestPath(Ξ, $\mathcal{V}_N \uplus \mathcal{V}_L, \varepsilon_N \cup \varepsilon_L, v_h(a), \mathcal{V}_L \setminus \mathcal{V}_N, b, h, lr$)
  end if
  if ($\mathcal{P}_h \setminus \mathcal{V}$) \ ε = 0 then return $\mathcal{P}_h$
  $n_a \leftarrow a$; cont false
  while |$\mathcal{P}_h$| > 1 do
    𝒫 ← 𝒫 ∪ {HDFSpath(Ξ, pop($\mathcal{P}_h$), pop($\mathcal{P}_h$), $n_a$, nil, b, k, lr, cont)}
    $n_a \leftarrow$ last(𝒫)
    cont ← true
  end whil
  𝒫 ← 𝒫 ∪ {HDFSpath(Ξ, pop($\mathcal{P}_h$), nil, $n_a$, z, b, k, lr, cont)}
  if con = true then pop(𝒫)
  return 𝒫
```

FIG. 24C

```
mapLink(InOut Ξ, L, h)
  𝓛 ← {L}; 𝓡 ← 0
  while 𝓛 ≠ 0 do
    𝓛' ← 𝓛
    for all l ∈ 𝓛' do
      if l ∈ ε then 𝓡 ← 𝓡 ∪ {l}
      else if min(β(aPoint(l)), β(zPoint(l))) < h then 𝓛 ← 𝓛 ∪ val(L)
      𝓛 ← 𝓛 \ {l}
    end for all
  end while
  return 𝓡
```

ALGORITHM TO MAP AN ABSTRACT LINK.

FIG. 25

```
split-p(Ξ, l, b, N)
  SC[l,N] ← 0
  if N = nil ∨ β(N) ≤ b then return 0
  $\mathcal{V}_N$ ← 0; $\varepsilon_N$ ← 0; c(x,y) ≝ (x | $\mathcal{V}$) ≠ 0, h ← 0
  map(Ξ, N, 0, c(x,y), $\mathcal{V}_N$, $\varepsilon_N$, h)
  $\mathcal{V}_C$ ← 0; $\varepsilon_C$ ← 0
  DFS(first($\mathcal{V}_N$), $\mathcal{V}_N$, $\varepsilon_N$ \ {l}, $\mathcal{V}_C$, $\varepsilon_C$, aPoint$^h$(), zPoint$^h$(), $\Gamma^h$(), h, β(N))
  if $\mathcal{V}_N$ = $\mathcal{V}_C$ then return 0
  SC[l, N] ← {{$\mathcal{V}_C$, $\varepsilon_C$},{$\mathcal{V}_N$\$\mathcal{V}_C$, $\varepsilon_N$\$\varepsilon_C$}}
  return ζ(N) + split-p(Ξ, l, b, v, N))δ
```

FIG. 26B shortestPath(InOut $\Xi, \mathcal{V}_N, \varepsilon_N, a, \mathcal{Z}, b, h$, optional $lr = 0$ for all $v \in \mathcal{V}_N$ do $\mu(v) = \infty$; $(v) = 0$ $\mu(a) = 0$ while $\mathcal{V}_N \neq 0$ do

$n_t \leftarrow \text{pop}(\text{sort}_{min}(\mathcal{V}_N, \mu()))$ $\mathcal{V}_N \leftarrow \mathcal{V}_N \setminus \{n_t\}$ for all $e \in [\uplus_{e \in \Gamma(n_t)} \cap \mathcal{V}_N] \wedge \beta(e) \geq b$ do

$n_x \leftarrow \text{first}(\{\text{aPoint}^h(e), \text{zPoint}^h(e)\} \setminus \{n_t\}$ $\Delta \leftarrow \text{split-p}(\Xi, e, b, v(e))lr$ if $\mu(n_t) + \xi(n_t, e) + \sqrt{\omega(e)^2 + \Delta^2} < \mu(n_x)$ then $\mathcal{T}(n_x) \leftarrow \{n_t, e\}$ $\mu(n_x) \leftarrow \min(\mu(n_x), \mu(n_t) + \xi(n_t, e) + \sqrt{\omega(e)^2 + \Delta^2})$ end for all end while

$n_x \leftarrow \text{first}(\{v | \mu(v) = \min_{z \in \mathcal{Z}} \mu(z)\})$; $\mathcal{P} \leftarrow \{n_x\}$ while $\mathcal{T}(n_x) \neq 0$ do $\mathcal{P} \leftarrow \mathcal{T}(n_x) \cup \mathcal{P}$; $n_x \leftarrow \text{first}(\mathcal{T}(n_x))$ return $\mathcal{P}$

FIG. 28 createAbstractLink(InOut $\Xi$, InOut $a$, $z$, $\mathcal{L}$)

$L \leftarrow \left\langle \text{``}L_{\mathcal{H}\mathcal{L}[\beta(N1)]|+1}^{\beta(N1)}\text{''}, \mathcal{L} \right\rangle$ $\beta(L) \leftarrow \max_{e \in \text{val}(L)} \beta(e)$ aPoint($L$) $\leftarrow a$; zPoint($L$) $\leftarrow z$ addTo$\Gamma(a, L)$; addTo$\Gamma(z, L)$ $\lambda(L) \leftarrow nil$ aPs($L$) $\leftarrow 0$; zPs($L$) $\leftarrow 0$ for all $e \in \text{val}(L)$ do
   $\lambda(e) \leftarrow L$
   if $a = $ aPoint($e$) $\wedge$ $z = $ zPoint($e$) $\vee$ $a = $ zPoint($e$) $\wedge$ $z = $ aPoint($e$) then
     deleteAbstractLink($\Xi, e, \lambda(e)$)
   end if
end for all
return $L$

FIG. 30B

COMPUTERIZED METHOD FOR COMPUTING THE OVERALL SPLITTING COST OF A DATA STRUCTURE USING BLOCKING ISLAND CONTOUR MAP OF A NETWORK-LEVEL GRAPH

BACKGROUND OF THE INVENTION

This invention relates to a method which facilitates reasoning about route selection in circuit- and packet-switched communication networks, and more particularly to networks represented by a blocking island ("BI") abstraction.

Blocking Island abstractions facilitate reasoning concerning the different routes that a transmittable data stream might take. The BI is a part of a communication network in which routing demands on limited resources (which are sometimes referred to herein as bandwidths or bandwidth levels, the use of such specific terms hereinafter being intended as interchangeable with the more general term "restrictive costs") not larger than Beta ("$\beta$") is possible. Using the BI abstraction, it is possible to construct a hierarchy of simplified network graphs, called a Blocking Island Hierarchy ("BIH"). Each of these graphs, called Blocking Island Graphs ("BIGs"), is defined by the set of BIs for a particular $\beta$. In other words, a BI defines an equivalence class of potential paths with a bandwidth of up to $\beta$. B, an input parameter for a method of constructing a BIH, denotes the finite set of possible values for $\beta$. B is an ordered set. Consequently, the resulting BIH is a discrete abstraction of a communication network.

The usefulness of BIs (and the concepts built upon them) results from their fundamental properties, such as unicity, partitioning, bottleneck identification, route existence, route location and inclusion. However, the applicability of discrete BIHs is limited because of their limited precision due to the BIHs' discretization. For instance, networks like ATM and IP that provide circuits in an almost continuous range (due to a small cell or packet size) would require either discretization or a large set of B. The latter is impractical, as most $\beta$-BIGs would consume memory without providing insight—defeating the very purpose of constructing such an abstraction. Further ore, the routing method presented by Christian Frei and Boi Faltings in "A Dynamic Hierarchy of Intelligent Agents for Network Management", Proceedings of the Second International Workshop on intelligent Agents for Telecom Applications (IATA '98), Paris, France, 1998, the content of which is incorporated by reference, is only applicable for demands with bandwidth requirements within the set B.

Resource management (including routing and connection admission control) in general plays an important role in network planning and control, as well as fault and performance management. These tasks take place at different time scales. Humans carry out a large share of long-term tasks, whereas computers execute usually real-time tasks. However, human intervention is also often necessary in the latter case to resolve failures and other difficult problems. These tasks involve often large amounts of data. For instance, a relatively static TDM network with 20 nodes and 40 links has already up to 1000 circuits. Short-lived circuits result in even more data. This large amount of data and their interdependencies guarantee that understanding a particular situation is a difficult and time consuming task (for both humans and computers).

Therefore, what is needed and is an object of the present invention is a means of creating and using an abstract, aggregated network-representation that suppresses irrelevant information and highlights the important information, thus reducing thinking time and search spaces of methods.

In addition, it is an object of the invention to make collaborative problem solving, involving humans and computers, feasible in more situations, which can be used to improve the quality of decisions.

Yet another object of the invention is to provide a means which generalizes the BIH abstraction, which overcomes the above-mentioned problems, and which can be applied to display the network status, to monitor the network, to determine routes, and to cost and price network usage.

Still another object of the invention is to provide a means of selecting routes which minimizes time and increases efficiency through the use of an abstract, aggregated network representation that suppresses irrelevant information and highlights important information, thus reducing thinking time and search spaces of methods.

Another object of the invention is to provide a concise graphical display of the possible routes or paths for different amounts of bandwidth $\beta$, or some other restrictive cost measure, between the vertices of a network.

SUMMARY OF THE INVENTION

A computerized method facilitates reasoning about path selection in communication networks represented by a blocking island ("BI") abstraction. The method takes a network graph as an input and computes a data structure of a Blocking Island Contour Map ("BICM") by performing the following two actions. In a first action, links are ordered according to their free capacity. In a second action, in order to produce a hierarchy of abstract nodes and links, the links are processed as ordered, by performing the following four acts. In a first act, if a currently-processed link (the current link) is connected to a currently-processed abstract node (the current node) at the same free capacity level, the current link is added to the currently-processed abstract node. If the currently-processed link is no connected then a new abstract node that includes the current link is constructed, to which the current abstract node is set. In a second act, the network-graph-level end-points of the current link that are not already contained in an abstract node are included in the current abstract node. In a third act, the abstract nodes that contain an endpoint of the current link (and are at a higher free-capacity level) are included in the current abstract node. In a fourth act, the links which are connected to the current abstract node and which share the other abstract endpoint are aggregated, wherein, if such a set of links already contains abstract links at the free-capacity level of the current abstract node, these abstract links are merged and the yet-to-be aggregated links are included into the merged abstract link; otherwise, a new abstract link at the free-capacity level of the current abstract node and containing the yet-to-be aggregated abstract links is created. Finally, the BICM data structure is returned and can either be displayed by the method described below or utilized for applications like routing.

In another feature of the invention, the BICM may be computed for visual display by traversing the blocking island hierarchy from the leaves to the roots and drawing a closed line around the nodes contained in the current abstract node if (1) the current abstract node contains one or more network graph nodes or (2) the current abstract node contains more than one abstract node. If the drawn closed line encloses nodes that do not belong to the current abstract node, the display submethod draws one or more closed lines (of the same kind as the above one) around these nodes.

In another feature of the method of the invention, an incremental submethod takes a BICM data structure, a network link and a new free capacity value and uses these as inputs to update the BICM data structure by performing four actions. In a first action, the modified link is moved to an abstract node at the new free capacity level wherein the abstract node is an existing abstract node if there exists a link connected to the endpoints of the modified link at the new level, wherein, if there are multiple such abstract nodes, they are merged and the abstract nodes that contain these abstract nodes are merged recursively; wherein, if there is a single abstract node at a higher capacity level than the new capacity value, this abstract node is split into two new abstract nodes, this process continuing with the father of the split abstract node recursively; and wherein, if there is no existing abstract node, a new abstract node is created and included in the abstract node tree at the appropriate position. In a second action, each of the endpoints of the modified link is moved to the abstract node that contains the link connected to it with the largest free-capacity. In a third action, the abstract links that contain only one link are removed from the abstract link hierarchy and sets of links connected to modified abstract nodes that share the other abstract endpoint are aggregated into abstract links. In a fourth action, the abstract nodes that contain neither a network-graph node nor a network-graph link are removed from the abstract node hierarchy.

To facilitate reasoning about route selection in circuit- or packet-switched communication networks represented by a Blocking Island Contour Map. The method identifies the Blocking Island that contains both end-points of the demand and that has at least the demanded bandwidth. If such a Blocking Island exists, a path is computed in a hierarchical depth-first search manner. First, the Blocking Island is mapped to a Blocking Island Graph, with which the shortest path is computed. Second, the first step is applied recursively on each node of the computed path that is a Blocking Island and not a network graph node. For this purpose, the first step also maps aggregate (abstract) links connecting Blocking Islands. The shortest path submethod-is an extension of the Dijkstra algorithm. The extension consists of adding cost terms based on Blocking Island Contour Maps, namely, the cost of splitting (i.e., a weighted sum of the cost of all to-be-split Blocking Islands, if a route would use a particular network link) and for traversing Blocking Islands. The resulting shortest path submethod.

Computes the shortest, least restrictive and load-balanced path, where the relative weight of these three criteria is a parameter of the extended Dijkstra algorithm.

BRIEF DESCRIPTION OF THE DRAWINGS

FIG. 8b is a formal description of the method of FIG. 8a.

FIG. 9b is a formal description of the merge submethod of FIG. 9a.

FIG. 10b is a formal description of the updateLinks submethod of FIG. 10a.

FIG. 11b is a formal description of the submethod of FIG. 11a.

FIG. 15b is a formal description of the entryPoint submethod of the invention of FIG. 15a.

FIG. 16b is a formal description of the moveNode submethod of FIG. 16a.

FIG. 19b is a formal description of the map submethod of FIG. 19a.

FIG. 20 is a formal description of the DFS submethod of the invention.

FIG. 21b is a formal description-of the split submethod of FIG. 21a.

FIG. 22 is a formal description of the existence-p submethod of the invention.

FIG. 23 is a formal description of the route submethod of the invention.

FIG. 24b is a formal description of the HDFSpath submethod of FIG. 24a.

FIG. 25 is a formal description of the mapLink submethod of the invention.

FIG. 26b is a formal description of the split-p submethod of FIG. 26a.

FIG. 28 is a formal description of the shortestPath submethod of the invention.

FIG. 30b is a formal description of the createAbstractLink submethod.

DETAILED DESCRIPTION OF THE PREFERRED EMBODIMENT

Figure 1:
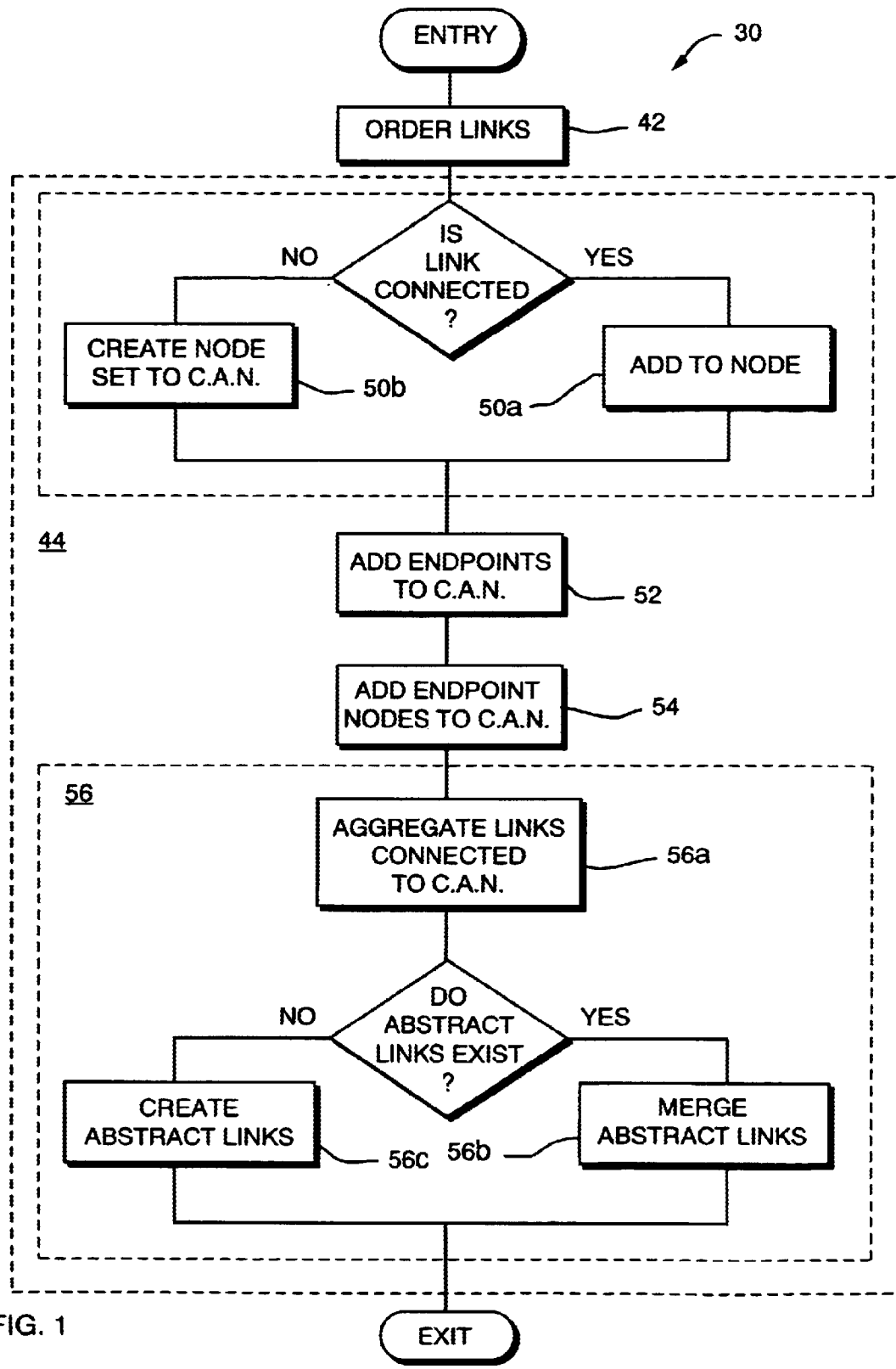
FIG. 1 is a simplified flow diagram of the method of the invention.
Figure 2:
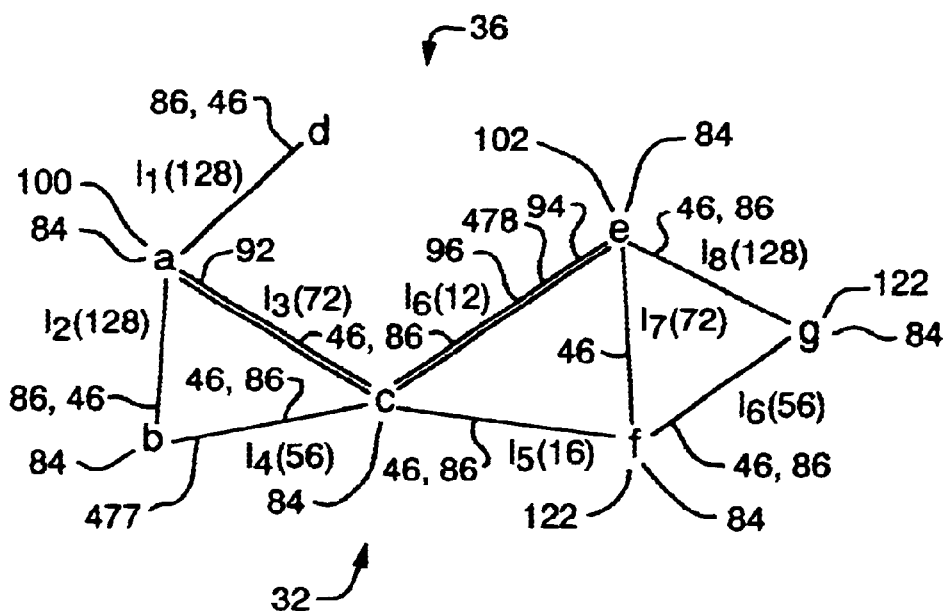
FIG. 2 is schematic diagram of a network graph.
Figure 3:
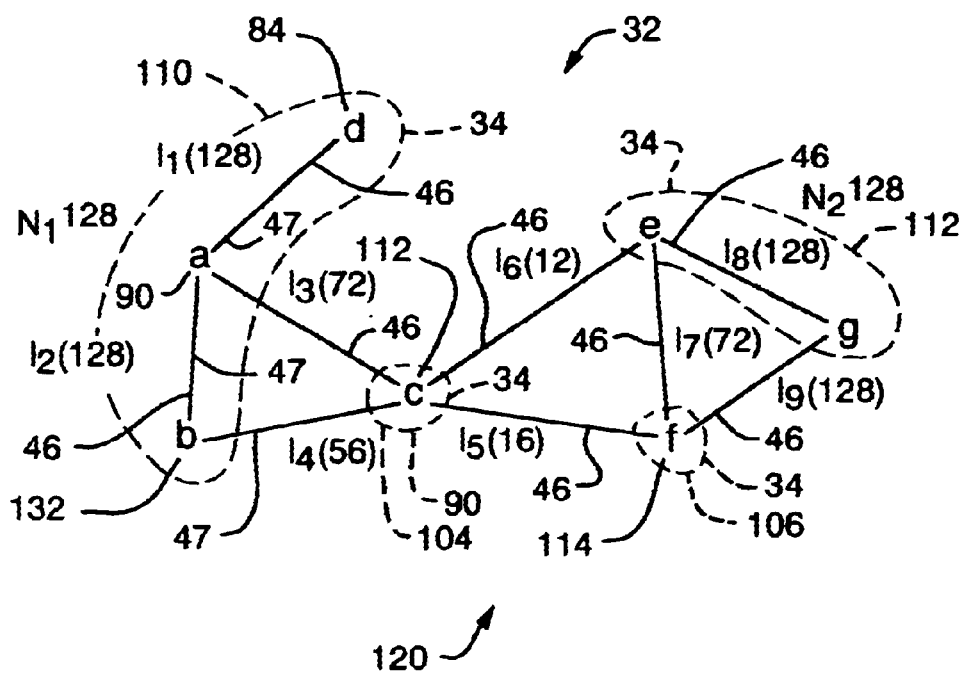
FIG. 3 is a schematic diagram of a 128-BI of the network graph of FIG. 2.
Figure 5:
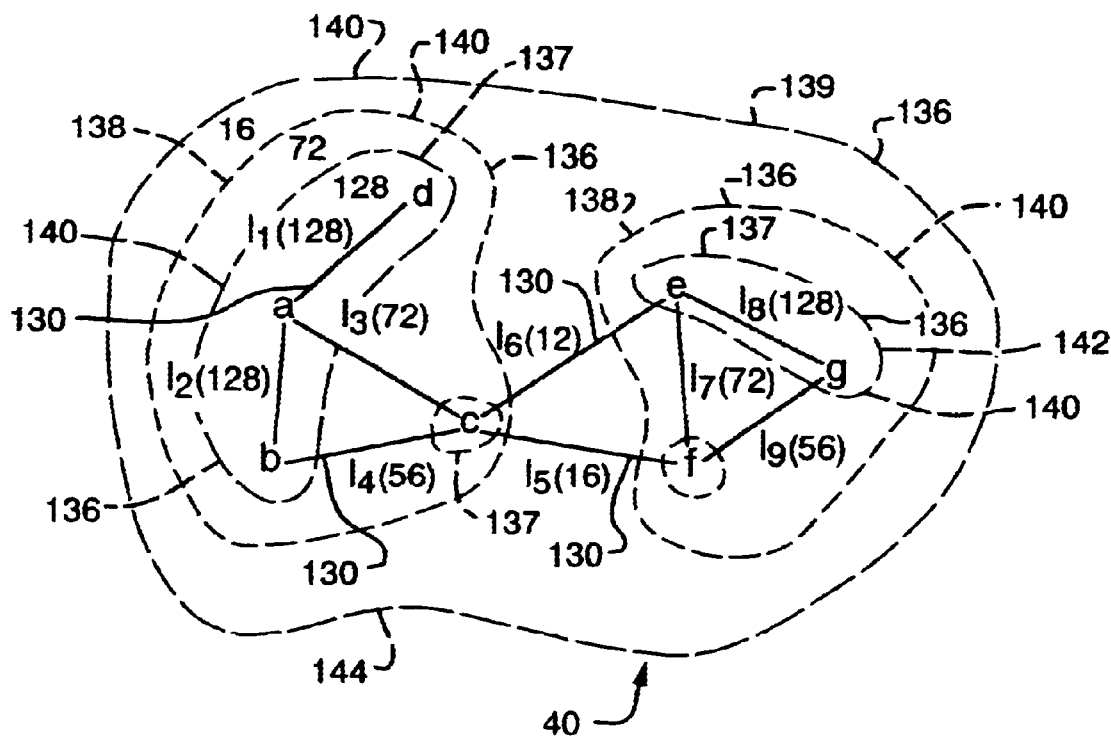
FIG. 5 is a schematic diagram illustrating contour line visualization of the hierarchy of blocking island graphs for the Blocking Island Contour Map for the network of FIG. 2.
Figure 7:
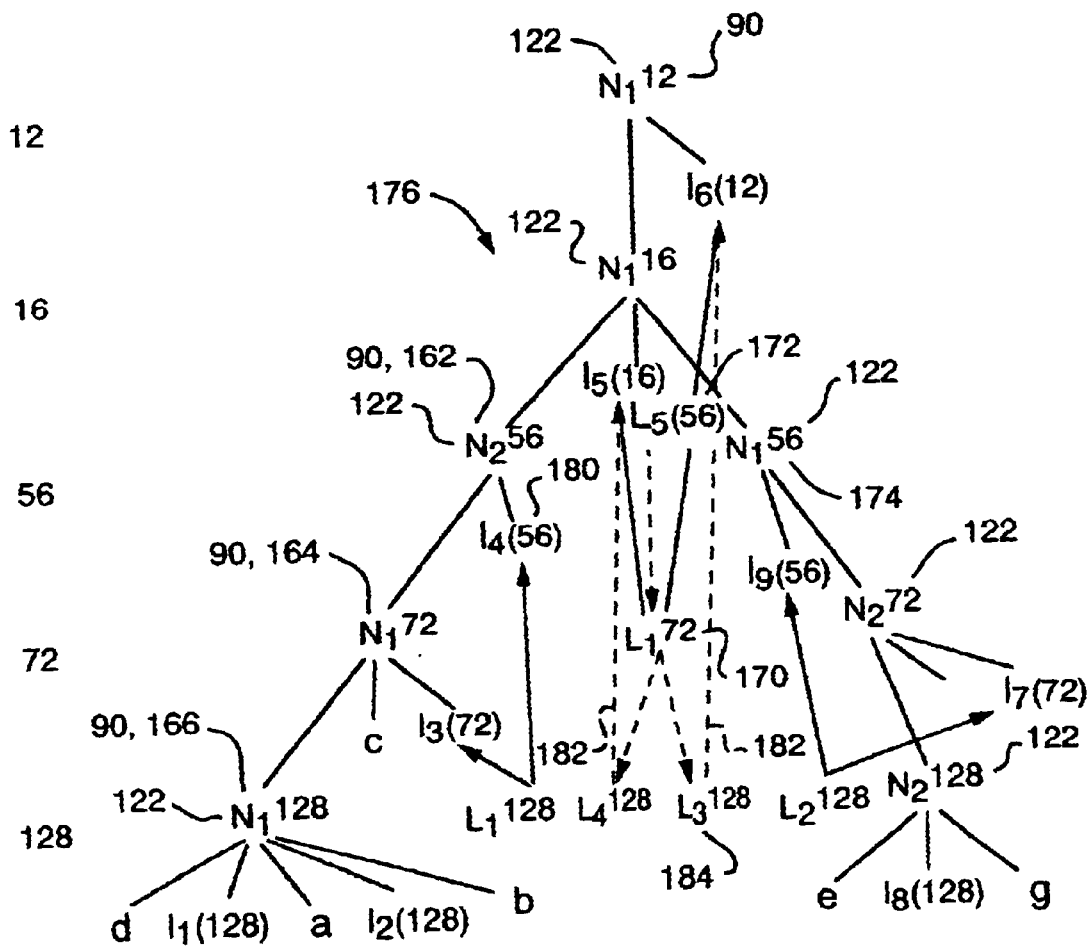
FIG. 7 is a schematic diagram for the data structure of the Blocking Island Contour Map for the network of FIG. 2.

Referring to FIGS. 1 and 2, the invention is a computerized method 30 encoded in a computer-readable medium which medium is intended to include both removable media and resident encoding of functions to be performed by the computer, the method facilitating reasoning about path selection in a communication network 32a, represented by a blocking island ("BI") abstraction 34 (as shown in FIG. 3), thus overcoming the above-mentioned problems. The method 30 takes a network graph 36 as an input and computes a data structure 160 (as shown in FIG. 7) for a Blocking Island Contour Map 40 (a "BICM", as shown in FIG. 5) by performing two actions 42 and 44. In the first action 42, links 46 are ordered according to their free capacity. In the second action 44, in order to produce a hierarchy of abstract nodes and links, the network links 46 are processed as ordered, by performing the, following four acts 50, 52, 54, and 56. The first act 50, is made up of two subacts 50a and 50b. In the first subact 50a, if a link being processed, referred to as the, current link, is connected to a currently-processed abstract node at the same free capacity level, the current link is added to the currently-processed abstract node; otherwise, in the second subact 50b, a new abstract node that includes the current link is constructed, to which the current abstract node is set. In the second act 52, the network-graph-level endpoints 84 of the current link that are not already contained in an abstract node are included in the current abstract node. In the third act 54, the abstract nodes that contain an endpoint of the current link and which are at a higher free-capacity level are included in the current abstract node. The fourth act 56, carried out after a subset of links with the same available bandwidth is processed, is made up of three subacts 56a, 56b, and 56c. In the first subact 56a, links which are connected to the current abstract node and which share the other abstract endpoint are aggregated, wherein, in the second subact 56b, if such a set of links already contains abstract links (note that each abstract link containing two or more network and/or abstract links that have the same endpoints in at least one blocking island graph at a particular level) at the free capacity level of the current abstract node, these abstract links are merged and the yet-to-be-aggregated links are included in the merged abstract link; otherwise, in a third subact 56c, a new abstract link at the free-capacity level of the current abstract node and containing the yet-to-be-aggregated links is created. The BICM data structure is returned and can be displayed using a simple drawing submethod which draws contour lines. In addition, the BICM data structure can be used by a routing submethod which is described in more detail below.

Referring again to FIG. 2, the communication network 32 is modeled as a connected network graph. The network graph 36 ("G") is a function of $<V, \epsilon>$, where V denotes a set of vertices 84 and $\epsilon$ denotes a set of edges. The vertices 84 correspond to processing units, like routers and switches. Edges ("e") correspond to bi-directional point-to-point communication media and services. Each edge e is characterized by a limited resource (or, more generally, a restrictive cost) such as its maximum bandwidth capacity $\beta_e"$ and the available or free bandwidth $\beta$, as well as other quality-of service properties like delay, loss, etc. Although the example is limited to point-to-point communications, it should be noted, however, that the method of the invention is applicable to any type of transport flow, and not merely to networks.

The communication network 32, modeled by the network graph 36, satisfies demands between pairs of vertices 84. A demand describes the requirement on the network 32 for transferring data (e.g., phone calls, video conferencing, file transfer, electronic mail, etc.) over the network between the pair of vertices 84. The demand $d_r$ is a function of $v_f$, $v_l$, and $d_r$, where $v_f$ and $v_l$ are the two vertices 84 of G, and $d_r$ is the required amount of bandwidth (unless mentioned otherwise, a constant which is adequate for constant-bit-rate communication services). A demand might also specify additional quality of service requirements, such as delay.

A typical circuit-switched network, such as that shown in FIG. 2, satisfies a set of demands D by allocating a circuit for each of these demands. Note that for every demand of D, the route algorithm described below is called to find a path or circuit. A circuit is a simple path $p_s$ in the network graph 36 that satisfies the bandwidth and other quality of service requirements. In other words, a circuit $c_q$ is using the bandwidth of a set of consecutive edges (i.e., the endpoint of one edge is the starting point of another), e.g., 92 and 94 that constitute a route 96 between a pair of vertices 100 and 102. The circuit $c_q$ therefore satisfies $d_r$ and $p_s$. Allocating a circuit reduces the free link bandwidths $\beta_e$ of all edges e on its route. Note that a circuit is an object in the network, whereas the path is an object in the routing submethod.

On the other hand, a packet-switched network satisfies a set of demands D by forwarding, at each node, packets of demands according to a routing table. These routing tables are computed dynamically to take into account available bandwidth capacity, among other factors.

A β-Blocking Island 34 ("β-BI") for a vertice 84 ("v") is defined as the set of all nodes of the network graph 36 that are reachable from v using links with at least β available bandwidth. Note that there might be links with less than β available bandwidth within a β-BI, yet there must always be an alternate path with at least the β available bandwidth.

Now referring to FIG. 3, showing four 128-BIs 104, 106, 110, and 112, two of these 128-BIs 104 and 106 contain only a single vertice 114 and 116, respectively. The other two 110 and 112 are $N_1^{128}$ and $N_2^{128}$, respectively, which consist of vertices of {a, b, d} and {e, g}, respectively.

As derived in prior art literature, useful characteristics of such BIs 34 are unicity, partitioning, bottleneck identification, route existence, route location, and inclusion. The characteristic of unicity means that there is one and only one β-BI for a node for all values β. Thus, if S (i.e., in the β-BI for a vertice, a set whose domain includes network nodes, network links, and abstract nodes) is the β-BI for vertice v, S is the β-BI for every node in S. The characteristic of partitioning means that a β-BI induces a partition of a network graph's nodes since they define equivalence classes over the nodes. The characteristic of bottleneck identification means that the links of a β-BI's cocycle do not have enough available resources to support a demand requiring β

(or more) bandwidth. The characteristic of route existence means that there is a route satisfying the bandwidth requirement β of a demand, if and only if its endpoints are in the same β-BI The characteristic of route location means that the endpoints of the links of a route with β available bandwidth are all in the same β-BI. The characteristic of inclusion means that if $β_i<β_j$, the $β_i$-BI is a subset of the $β_j$-BI for the same node. In fact, the $β_j$-BI may now be represented as a tree that contains $β_i$-BI, a subtree. All these properties hold true for network graphs with bi-directional edges only.

Figure 4:
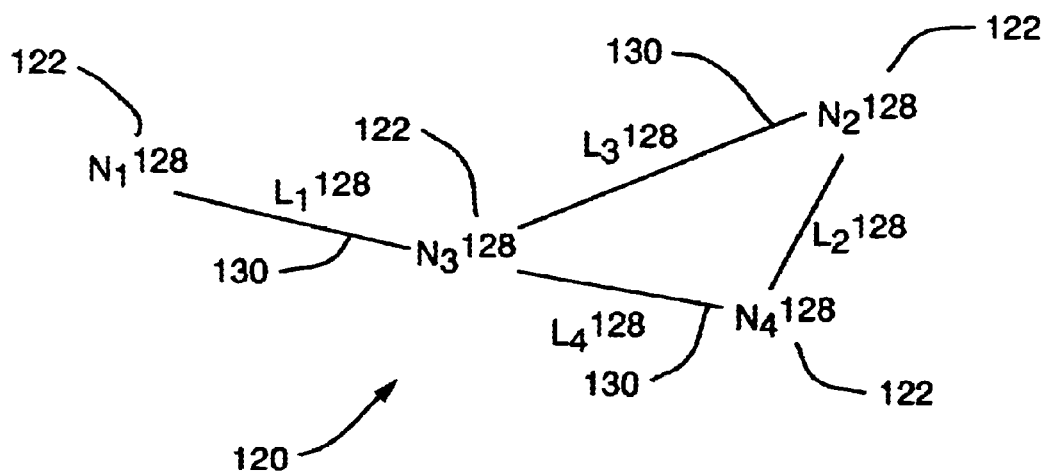
FIG. 4 is a schematic diagram of a 128-BIG of the network graph of FIG. 2.

Referring now to FIGS. 3 and 4, in a β-Blocking Island Graph ("β-BIG") 120, each β-BI 34 is clustered into a single abstract node 122. Edges 86 between two vertices 84 of two different β-BIs 34 are clustered into a single abstract link 130 between the two β-BIs. This includes edges 86 between a vertice 84 and a β-BI 34. Note that a BI 34 also includes the links 46 that have both endpoints in the BI.

To In a 128 β-BIG 120 (as shown in FIG. 4), the abstract links 130 represent critical links, since their available bandwidth is lower than β. The available capacity of an abstract link 130 is, depending on the application, the maximum or the sum (plus additional processing) of the available bandwidth of the links 46 clustered by this abstract link.

If the two endpoints (e.g., 100 and 102) of a demand are not in the same node of the β-BIG 120, there exists no route for this demand. The abstract links 130 are the bottleneck that prevent such a route. Hence, the β-BIG 34 explains allocation failures.

Referring now to FIG. 5, formally, a BICM 40 is a tuple β( ), Iv where Iv is the set of isolated network graph nodes. As stated above, the network graph G is a function of V and ε. β(v) is a specified quantization or discretization function, which defines a mapping for the actual free link capacities β( ) to the real number or integers. Iv denotes the set of vertices that are isolated, i.e., they are not endpoints of edges.

The contour line visualization of the hierarchy of BIs 136 for the BICM 40 of the example network 32 is shown. The BICM 40 is represented as contour lines 140 at the bandwidth levels 16. 72, and 128. These are the bandwidth levels that result in different blocking islands. Closed contour lines are drawn for visual display if (1) the current abstract node contains one network graph node (e.g., nodes e and g in BI 142) or (2) the current abstract node contains more than one network-graph or abstract node (e.g., BI 144).

The BICM 40 is also a concise visual representation of the network load or available bandwidth. Routes exist only between vertices 84 (see FIGS. 2 and 3) within a closed contour line 140 (a blocking island which defines the maximum available bandwidth in the area that it encloses). The distance between contour lines 140 should be inversely proportional to the available bandwidth differences. For the purposes of simplification, the schematic views herein disclosed do not follow this rule.

In a continuous BICM, where a BICM has a quantization function B(x)=x for all x, at least one blocking island 34 exists for each distinct value β, in the network graph 36. An appropriately defined quantization function β(e) reduces the number of bandwidth levels, which results in a discrete BICM. Such a discretization reduces the space complexity of the BICM, but can increase the time complexity for certain computations (e.g., routing computations).

For discrete BICMs, it is necessary that the quantization function split the range of values for β, (where e ∈ ε) into non-overlapping intervals, and that the quantization function maps the values within an interval to its lower bound defining a boundary condition as defined in Equation 1:

$$\forall b \in \text{ran}(β'), \exists l, u \in \text{ran}(β'), l \leq b < u \wedge \forall x \in [l,u), β(x)=l \qquad (1)$$

For instance, in the following example function β(e) satisfies this boundary condition:

$$β(e)=\lfloor β(e)/q \rfloor q$$

whereas q is the quantization step size and ⌊ ⌋ rounds the division result to an integer.

A continuous BICM results from the quantization function:

$$β(v)=β(v), \text{ by definition}$$

which satisfies Equation 1 (e=b and u=e+$d_e$, where $d_e$ is an infinitesimal increment).

Figure 6:
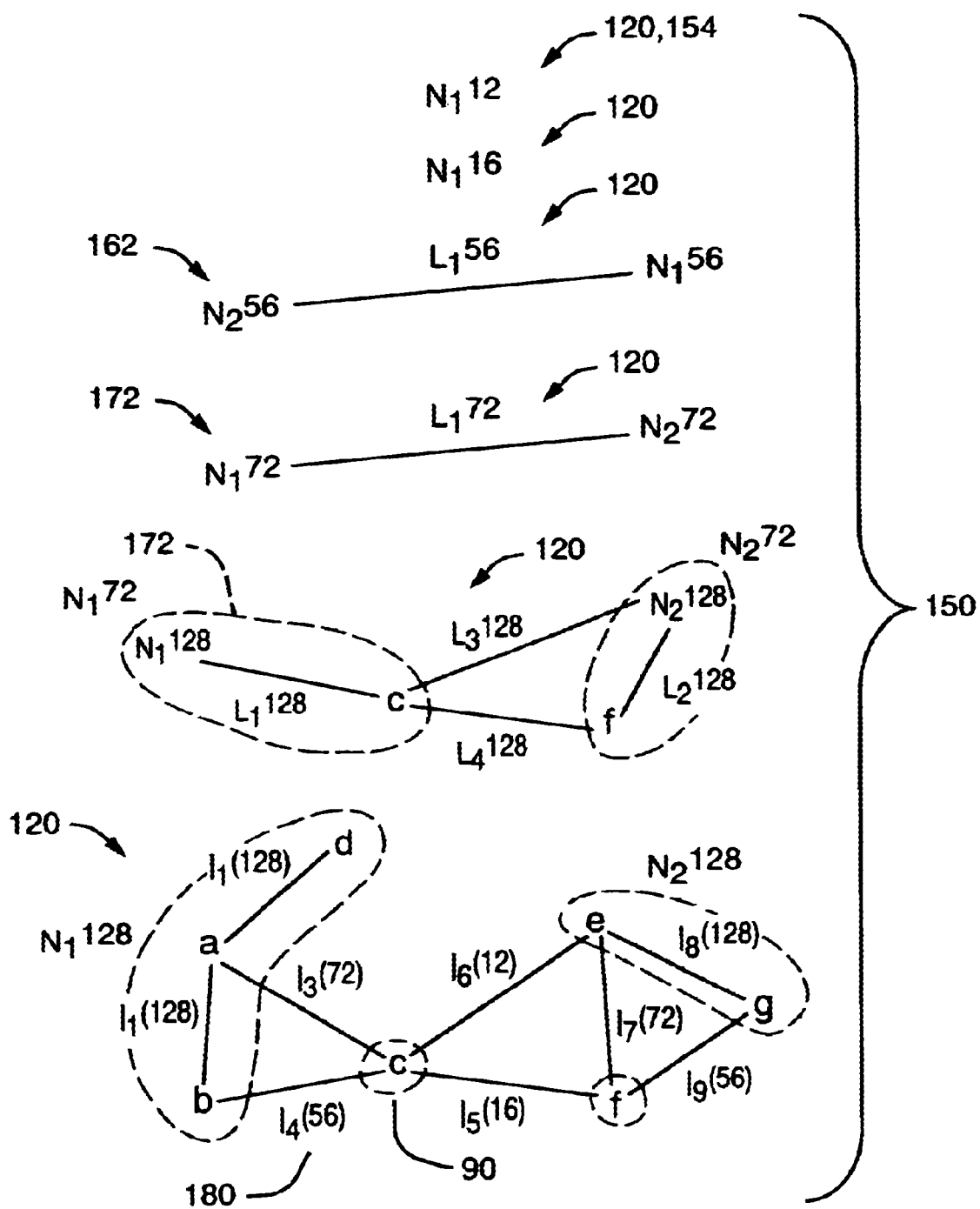
FIG. 6 is a schematic diagram of a continuous blocking island hierarchy for the network graph of FIG. 2.

Referring now to FIGS. 5, 6, and 7, in order to relate the BICM 40 to a corresponding BIH 150, a Continuous Blocking Island Hierarchy 152 ("CBIH") is defined in the spirit of the BIH as the hierarchy of β-BIGs 120. The BI 34 at the lowest level is equivalent with the entire network graph. The BI 34 at the highest level consists of a single node 154. As explained below, most nodes 90 and links 46 of β-BIGs 136 in a CBIH 152 are implicitly represented in an associated BICM data structure 160.

The BICM data structure 160 is a compact representation of the CBIH 152. "Continuous" means that the free capacity (or any restrictive cost feature) determines the to-be-constructed abstract nodes. A BIG can be constructed for any level: if there is only an abstract node (or link) at a lower level (that is included by one at a higher level, if there exists one at all), this lower level node (or link) implies one at the level of the BIG. This results in a compact representation where, in the best case, the number of abstract nodes and links are minimal, which reduces the memory consumption and complexity of applications.

The BICM data structure 160 consists of abstract node hierarchies and abstract link hierarchies where there exists an abstract node hierarchy for each connected component of the network graph. Such a node hierarchy represents the blocking island encompassing the whole connected-component. A blocking island is represented as a tree of abstract nodes, where the root node has a capacity level that is equivalent to the capacity level of the blocking island. The abstract nodes contained in an abstract node correspond to blocking islands at (the next) lower capacity levels. All abstract nodes, except the leaf nodes, contain abstract nodes. All nodes might contain network graph links and nodes. An abstract node contains only network graph links that have the same free capacity as the level of the abstract node and belong to the blocking island that the abstract node represents. A blocking island (for example, blocking island 164 in FIG. 7) might also contain links that have less free capacity than the capacity value of the blocking island (for example, blocking island 180 in FIG. 7). In the abstract node hierarchy, such links are included in the abstract node at a level that is equivalent to their free capacity (for example, abstract node 164 in FIG. 7). A network graph node is contained in the abstract node that contains the link associated with the node that has the highest free capacity. Note that if there are multiple such links, they are all in the same abstract node.

An abstract link aggregates network all links between two nodes, where the nodes are either abstract or network nodes. An abstract link hierarchy results from aggregating abstract links in other abstract links.

Further, BICMs are appropriate for bi-directional (virtual) point-to-point connections. The extension to multi-point connections is straight forward, as it is only necessary to handle the n endpoints instead of two.

The prior art discloses a BIH for an ordered set B of bandwidth levels $0<\beta_1<\beta_2<\beta_3 \ldots <\beta_b$. The highest level and lowest level in the BIH are the 0-BIG and the $\beta_b$-BIG, respectively. The $\beta_b$-BIG is by definition equivalent with the network graph (i.e., $\forall e \in , \in \beta(e)<\beta_b$, where $\epsilon$, is the set of all links of the network graph). A CBIH that is equivalent to this discrete BIH with respect to the blocking island and blocking island graphs is obtained by defining $\beta(v)$ according to the following quantization function, Equation 2, in which B is represented as an array B[ ]:

$$\beta(e)=f(0,e) \quad (2)$$

$$f(i,e) = \begin{cases} f(i+1,e) & \text{if } B[i] < \beta(e) \\ B[i] & \text{else} \end{cases} \quad (3)$$

Figure 29:
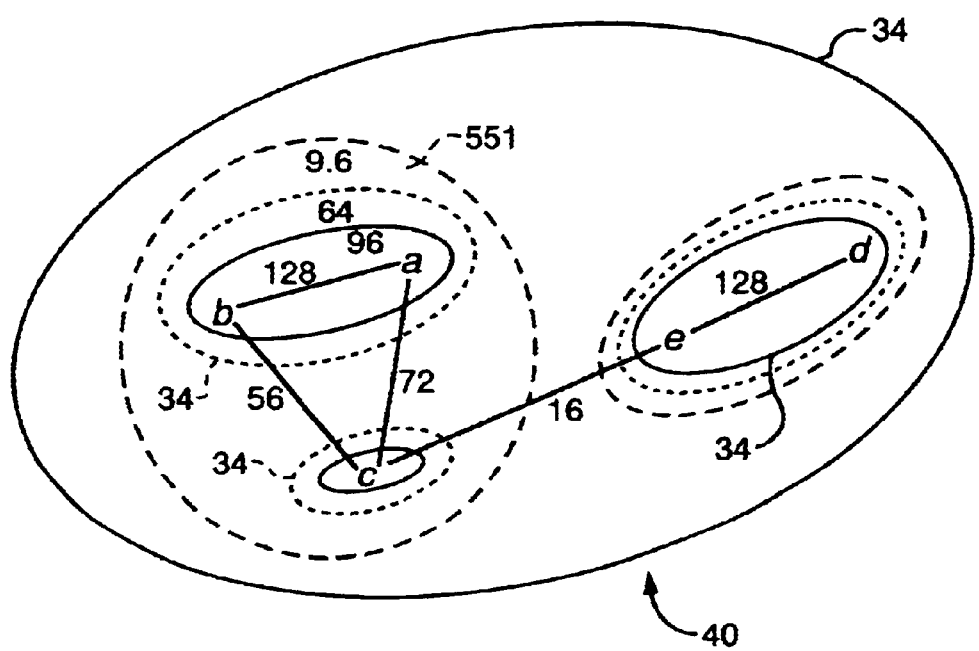
FIG. 29 is a schematic diagram of a status display of a second example network.

An example for B={9.6, 64, 96} is shown in FIG. 29.

Now referring to FIGS. 5 and 8, the method 30 of obtaining a BICM 40 from a network graph 36 and a quantization function is shown in more detail. In order to facilitate the description of the method 30, the employed notation and definitions arm introduced.

Due to the representation of the BIGs 120, a link 46 is associated with multiple abstract nodes 122 in general. These abstract nodes 122 are recorded in the ordered sets a Point-endpoints aPs( ) and zPoint-endpoints zPs( ). Abstract links 130 and abstract nodes 122 are defined as tuples consisting of a label and a set S. A function val( ) applied on an abstract node or link returns the set S. The function val( ) applied on a concrete link or node returns nil. In the case of an abstract node, the domain of S are network nodes 90, network links 46, and abstract nodes 122. In case of an abstract link 130, the domain of S is comprised of concrete and abstract links. The function that returns the abstract node N in which an element x is contained (i.e., $x \in \text{val}(N)$) is called v(x). $\lambda(e)$ returns the abstract link in which a concrete or abstract link e is contained. Both mappings are partial: the value nil is returned if no mapping exists.

A function $\phi( )$ is used to determine whether vertices v (or v(v)) should be included in a yet-to-be-constructed abstract node at bandwidth level b. This function is defined as follows in Equation 4:

$$\phi(b,v,e) = \begin{cases} *, & \text{if } \exists n, \beta(v^n(v)) = b \wedge v^{n+1}(v) = \text{nil}; \\ \{v^n(v))\} & \text{if } \exists n, \beta(v^n(v)) > b \wedge v^{n+1}(v) = \text{nil}; \\ \{v\} & \text{else, i.e., } v(v) = \text{nil.} \end{cases} \quad (4)$$

whereas $\beta( )$ returns the bandwidth level of an abstract node 122 and $\beta(\text{nil})=-1$. In this definition, $v^n(x)$ is short hand notation for n applications of v( ) on x, i.e., $v(v( \ldots v(x)))$. The definition of Equation 4 is sufficient, because there exists no abstract node at a lower level than b, the one of the current edge. The function $\phi( )$ described by Equation 4 deals with the following three cases.

In case one, if there exists an abstract node 122 for v at the bandwidth level b, neither v nor $v^n(v)$ are added, i.e., $\phi( )$ returns *. In this case, the abstract node under construction is merged with the existing one.

case two, if v is contained in an abstract node 122 with a higher bandwidth level, the abstract node should be included in the yet-to-be-constructed abstract node. The reason is that all potential routes within $v^n(v)$ are also potential routes within the yet-to-be-constructed abstract node.

In case three, if v is not contained in an abstract node, it is included in the one to be constructed.

In the BICM data structure 160, blocking islands are represented as trees. For instance, blocking island $N_2^{56}$, shown in FIG. 7, is a tree consisting of node 162 ("$N_2^{56}$"), and node 164 ("$N_1^{72}$") and node 166 ("$N_1^{128}$"). For constructing $N_2^{56}$, $\phi(56,b,l_4)$ returns $N_1^{72}$, because $v(b)=N_1^{128}$, $v^2(b)=N_1^{72}$, and $v^3(b)=$nil. The function $v_b(x)$ denotes the abstract node at the level b that contains x. Formally, it is defined as:

$$v_b(x) = \begin{cases} v^n(x) & \text{if } (v^n(x)) \geq b \cdot [v^{n+1}(x) = \text{nil } Y v^{n+1}(x) < b] \\ x & \text{else.} \end{cases}$$

The operation sort (S, k( )) sorts the set S using the key k( )—ordering the elements into sets that consist of elements on which k( ) applied returns the same value. The operation pop(S) removes the first element of S from S and returns it. In contrast, the function first( ) returns the first element of a set without modifying the set. The set-union operator A $\lfloor \pm \rfloor$ B returns a set that contains all elements of A and B once.

Figure 8A:
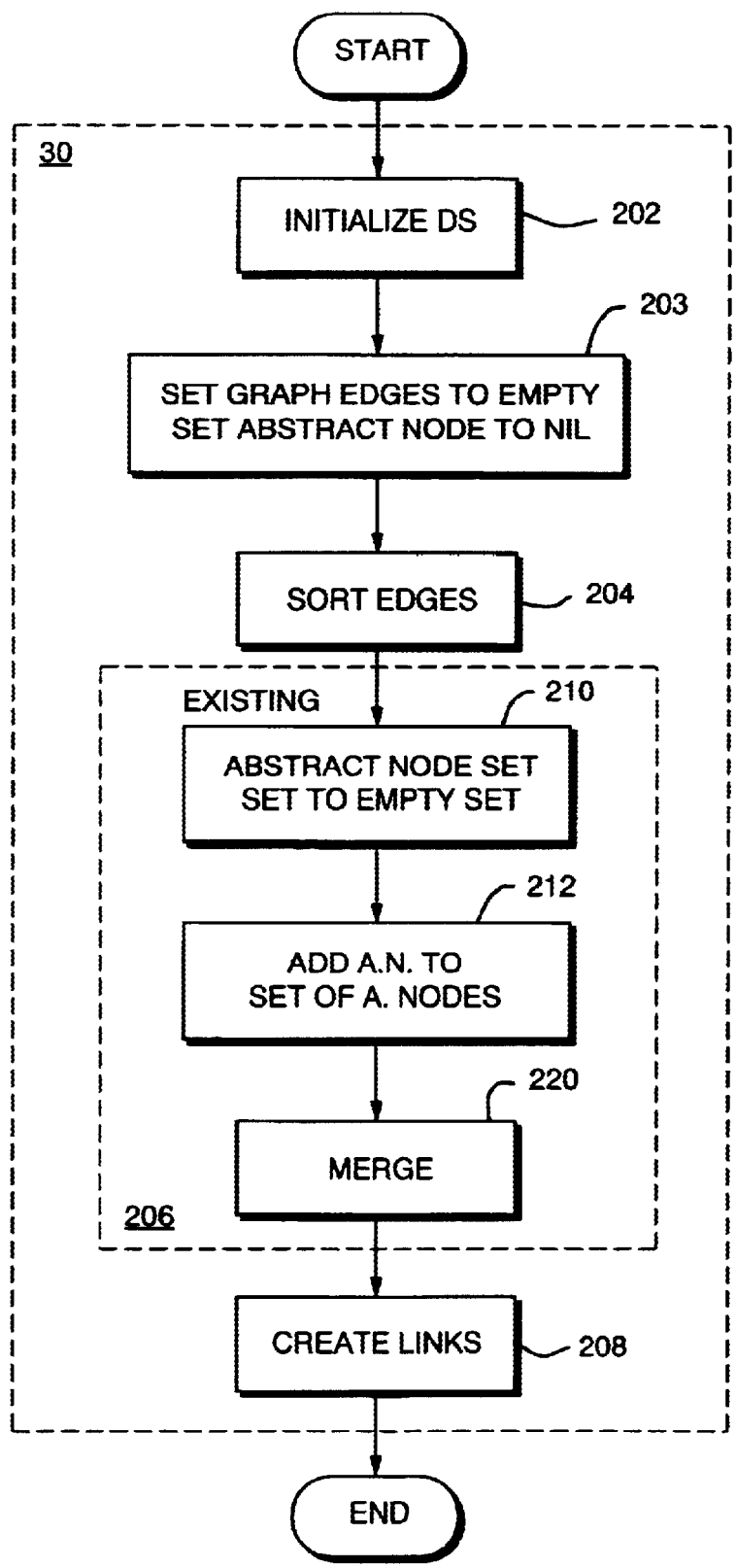
FIG. 8a is a flow diagram of the method of the invention.

Referring now to FIG. 8a, an embodiment of the method 30 comprises the steps of initializing data structures, such as a BICM data structure 160, and network nodes 90 and links 46 and sorting and processing edges 86 to generate the BICM 40. In an initialization step 202, a data structure 160 of the Blocking Island Contour Map 40 is initialized. In a second step 203, the sets aPoint-endpoints and zPoint-endpoints of the edges of the network graph 32 are set to the empty set and sets the abstract node slot of all edges of the network to nil. In a third step 204, edges of the network graph 36 are sorted into a set. W of subsets B of edges 86 with equal free capacity and each subset is ordered in decreasing order. In a fourth step 206 comprising three substeps 210, 212, and 220, each edge 86 of a subset is processed, the subset currently being processed being referred to as the current subset and the edge being processed being referred to as the current edge. In the first substep 210 of the third step 206, the set of existing abstract nodes (denoted by $\chi$) is set to the empty set. In the second substep 212, an abstract node 122 at the capacity level of the current edge that includes an endpoint of the current edge is added to the 201, set of existing abstract nodes. In the third substep 220, an abstract node 122 for the current edge is constructed by merging the existing abstract nodes and including the current edge and its endpoints, if appropriate. Such an endpoint is either an abstract node 122 at a lower capacity-level than the current edge and it includes (directly or indirectly) the network-level endpoint or it is the network-level endpoint if its abstract node slot has the value nil. The endpoints are included, if and only if they are included in an abstract node 122 or they are included in an abstract node at a higher capacity level than the current edge. The merge procedure employed for this purpose (shown in FIG. 9a) also adds the constructed abstract node to the data structure 160 of the Blocking Island Contour Map 40. In the fifth step 208, the necessary abstract links are created for all abstract nodes created in step 206 (and kept in the set Q) by processing one particular subset B, thus generating the Blocking Island Contour Map 40 using submethod updateLinks( ), described in association with FIGS. 10a and 10b. A formal description of the above-described method 30 is shown in FIG. 8b.

Figure 9A:
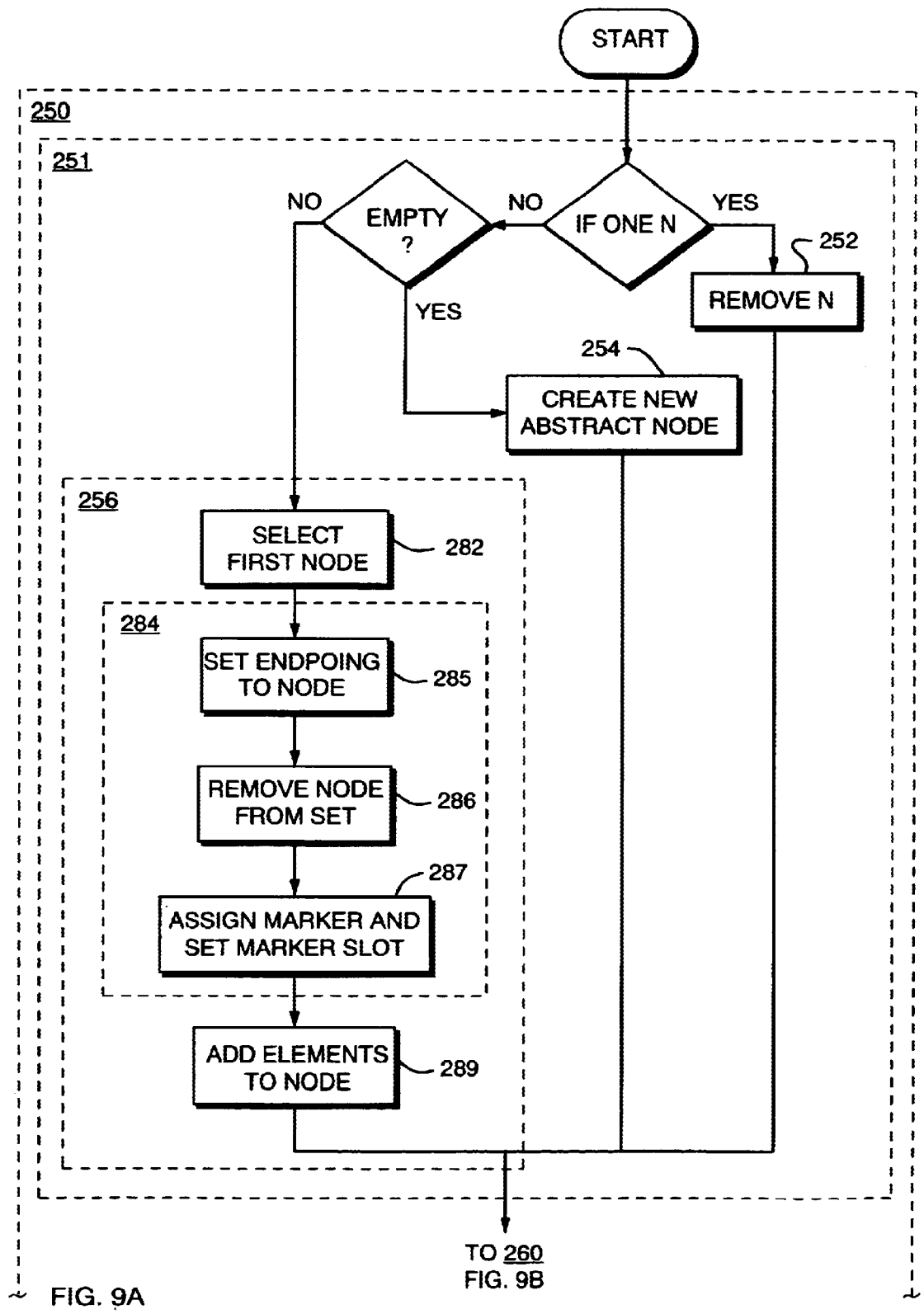
FIG. 9a is a flow diagram of the merge submethod of the invention.
Figure 9B:
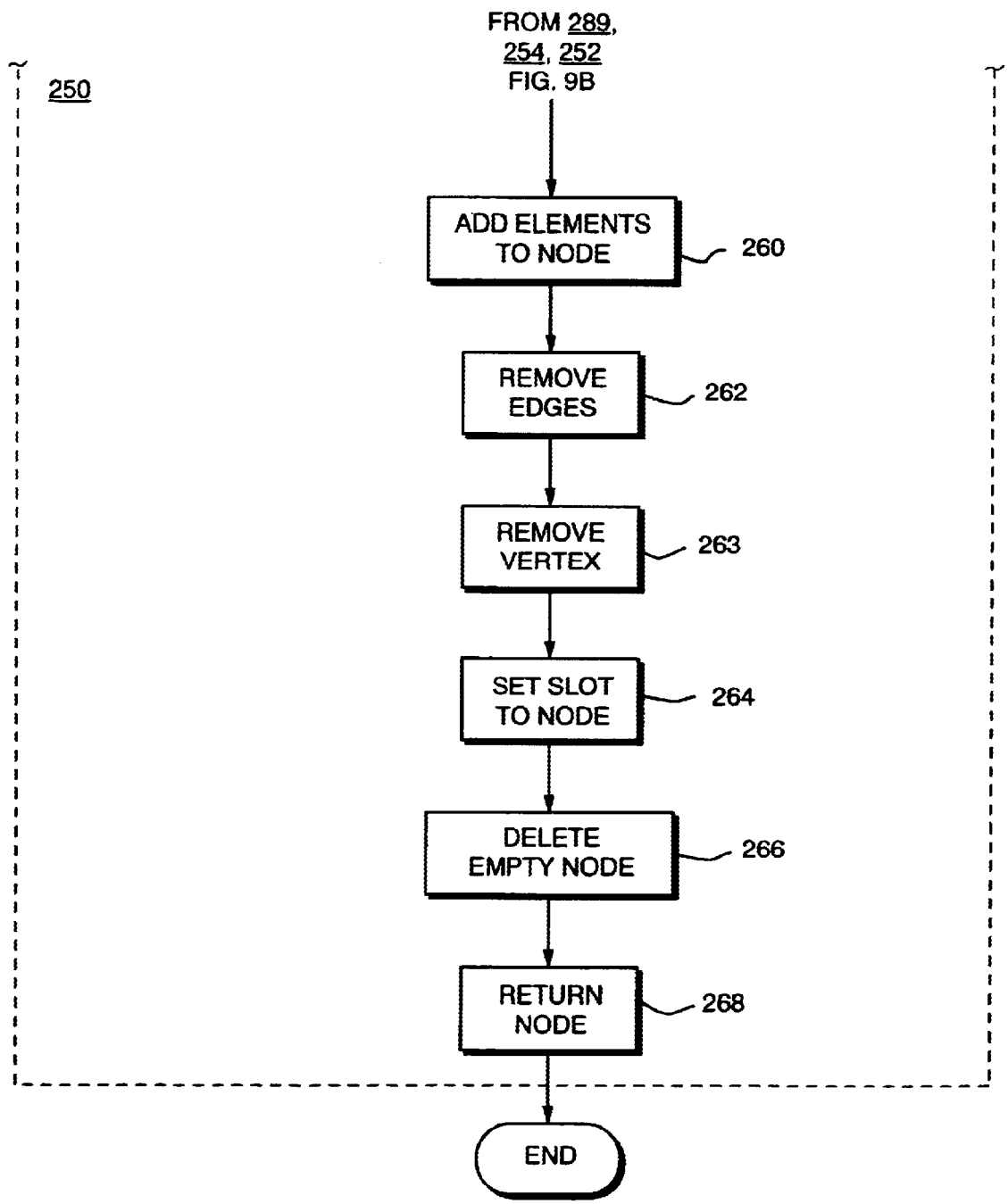

Referring now to FIG. 9a, the submethod merge( ) 250, the formal description of which is provided in FIG. 9b, merges all abstract nodes 122 in the set χ and adds L and R to the set of contained elements (i.e., val( )) of the merged abstract node. χ contains either zero, one, or two nodes. In a first case, a new abstract node 122 that contains L ⌊±⌋ R is generated. In a second case, L ⌊±⌋ R are added to the contained elements of the existing abstract node. In a third case, the first node obtains the contained elements of the second one, which is then deleted. In all these cases, updateLinks( ) is used to update the abstract link hierarchy. Note that modifyFreeCapacity( ) 490, shown in FIG. 14a, deletes obsolete abstract links, as updateLinks( ) does not remove such links, if they are inside a continuous blocking island. Note as well that, in modifyFreeCapacity( ) 490, all modified abstract nodes—including the ones modified by moveNode( ) 650—are included either in $\chi_a$, or P. Hence, merge( ) 250 applies updateLink( ) 300 on all of them in the proper order. For instance, if the free capacity of $l_3$ is set to 128, then $l_3$ extends the blocking island $N_1^{128}$ and $l_4$ is an internal link of this new blocking island. Note that $l_4$ was once an internal link of $N_1^{72}$ with less than 72 available bandwidth.

Referring to the formal description in FIG. 9b, the merging submethod 250 of the above method 30 takes a data structure of a Blocking Island Contour Map, a set of yet-to-be-merged abstract nodes, a set of yet-to-be-added links, a set of yet-to-be-added vertices and a Boolean flag, and returns the data structure of the Blocking Island Contour Map and an abstract node. The method performs six steps 251, 260, 262, 263, 264, 266, and 268. The first step 251, which performs a case analysis to prepare an abstract node into which existing information is to be merged, includes three substeps 252, 254, and, 256. In the first substep 252 of step 251, if the yet-to-be-merged node set contains one abstract node, then it is the yet-to-be-modified abstract node which is removed from the yet-be-merged node set. Else, if the first set is empty, the second substep 254 of step 251 creates a new abstract node at the level of the first element in the yet-to-be-added link set and calls it the yet-to-be-modified abstract node. Else, in the third substep 256 of 251, the submethod 250 performs the three substeps 282, 284 and 287. In the substep 282, the submethod selects the first of the two nodes in the yet-to-be-merged node set as the yet-to-be-modified node The second node in the yet-to-be-merged node set is called the to-be-deleted node. In substep 284, the submethod 250 performs on all edges associated with the to-be-deleted node, the substeps 285, 286 and 287. The edge that is currently processed is called the current edge. In substep 285, if the to-be-deleted node corresponds to one of the endpoints of the current edge, this endpoint is set to the yet-to-be-modified node; else if the to-be-deleted node corresponds to the other endpoint of the current edge, set this other endpoint to the yet-to-be-modified node. In substep 286, if the to-be-deleted node is an element of the set aPoint-endpoints of the current edge, it is removed from this set; else if the to-be-deleted node is an element of the set zPoint-endpoints of the current edge, the to-be-deleted node is removed from this set. In substep 287, if the to-be-deleted node has a marker, it is assigned to the yet-to-be-modified node and the node slot of the marker is set to the yet-to-be-modified node. Then the elements contained in the to-be-deleted node are added to the at 289. In the second step 260, the submethod 250 adds the elements of the yet-to-be-added links and node sets to the elements contained in the yet-to-be-modified abstract node, if such elements are not already among the elements. In the third step 262, the submethod 250 removes each edge in the set of the yet-to-be-added edges from the abstract node that is referred to by the abstract node slot of each vertex (if such an abstract node exists). In the fourth step 263, if the value of the Boolean flag is false, the submethod 250 removes each vertex in the set of the yet-to-be-added vertices from the abstract node that is referred to by the abstract node slot of each vertex (if such an abstract node exists). In the fifth step 264, for elements added in step 260, the submethod 250 sets a corresponding abstract node slot to the created abstract node. In the sixth step 266, the submethod 250 calls an updating, submethod deleteEmptyNode for the set of the to-be-deleted node. For this purpose, it sets the set of values contained in such a node to the empty set first. In the seventh step 268, the yet-to-be-modified abstract node is returned.

Below is a deleteEmptyNode submethod, referenced above, for deleting empty abstract nodes called in the method 30 above. This submethod removes the abstract node N from Ξ, if val(N)=•. It also passes the marker to the abstract node of the abstract node slot of N, if there is a marker associated with N. Note that this method does not destroy the object, because this is done by a garbage collector, as soon as there is no reference on this object.

deleteEmptyNode(InOutΞ, N)
   if val(N)=• then
     val(v(N))←val(v(N))\\{N}
     // garbage collection is assumed to destroy N ultimately
     if marker(N)≠nil then
       node(marker(N))←v(N)
       if v(N)≠nil then marker(v(N))←marker(N)
   end if Note that InOut is a formal argument to a function that poses and returns a value.

Figure 10A:
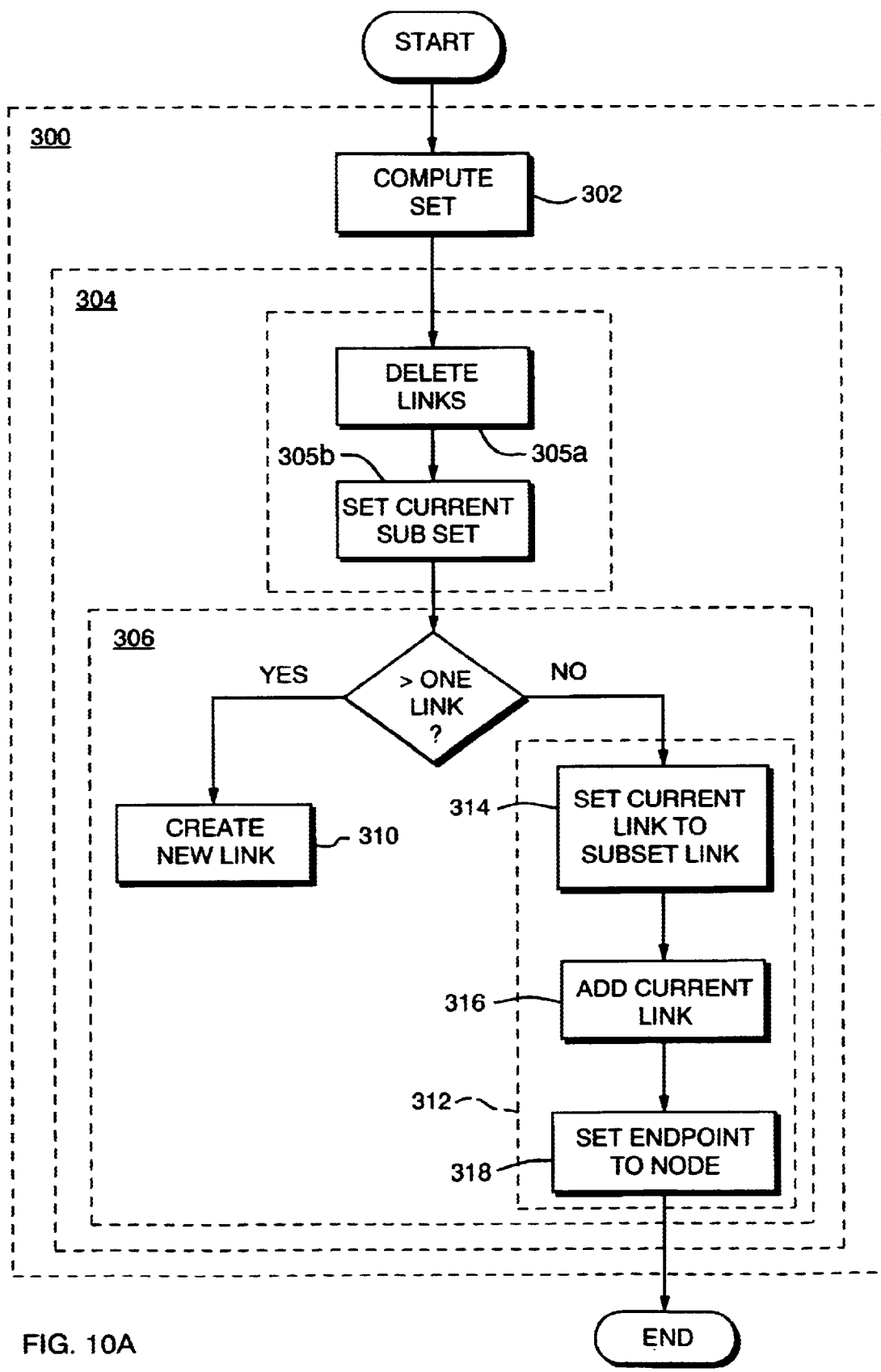
FIG. 10a is a flow diagram of the updateLinks submethod of the invention.

Referring now to FIG. 10a, the act 300 of constructing any necessary abstract links mentioned above as step 208, also accomplished using submethod updateLinks (described in FIG. 10b) uses the data structure of the Blocking Island Contour Map and an abstract node and a merged abstract node (that has not yet been deleted) and an optional Boolean flag (of which the default value is false) as inputs and includes three basic steps. If a merged abstract node does not exist, the abstract node is passed as a value for the merged abstract node to the submethod. In a first step 302, a set of all links associated with the abstract node is computed by joining the links associated with the abstract node at the free-capacity level of the abstract node with all links at the free-capacity level of the abstract node associated with the nodes contained in the abstract node, where a link is added to the so constructed set only once. In the same step, all links of the so constructed set are ordered into a'set of subsets, wherein each subset contains all links that share the same endpoint not contained in the input abstract node. In a second step 304, each subset contained in the set constructed in step 302, called the current subset, is processed by performing the following two substeps 305 and 306 on the current subset. In step 305, the submethod performs the substeps 305a and 365b on current sets that contain links that are internal with respect to the blocking island represented by the abstract node. In substep 305a, if the Boolean flag is false, internal abstract links that have the input abstract node as both of their endpoints are deleted using the submethod deleteAbstractLink( ) (shown in FIGS. 11a and 11b). In substep 305b, the current subset is set to the subset which is next to be processed. In second step 306 containing two substeps 310 and 312, the second substep of which has three subordinate steps 314, 316, and 318, each subset is processed from the second step 304. The substep 310 of step 306, is carried out, if the current subset contains more than one link. In this case, subordinate'step 310 creates a new abstract link using the submethod createAbstractLink( ), shown in FIGS. 30a and 30b. The substep 314 of substep 312 of step 306 sets the current link to the single link contained in the current subset. In subordinate step 316, the current link is added to the links associated with the input abstract node. In subordinate step 318, the endpoint of the current link that corresponds to the merged abstract node is set to the input abstract node if the Boolean flag is true. Otherwise, the input abstract node is added to an appropriate set of endpoints, i.e., if the aPoint (or zPoint) of the link is contained in the input abstract node, the abstract node is added to the set of aPoint-endpoints (or zPoint-endpoints).

Figure 30A:
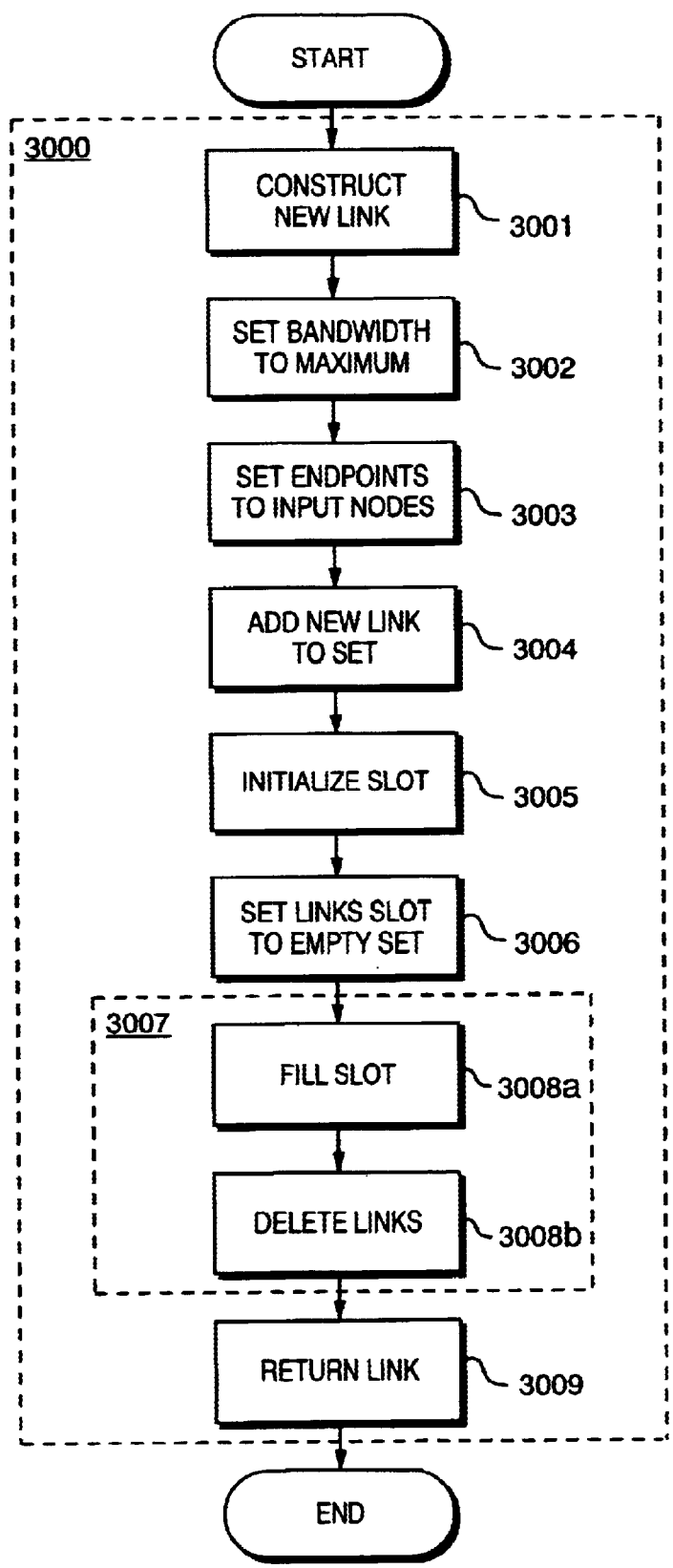
FIG. 30a is a flow diagram of the createAbstractLink submethod.

Referring now to FIG. 30a, createAbstractLink 3000 (shown in FIG. 30b) uses the data structure of the Blocking Island Contour Map, a first and second node, and a set of links as inputs and returns the created abstract link. The submethod 3000 performs the eight steps 3001, 3002, 3003, 3004, 3005, 3006, 3007, and 3008. In step 3001, a new abstract link is constructed that contains the links contained in the input set of links. In step 3002, the bandwidth level of the new abstract link is set to the maximum over all (links it contains). In step 3003, one endpoint of the created abstract link is set to the first input node and the other endpoint of the created abstract link is set to the second input node. In step 3004, the new abstract link is added to the set of links associated with the two endpoints of the created abstract link by invoking submethod addTo( ). Step 3005 initialize an abstract link slot of the new abstract link such that it is empty. In step 3006, the link's slot aPoint-endpoints and zPoint-endpoints are initialized to the emptyset. Step 3007 contains two substeps 3008a and 3008b. In step 3008a of step 3007, for all links contained in the new abstract link, the new abstract link is filled into the abstract link slot. In substep 3008b, abstract links contained in the new link are deleted, if such an abstract link has an endpoint that is equal to one of the two endpoints of the new abstract link. In step 3009, the constructed abstract link is returned.

Referring now to FIG. 10b, updateLinks 300, the updating submethod, constructs the hierarchy of abstract links and is described in more detail below.

For this submethod, an additional function, $\chi( )$ is used and is defined by the below Equation 5:

$$\chi_{N_x^b}(l) = \begin{cases} v_b(zPoint(l)) & \text{if } v_b(aPoint(l)) = N_x^b \\ v_b(aPoint(l)) & \text{if } v_b(zPoint(l)) = N_x^b \end{cases} \quad (5)$$

The variable C is an ordered set of subsets of links (a temporary set variable with a described assignment). The function $\chi( )$ takes $N_x^b$ and an abstract or concrete link l and returns the abstract endpoint at the level b that is different from $N_x^b$. In case of links within the blocking island $N_x^b$, $\chi( )$ returns $N_x^b$. This allows the method 30 described above and in FIGS. 1 and 10a (specifically updateLinks( )) to filter out internal links. To obtain the proper abstract nodes $\chi( )$ uses $V_b( )$ defined above.

One of the endpoints of an abstract link L might be implicitly represented. Such an endpoint might also be an endpoint of an abstract link 130 that is contained in L. $\Gamma( )$ does not distinguish between the two. For this purpose, $\Gamma^b( )$ is introduced and defined as follows:

$\Gamma^b(N) = \bullet$ if $b > \beta(N)$;
{ele $\in \Gamma(N) \wedge \lceil e \rceil \geq b > \lfloor e \rfloor$} else In contrast to $\Gamma( )$, $\Gamma^b(N)$ retrieves the links, of which b is within the range defined by ceiling $\lceil \rceil$ and floor $\lfloor \rfloor$. The default values for these two new slots are $\infty$ and 0 for network links, respectively. In case of abstract links, the values are min($\beta$(aPoint(L)), $\beta$(zPoint(L))) and 0, respectively. In addition, the default $\beta( )$-value for network nodes is $\infty$.

Figure 11A:
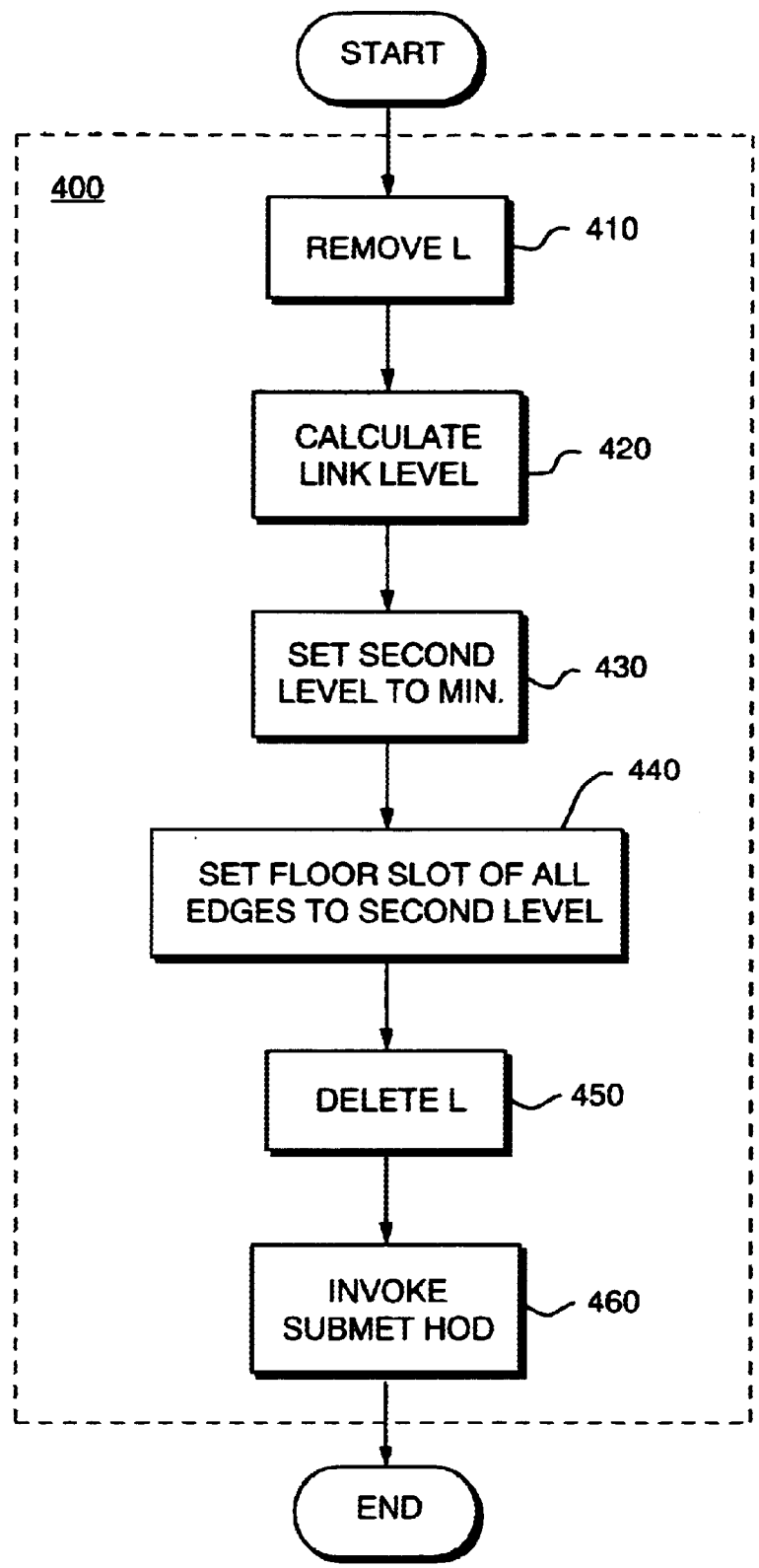
FIG. 11a is a flow diagram of a deleteabstractLinks submethod of the invention.

For the purpose of adding a link to the set of links connected to a node, addTo$\Gamma( )$ is introduced. This submethod adds a link L to $\Gamma(N)$ and (once) to $\Gamma( )$ of the endpoints of the links contained in L, if L is not already included, and sets or updates the effected floor and ceiling values. The submethod deleteAbstractLink( ) resets these values, if an abstract link is removed.

addTo$\Gamma$(InOut L, InOut N)
$\Gamma(N) \leftarrow \Gamma(N) \lfloor \pm \rfloor \{L\}$
$\lceil L \rceil \leftarrow \min(\beta(aPoint(L)), \beta(zPoint(L)))$
for all $e \in val(L)$ do
  $\lfloor e \rfloor \leftarrow \lceil L \rceil$
  $\Gamma(aPoint(e)) \leftarrow \Gamma(aPoint(e)) \lfloor \pm \rfloor \{L\}$
  $\Gamma(zPoint(e)) \leftarrow \Gamma(zPoint(e)) \lfloor \pm \rfloor \{L\}$
end for all Referring now to FIG. 11a, the submethod deleteAbstractLink( ) deletes an abstract link 130. A formal description of this submethod, together with another called checkHigherLevelAbstractLink( ) is provided in FIG. 11b.

The submethod deleteAbstractLink( ) 400 takes a BICM data structure, an abstract link L and $L_a$ as inputs, whereas $L_a = \lambda(L)$. The submethod 400 deletes L from the BICM data structure 160 by performing six steps, namely 410, 420, 430, 440, 450 and 460. The step 410 removes L from the $\Gamma( )$ slot of the two endpoints of L and the nodes of the sets aPoint-endpoints and zPoint-endpoints. Step 420 calculates the level of the abstract link (which is different from the available capacity on this link). A second level is defined to be 0. Step 430 checks whether $L_a$ exists or not. In the event that it exists, the second level is set to min($\beta$(aPoint($L_a$)), (zPoint($L_a$))) and L is removed from the values contained in $L_a$ to which all values of L are added. In step 440, the floor slot of all edges contained in L is set to the second level, if its initially the same as the first calculated level in step 420. In addition, the abstract link slot is set to $L_a$ and L is removed is from the $\Gamma( )$ slot of both endpoints of each edge contained in L. Step 450, deletes L. Step 460 invokes the submethod checkHigherLevelAbstractLinks( ) if $\lambda(L)$ is not nil.

The submethod checkHigherLevelAbstractLinks( ) recursively removes abstract links that contain less than two links by invoking submethod deleteAbstractLink, if an abstract link satisfies the condition.

In order to illustrate these methods, the BICM 40 for the network graph 36 depicted in FIG. 2 is computed. The essential elements of the resulting BICM data structure 160 are depicted in FIG. 7. In particular, the node property $\Gamma( )$ is not depicted. The hierarchy 150 of this BICM 40 is shown in FIG. 6.

Referring again to FIGS. 5 and 7, a blocking island 34 is basically represented as a tree 176 of abstract nodes 122. Links 46 (a network graph link defined in FIG. 3) connecting two nodes 90 of a blocking island 34 with a free capacity that is lower than the $\beta$ of the blocking island belong, by definition, to this blocking island. For instance, link 180 ("$l_4$") is such a link with respect to blocking island 178 ("$N_1^{72}$") in FIG. 5. In the BICM data structure 160, link $l_4$ belongs to abstract node $N_2^{56}$, i.e., an abstract node at a lower bandwidth level than $N_1^{72}$. In contrast, all other links arm included in the abstract node 122 in which at least one of its two endpoints is located.

In addition, each $\beta$-BIG of a CBIH, such as the CBIH 150 shown in FIG. 6, is a complete graph. Many abstract nodes 122 and abstract links 130 are only implicitly represented in a BICM 40. Abstract links 130 containing a single link 184 ($L_1^{128}$, shown in FIG. 7) are not explicitly represented in BICMs 40 to reduce the space complexity of this data structure. These links 184 are depicted in FIG. 7. The containment relations in which these abstract links 130 are involved are represented by arrows 182 drawn with dotted lines. In the following cases, abstract nodes 122 and abstract links 184 are represented implicitly:

(1) abstract link 184 ("$L_3^{128}$") is not represented, because ($l_6$)=$L_1^{72}$ implies the subsumed abstract links at higher bandwidth levels than 72. The generalized rule is described by Equation 6, below.

(2) abstract link $L_1^{56}$ is not represented, because ($L_1^{72}$)=nil implies the subsumed abstracts links at lower bandwidth levels than 72. The generalized rule is described by Equation 7, below.

(3) v(c)=$N_1^{72}$ (abstract node 164) implies the not explicitly represented abstract node $N_3^{128}$, which is contained in $N_1^{72}$. The generalized rule is described in Equation 8, below.

(4) in general, abstract node 166 ("$N_1^{128}$") implies abstract nodes 122 at all bandwidth levels between 128 and 72. The generalized rule is described in Equation 9, below.

The implied abstract links 184 and abstract nodes 122 are computed, if required, according to the following rules:

$$\lambda(l^h)=L_1^j \rightarrow \forall j<b<h, \exists \underline{L}_x^b, \underline{L}_x^b=l^h \quad (6)$$

$$\lambda(l^h)=\text{nil} \rightarrow \forall b<h, \exists \underline{L}_x^b, \underline{L}_x^b=l^h \quad (7)$$

$$v(n^h)=\text{nil} \rightarrow \forall b<h, N_x^b, \exists \underline{N}_x^b=n^h \quad (8)$$

$$v(n^h)=N_k^j \rightarrow \forall j<b<h, \exists \underline{N}_x^b, \underline{N}_x^b=n^h \quad (9)$$

$l^h$ and $n^h$ are either network or abstract links and nodes, respectively, $\underline{L}_x^b$ and $\underline{N}_x^b$ are an implicit abstract link and node, respectively. It is possible to determine all implicitly represented abstract nodes and links. Therefore, it is possible to compute the whole CBIH 150 (or a single BIG) from the BICM data structure 152.

Figure 13:
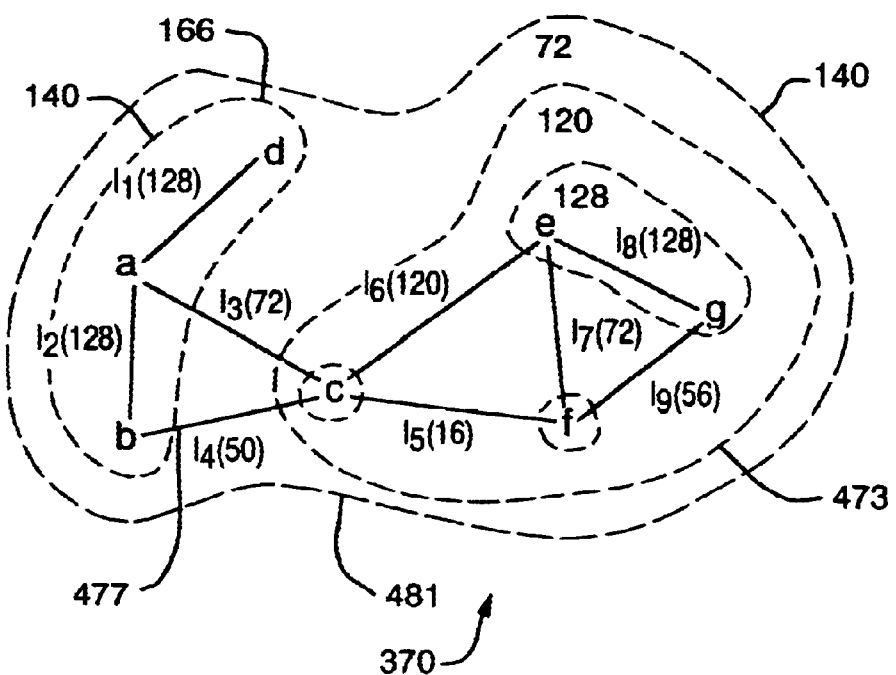
FIG. 13 is a schematic diagram of the Blocking Island Contour Map for the network of FIG. 1 after setting ($I_4$) 50 and ($I_6$)=120.

For reasoning, the CBIH 150 is not required because the BICM data structure 152 is sufficient. The reason is that it is sufficient to traverse only the explicitly represented abstract node and links if one ensures that these imply the right implicit abstract nodes. This reduces the search space because only the relevant levels are traversed compared to a CBIH 150 (or BIH). Referring again to FIG. 13 which shows an example BICM 370 and the BICM data structure 471, the BIG 472 at capacity level 120 consists of abstract node 473 ($N_t^{120}$"); abstract node 166 ("$N_1^{128}$"), which implies a blocking island 474 consisting of the same nodes and links at the level β=120; and abstract link 475 ("$L_1^{120}$", including link 476 ("$l_3$") and link 477 ("$l_4$"). Concerning node 166, $N_1^{128}$, it is clear that $N_1^{128}$ is also capable of handling any traffic at capacity level 120. Hence, the 120-BIG is represented as $N_1^{120}$—$L_t^{120}$—$N_1^{128}$. The method 30 recognizes that this is the 120-BIG given in the BICM data structure 471 and allows the drawing of the 120-BIG because $N_1^{128}$ is an endpoint of an abstract-link 130 at level 120. A drawing submethod need only rename the 128 blocking island as a 120-BI.

In an aspect of the method 30 of the invention, an incremental submethod 490 for computing a BICM data structure 152 is provided because recomputing the whole BICM after each modification of the network graph 36 is computationally too expensive.

Possible network graph modifications are modifying, adding, and deleting circuits, vertices 84, and edges 86.

These modifications may be handled in several different ways. In the simple model of a network 32 described herein, vertices 84 are only important for their connectivity. Prior to deleting a vertice 84, all edges 86 connected to it (and the circuits running through them) have to be removed, as described below. In addition, a newly added vertice 84 is disconnected from the rest of the network 32 unless an edge 86 is connected to this vertices The addition of the edge 86 is the important step, which is explained below. Modifying, deleting or adding a circuit modifies the free bandwidth on each edge that belongs to the path of the circuit. These edges 86 can be treated individually, as described below.

Figure 14A:
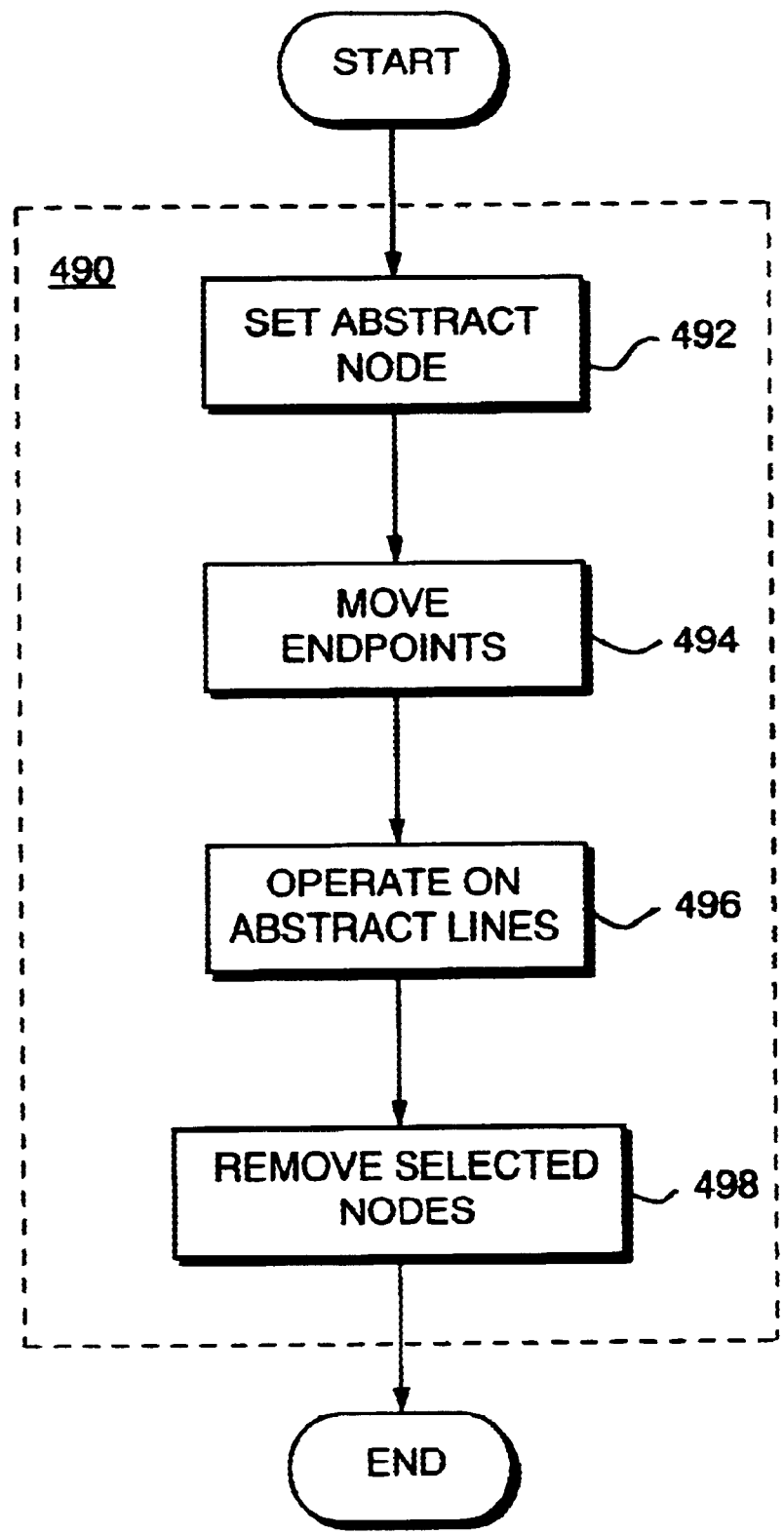
FIG. 14a is a flow diagram of the modifyFreeCapacity submethod of the invention.
Figure 14B:
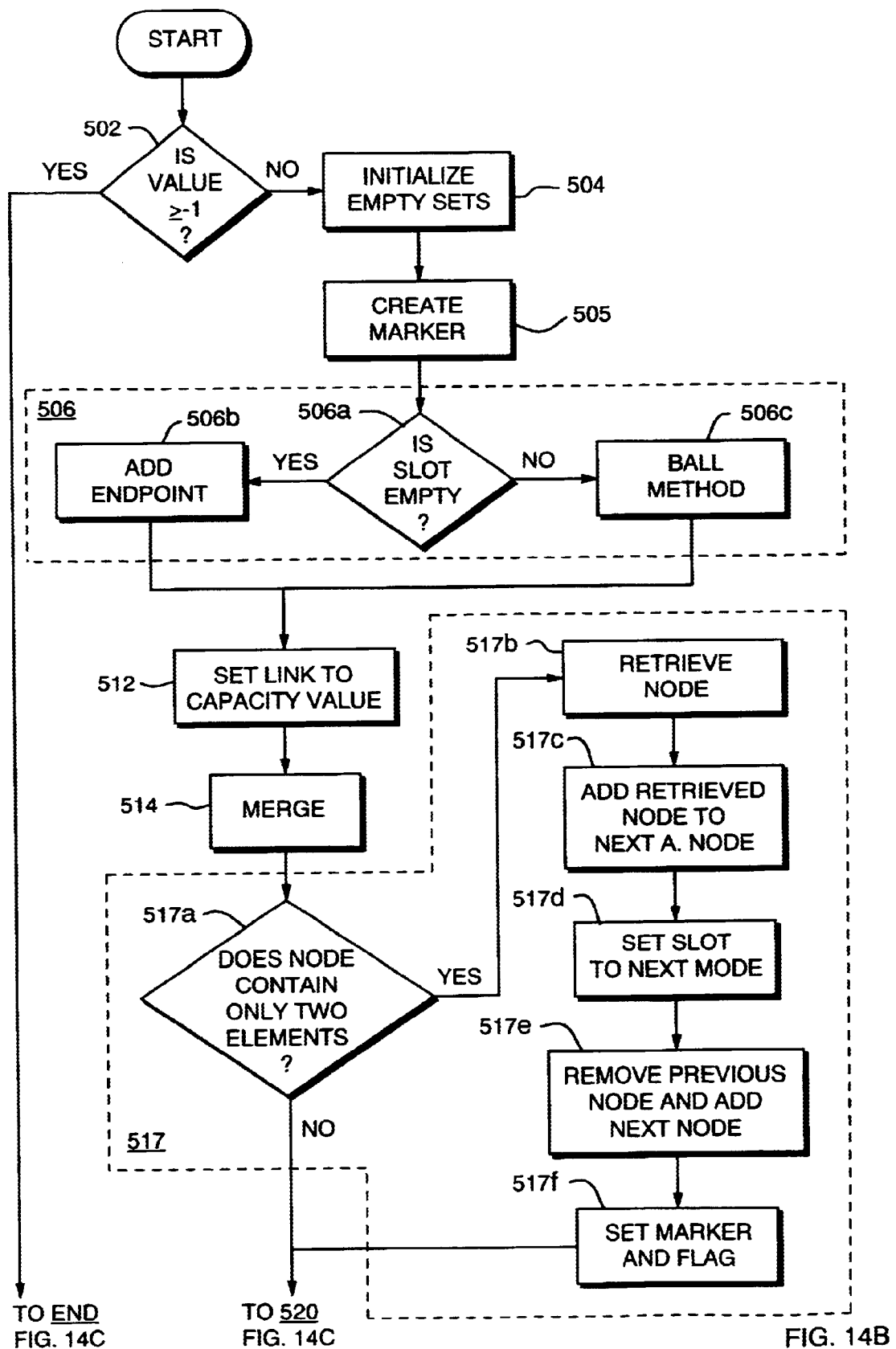
FIG. 14b is a more detailed flow diagram of t he modifyFreeCapacity submethod of the invention.
Figure 14D:
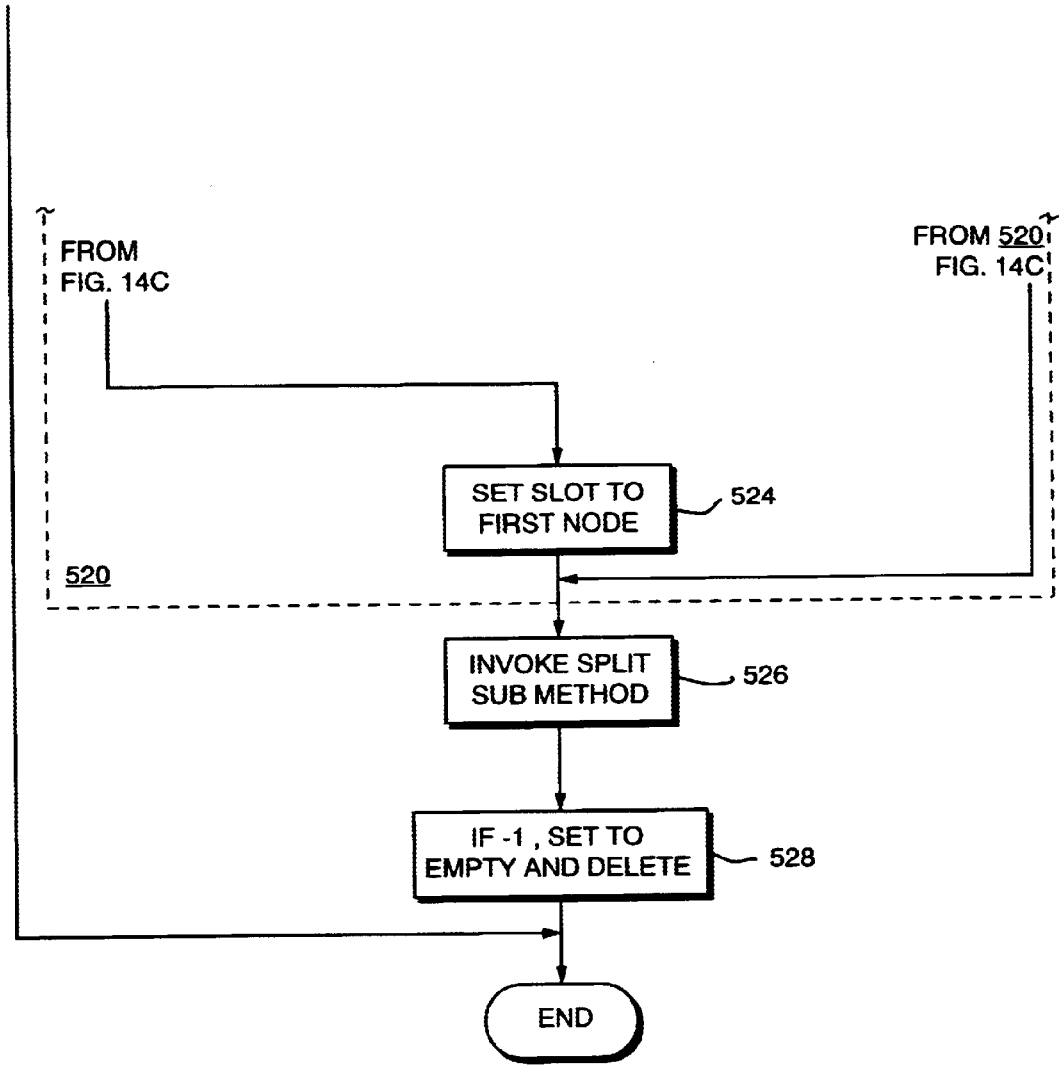
FIG. 14c is a formal description of the modifyFreeCapacity submethod of the invention of FIG. 14b.

The free bandwidth β of edge 86 ("e") changes, if the edges capacity $β_e^*$, the bandwidth a circuit running through e consumes, or the number of circuits or packets running over e are modified. Independent of the reason for the change, the submethod modifyFreeCapacity( ) 490, shown in FIGS. 14a and 14b is used to update the BICM.

Prior to deleting an edge e, all circuits that are using this edge are removed. This modifies the free bandwidth of all edges supporting at least one of these circuits. ModifyFreeCapacity( ) 490 is applied to all these edges 86. The submethod modifyFreeCapacity( ) 490 is applied for an edge e, where the new bandwidth value passed to this method is −1, so that submethod 490 removes e (and endpoints of e that are now isolated vertices) from the abstract node and link hierarchy of the BICM. Thereafter, it is possible to remove the e from the network graph.

Finally, adding a vertice 84 ("v") to the network graph 36 results in an additional isolated vertice, as no edge 86 is connected to it. Hence, it is sufficient to carry out the following operation Iv←Iv ∪{v}. Note that it is not necessary to explicitly represent Iv, because it is implicit in the network graph. Furthermore, the network graph might consist of multiple connected components, the herein presented invention constructs a BICM for such a network graph by applying computeBICM( ) to each connected component and thereafter maintaining and using the resulting BICM data structure as presented below.

The submethod modifyFreeCapacity( ) 490, incrementally maintains the BICM data structure 152 and hence the BICM 40. This submethod 490, takes a BICM data structure 160, a network link 46 and a new free capacity value b to update the BICM data structure by performing the following actions. In a first action 492, the modified link is moved to an abstract node 122 at the new free capacity level wherein the abstract node is an existing abstract node if there exists a link connected to the endpoints of the modified link at the new level; if there are multiple such abstract nodes, they are merged and the abstain nodes that contain these abstract nodes are merged recursively, and wherein, if there is no existing abstract node, a new abstract node is created and included in the abstract node tree at the appropriate position. In a second action 494, each of the endpoints of the modified link is moved to the abstract node that contains the link connected to it having the largest free-capacity. In a third action 496, the abstract links that contain only one link are removed from the abstract link hierarchy and sets of links connected to the modified abstract nodes that share the other abstract endpoint are aggregated into abstract links. In a fourth action 498, the abstract nodes that contain neither a network-graph node nor a network-graph link are removed from the abstract node hierarchy. Abstract nodes that have to be split are split and, if the new capacity value is −1, the to-be-modified network link is removed from the abstract node and link hierarchy (so that it can be removed from the network graph).

Figure 21A:
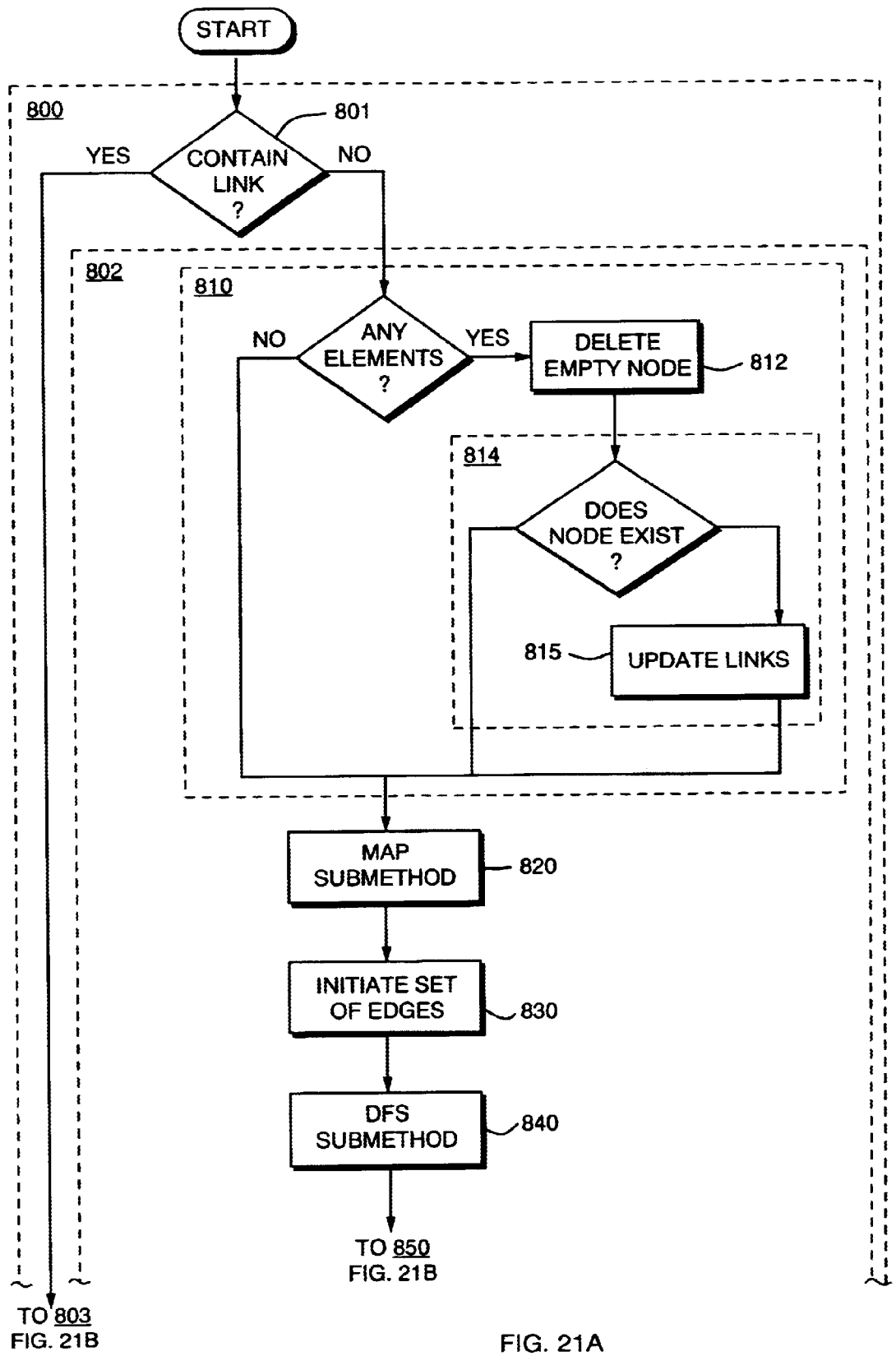
FIG. 21a is a flow chart of the split submethod of the invention.
Figure 21B:
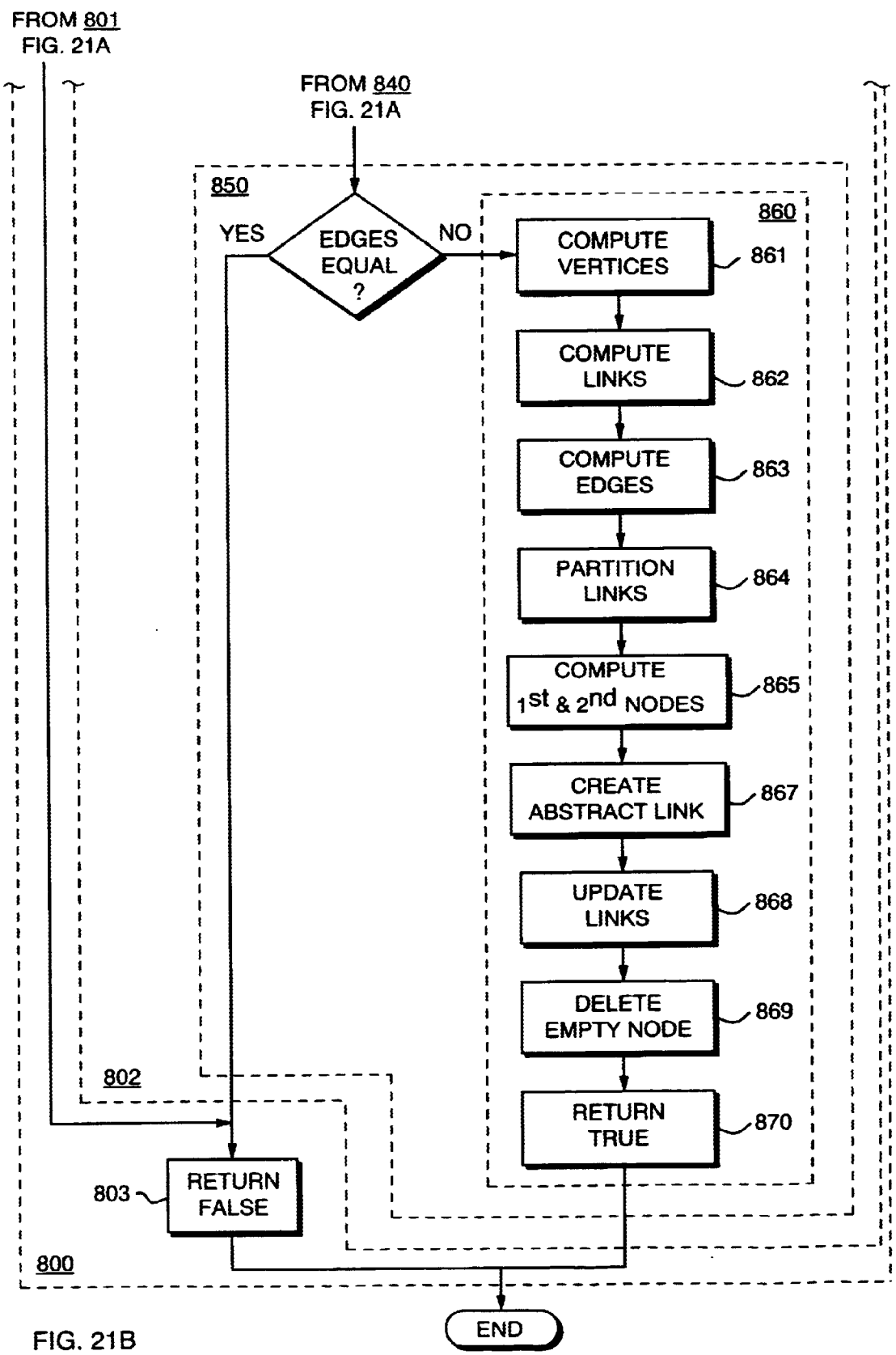

Referring again to FIG 10b, the method modifyFreeCapacity 490 is described in more detail as follows. The method 490 takes a data structure 160 of a Blocking Island Contour Map, a to-be-modified network link 46, and a new capacity value and returns a modified data structure of a Blocking Island Contour Map. This method 490 includes nine steps shown in 146. In a first step 502, the method 490 proceeds to a second step 504 if the new capacity value is −1 or smaller than the maximum free capacity and different from a current value; otherwise the method terminates. Note the distinction between the (free) capacity and maximum free capacity. In the second step 504, the method 490 initializes sets including a capacity-below set, an entry set, a capacity-above set, and an input to-be-moved-nodes set, and a removed-nodes set as empty sets. In a third step 505, if the new capacity value is smaller than the current one, the method 490 creates a marker, sets a node slot of the created marker to the abstract node of the abstract node slot of the to-be-modified network link, and adds the created marker to a marker slot of the abstract node of an abstract node slot of the to-be-modified network link. In a fourth step 506, for each endpoint of the network link to be modified, the method 490 performs the subordinate steps 506a, 506b, and 506c. In subordinate step 506a, the method 490 tests whether the abstract node slot of the current endpoint is empty and performs either subordinate step 506b or 506c. In subordinate step 506b, if the abstract node slot of the current endpoint is not empty, method 490 calls an entryPoint submethod 600 and a moveNode submethod 650 (shown in FIG. 16a). The former determines values for the capacity-below set, the entry set and the capacity-above set. The latter determines values for the to-be-moved-nodes set and the removed-nodes set. In subordinate step 506c, if the abstract node slot of the current endpoint is empty, method 490 adds the current endpoint to the to-be-moved-nodes set. In a fifth step 512, the method 490 sets the modified network link to the new capacity value. In a sixth step 514, the method 490 creates a new abstract node by using a merging submethod 250 together with the data structure of the Blocking Island Contour Map, the entry set, and the union of the capacity-below set and the to-be-moved-nodes set. The current abstract node is set to the created node. In a seventh step 517, the method 490 performs the subordinate steps 517a, 517b, 517c, 517d, 517e and 517f. In subordinate step 517a, the submethod 490 performs the steps 517b, 517c and 517d, if the abstract node of an abstract node slot of the to-be-modified network link contains only two elements and is a member of the entry set. Otherwise, the submethod 490 continues with step 520. In subordinate step 517b, a to-be-processed abstract-node is retrieved from a previous abstract node contained in an abstract node slot of the to-be-modified network link. In subordinate step 517c, the to-be-processed abstract node is added to a next abstract node denoted by an abstract node slot of the previous abstract node, whereas the previous abstract node is removed from the next abstract node, if there exists a next abstract node. In subordinate step 517d, the abstract node slot of the to-be-processed abstract node is set to the next node. In subordinate step 517e, the submethod 490 removes the previous abstract node from the capacity-above set and adds the next abstract node, if such a node exists and if the previous node is an element of the capacity-above set. If the previous abstract node is a member of the capacity-below set, submethod 490 adds the to-be-processed abstract node to-the capacity-below set and removes the previous node from the capacity-below set. In subordinate step 517f, if there exists a marker that marks the previous abstract node, the marker is set to the to-be-processed abstract node and the below flag of the marker is set to true. In an eighth step 520, having two substeps 522 and 524, if the capacity-above set contains at least one abstract node, then, in the first substep 522, while the capacity-above set contains more than one abstract node, the following three subordinate steps 530 or 531 and 532 are performed. In a first subordinate step 531, if the first two abstract nodes of the capacity-above set are not at the same capacity level, then the method 490 performs the following five acts 534, 536, 540, 542, and 544. In the first act 534, the method creates a new set by sorting the capacity-above set according to capacity levels in decreasing order. In the second act 536, the method removes from the new set the first abstract node and labels the new set and the removed abstract node. The abstract node slot of the current node is set to the labeled abstract node. In the third act 540, the method 490 adds the abstract node contained in an only one abstract node slot associated with the labeled abstract node to the sorted capacity-above set, if such an abstract node exists. In the fourth act 541, the submethod 490 removes the new abstract node from the elements contained in the first abstract node which is contained in the new and labeled set. In the fifth act 542, the method removes the labeled abstract node from the elements contained in the abstract node of the abstract node slot of the labeled abstract node, if such an abstract node exists. The method 490 continues with the next to-be-processed link, if there are more such links. In case that the first two abstract nodes of the capacity-above set are at the same capacity level, the second subordinate step 530 is executed, which performs two acts 550 and 552. In the first act 550, the method 490 creates a set containing all abstract nodes once that are contained in abstract node slots of the abstract nodes contained in the capacity-above set. In a second act 552, the method 490 sets the abstract node slot of the new abstract node to an abstract node created by calling the merging submethod 250 using the capacity-above set as an argument value. In addition, updateLink( ) is called for the node created. In the third subordinate step 532, the method then performs the following three acts 556, 560, and 562. In the first act 556, the method 490 adds the new abstract node to the elements contained in the abstract node of the abstract node slot associated with the new abstract node. In the second act 560, the method 490 sets the new abstract node to the value of the abstract node slot associated with the new abstract node. In the third act 562, if the first two abstract nodes of the capacity-above set were not at the same capacity level, the method 490 sets the capacity-above set to the set created in the first act 534 of the first subordinate step 531; otherwise, the method 490 sets the capacity-above set to the set created in the first act 550 of the second subordinate step 530. While the capacity-above set contains more than one abstract node, the method 490 returns to the first substep 522 of the eighth step 520; else, the method 490 goes to the second substep 524 of the eighth step 520. In the second substep 524 of the eighth step 520, the method sets the abstract node slot of the new abstract node to the first and only abstract node 122 contained in the capacity-above set and adds the new abstract node to the elements contained in the first and only abstract-node contained in the capacity-above set. In the third substep 526 of the eighth step 520, the submethod 490 invokes a split submethod 700 (shown in FIGS. 21a and 21b), if there exists a marker that holds an abstract node in the node slot of the marker. The split submethod is called with the abstract node held by the node slot of the marker, if the below slot of the maker is false. Otherwise, the split submethod is called with the abstract node referred to by an abstract node slot of the abstract node held by the node slot of the marker, if the below slot of the marker is true. In the fourth substep 528 of step 520, if the new capacity value is −1, the submethod 490 sets the value of the abstract node slot of all abstract nodes contained in the abstract node denoted by an abstract node slot of the to-be-modified network link to empty and deletes the abstract node denoted by an abstract node slot of the to-be-modified link using the deleteEmptyNode submethod (for which the all elements are removed from the node before invoking the submethod deleteEmptyNode). A formal description of this method 490 is provided in FIG. 14c.

Figure 15A:
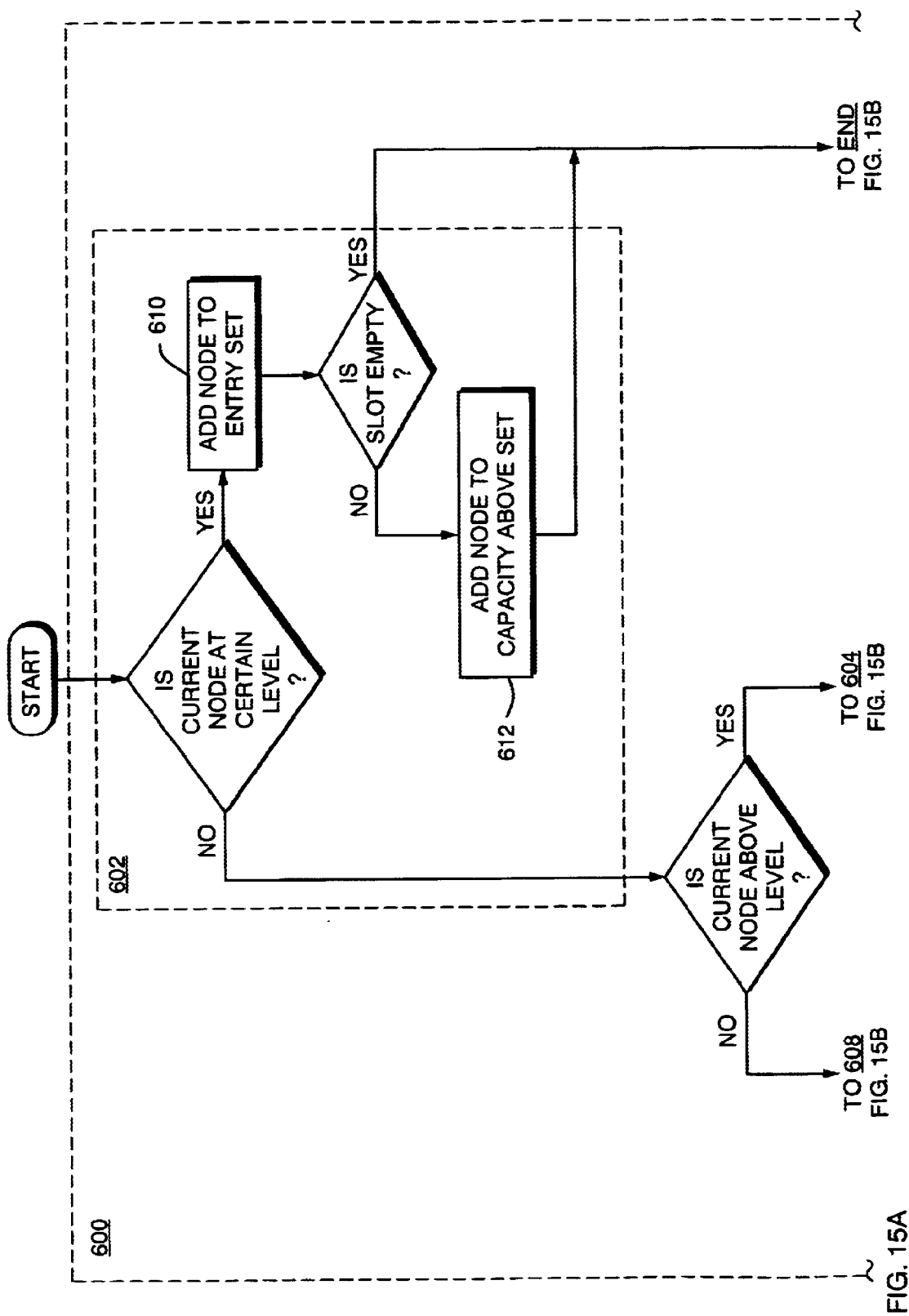
FIG. 15a is a flow diagram of the entryPoint submethod of the invention.
Figure 15B:
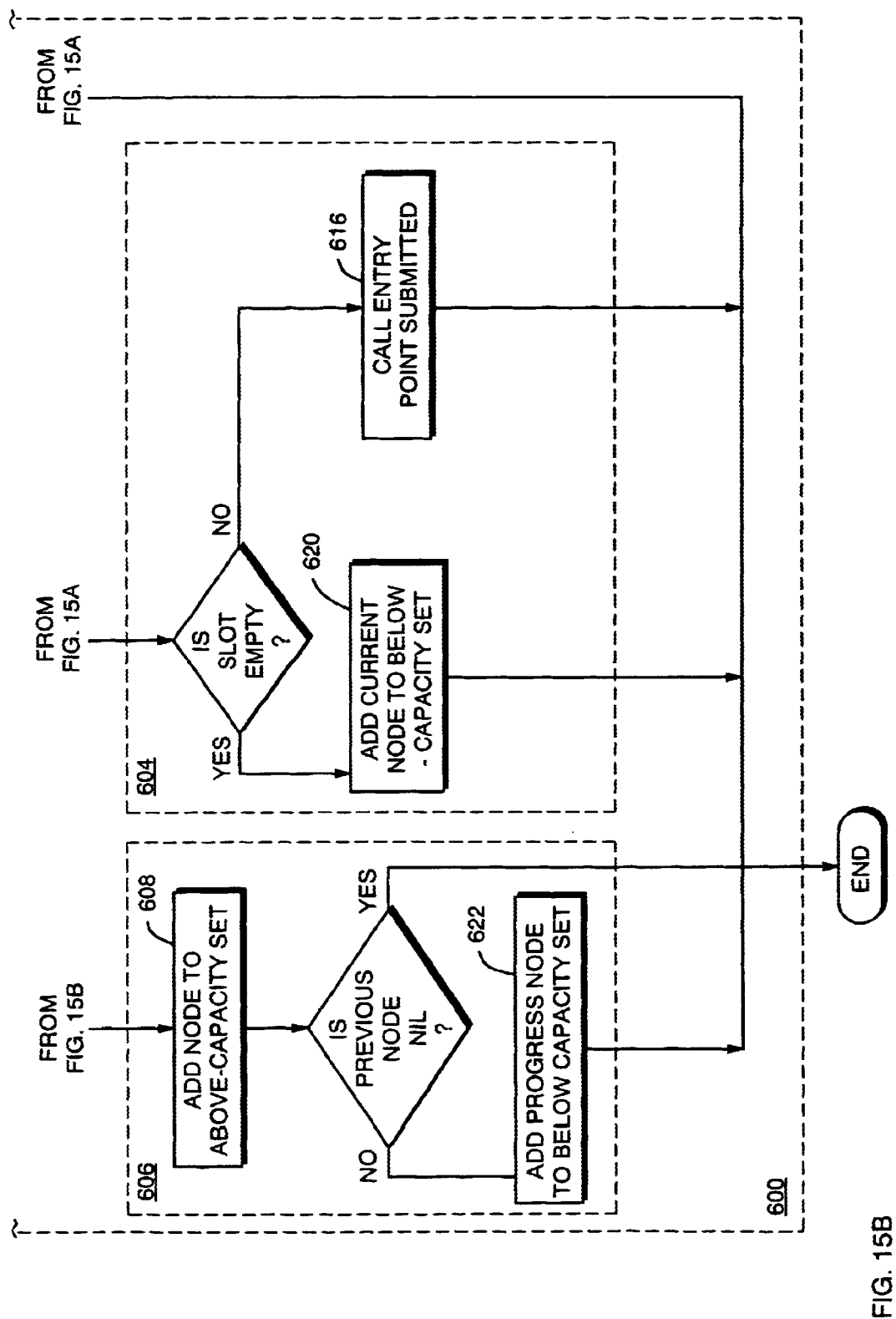

Referring now to FIG. 15a, the recursive submethod entryPoint( ) 600 is described, the formal description of which is given in FIG. 15b. The entry-point submethod 600 of the above method 30 takes the capacity-above set, the entry set, and the capacity-below set and the current abstract node and the previous abstract node and a certain capacity level and returns the capacity-above set, the entry set, and the capacity-below set after perforating three steps 602, 604, and 606. In the first step 602, if the current abstract node is at the certain capacity level, then the submethod 600 performs two substeps 610, and 612. In the first substep 610, the submethod 600 adds the current abstract node to the entry set, if the current abstract node is not already included in the entry set. In the second substep 612, if an abstract node slot associated with the current abstract node is not empty, then the submethod adds the abstract node referred to by the abstract node slot of the current abstract node to the capacity-above set, if the current abstract node is not already included. Else, in the second step 604, if the current abstract node is at a capacity level larger than the certain capacity level, then the submethod performs the following two alternative substeps 616 and 620. In the first substep 616, if abstract node slot of the current abstract node is not empty, then the submethod 600 calls the entry-point submethod 600 with the above-capacity set, the entry set, the below-capacity set, the abstract node in the abstract node slot of the current abstract node, the current abstract node, and the certain capacity level. Else, in the second substep 620, the submethod 600 adds the current abstract node to the below-capacity set, if the current abstract node is not already included. Else, in the substep 608 of the third step 606, the submethod 600 adds the current abstract node to the above-capacity set, if the current abstract node is not already included. In a substep 622 to the third step 606, if the previous abstract node is not nil, then the submethod 600 adds the previous abstract node to the below-capacity set, if the previous abstract node is not already included.

Figure 16A:
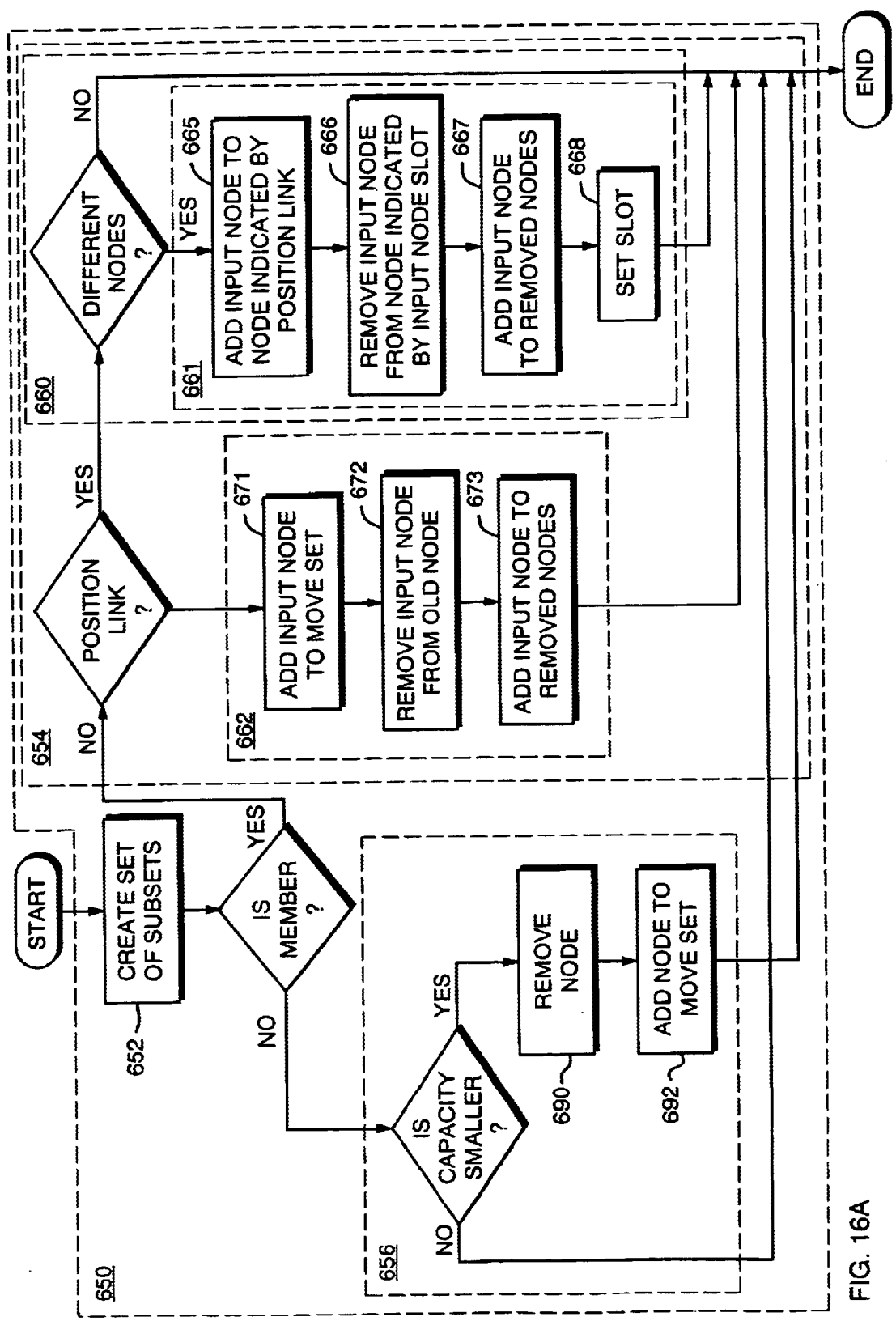
FIG. 16a is a flow diagram of the moveNode submethod of the invention.

The abstract node 122 in which a vertice 84 of the network graph 36 is included is determined by the edge with the largest available capacity connected to the vertices Referring now to FIGS. 16a and 16b, the submethod moveNode( ) 650 evaluates whether the edge is replaced by another one in the: above relationship and, if necessary, updates the BICM 40 accordingly. For this purpose, the edges connected to v are sorted. If l determines v's current position—the containment in an abstract node, either l or another edge e determines v's new position. Note that e is either an edge of the set of edges with equal free capacity as the unmodified l or (if this set contains only l) as in the second set of S. If l does not determine v's current position, it is necessary to determine whether l determines V's new position. In all three cases, v is removed from its current abstract node, which is deleted, if necessary, using deleteEmptyNode( ), described above. In the case that l determines v's new position, v is added to P because the new position does not yet exist.

The moveNode submethod 650 includes three steps 652, 654, and 656. The moveNode submethod 650 takes the data structure 160 of the Blocking Island Contour Map, a to-be-moved nodes set, a removed-nodes set, a network node which is an endpoint of the modified network link, the modified network link, and the new free capacity of the modified network link and returns the data structure of the Blocking Island Contour Map and the to-be-moved-nodes and removed-nodes sets. Note that the removed-nodes set contains network nodes removed from the abstract node denoted by the abstract node slot of a to-be-modified network link. In the first step 652, the submethod creates a set of subsets, each subset containing all links connected to the input network node at the same capacity level where these subsets arm ordered by free capacity in decreasing order, thus defining at least a first and a second subset (the first or both of which may of course be empty). In the second step 654, if the yet-to-be-modified network link is a member of the first subset of the created set, the submethod 650 determines a current position of the input node through interrogation by performing up to two alternative substeps 660 and 662. In the first substep 660 of the second step 654, if the first or the second subset contains a link, called a position link, with a free capacity that is larger than the new capacity value of the yet-to-be-modified link, then the submethod 650 performs subordinate step 661. In step 661, if abstract node slots of the input network node and the position link (determined in step 660) refer to different abstract nodes, then the method executes four subordinate steps 665, 666, 667 and 668. Subordinate step 665 adds the input network node to the abstract node denoted by the abstract node slot of the position link. Subordinate step 666 removes the input node from the abstract node denoted by the abstract node slot of input node. Subordinate step 667 adds the input network node to the removed-nodes set. Subordinate step 668 sets the abstract node slot of the input network node to the abstract node denoted by the abstract node slot of the position link. In the second substep 662 of the second step 654, if it is not true that the first or the second subset contains a link with a free capacity that is larger than the new capacity value of the yet-to-be-modified link, the method performs the three subordinate steps 671, 672, and 675. Subordinate step 671 adds the input network node to the to-be-moved-nodes set. Subordinate step 673 removes the input network node from the abstract node denoted by the abstract node slot of the input node. Subordinate step 675 adds the input network node to the set of removed-nodes set. Else, in the third step 656, if the to-be-modified network link is not a member of the fist subset of the set created in step 652 and the free capacity of the first link in the first subset of the set created in the first step 652 is smaller than the new capacity value, then two substeps 690 and 692 are performed. In the first substep 690, the input node is removed from the abstract node denoted by the abstract node slot of the input node. In the second substep 692, the submethod adds the input-node to the to-be-moved-nodes set.

Figure 12:
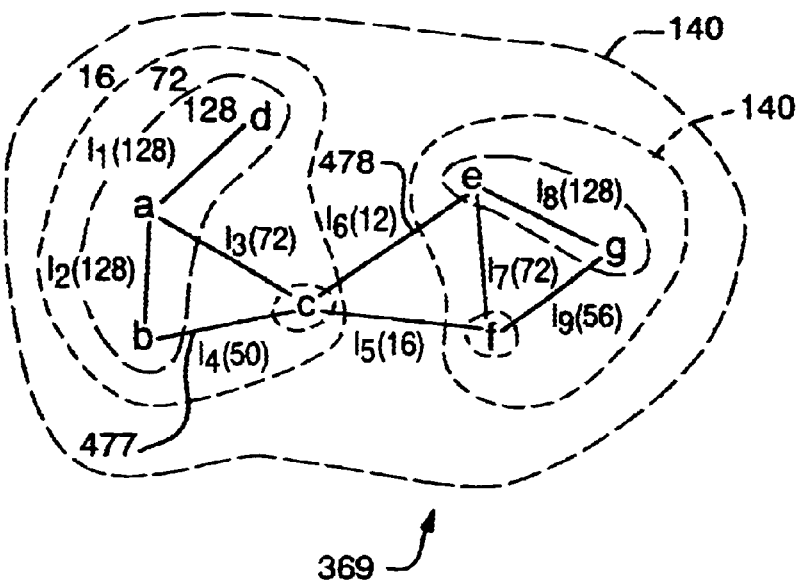
FIG. 12 is a schematic diagram of the Blocking Island Contour Map for the network of FIG. 1 after reducing ($I_4$) to 50.

Referring again to FIGS. 14a and 14b, to illustrate the incremental submethod 490 for computing BICMs 40, the available bandwidth for link 477 ("$l_4$") of the network graph 36 of FIG. 2 is reduced to 50 and the one of link 478 ("$l_6$") is increased to 120. The resulting BICMs 369 and 370 are given in FIG. 12 and FIG. 13, respectively. The reduction of the free bandwidth of $l_4$ results in no redrawing of contour lines. The increase of the available bandwidth of $l_6$ drastically changes the landscape. In particular, the contour line 481 enclosing the whole network is at the bandwidth level 72, instead of 16.

Figure 17:
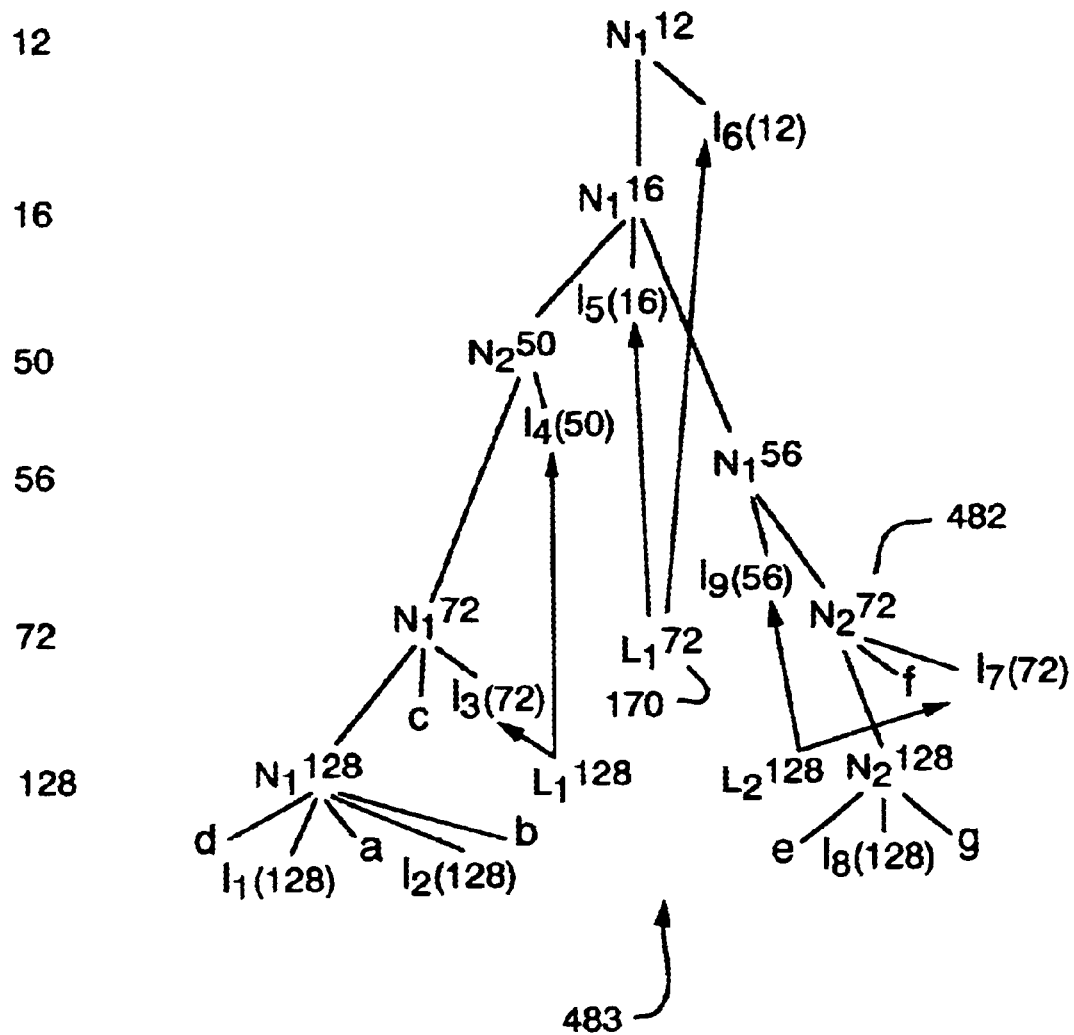
FIG. 17 is a schematic diagram of the data structure of the Blocking Island Contour Map of FIG. 12.
Figure 18:
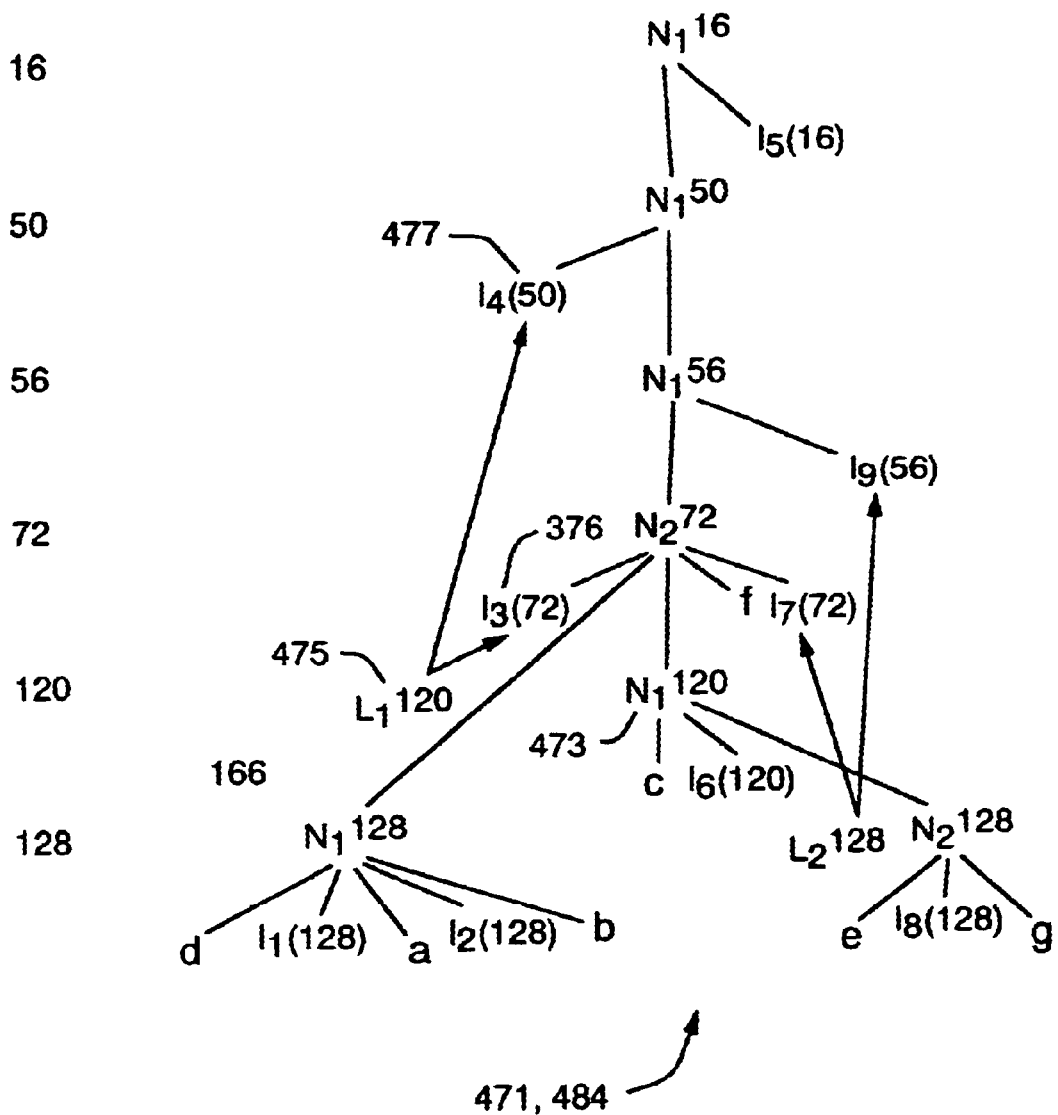
FIG. 18 is a schematic diagram of the data structure of the Blocking Island Contour Map of FIG. 13.

The data structures 483 and 484 of the BICMs 369 and 370 are shown in FIG. 17 and FIG. 18, respectively. In FIG. 17, a new abstract node 485 ("$N_1^{50}$") replaces abstract node 162 ("$N_2^{56}$") of FIG. 7.

In this case, other modifications were not necessary. A comparison of FIG. 18 with FIG. 17 shows considerable restructuring of the data structures 483 and 484. First, a new node $N_1^{120}$ was introduced. This new node contains $N_2^{128}$, $l_6$, and c, because $v_1^{120}(e)=N_2^{128}$, $\beta(l_6)=120$, and $l_6$ is the link of $\beta(c)$ with the largest available bandwidth. $L_1^{128}$ is subsumed by the introduced $L_1^{120}$. In addition, the two nodes $N_1^{72}$ and $N_1^{72}$ of FIG. 17 are merged into a single one that contains $N_1^{128}$, $N_{1120}$, $l_3$, $l_7$, and f.

Figure 19A:
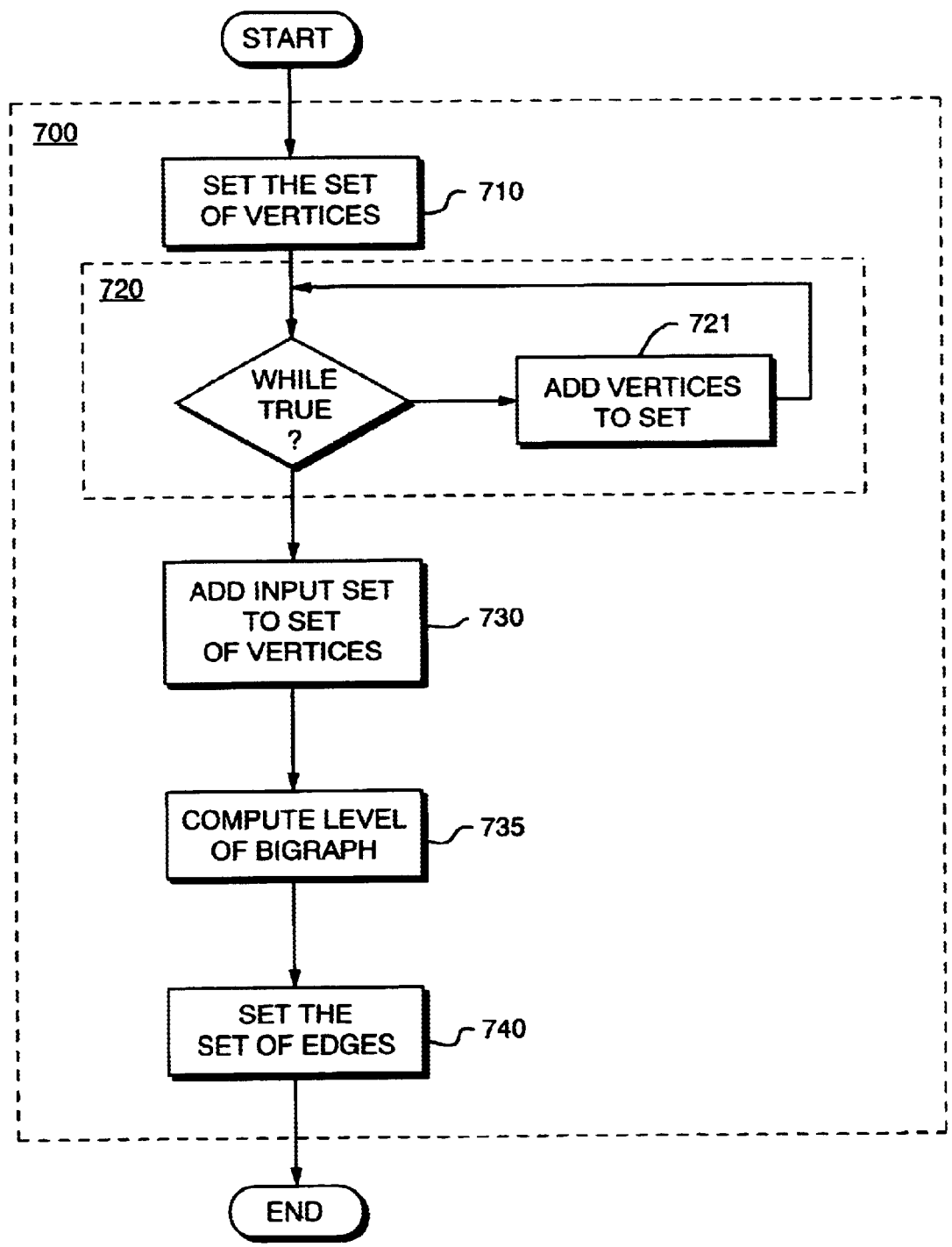
FIG. 19a is a flow diagram of the map submethod of the invention.

Referring now to FIGS. 19a and 19b, a submethod named the map submethod 700 takes as inputs a BICM data structure $\Xi$, an input abstract node N, an input function taking a set of vertices M and a capacity value as inputs and returning false or true, a set of vertices and edges, and a capacity value and returns the set of vertices and edges. The default value of the capacity value, an optional argument, is infinite. The submethod 700 performs four acts 710, 720, 730, 735, and 740. Step 710 sets the set of vertices to the set containing the input abstract node. Step 720 performs step 721 as long as the input function applied to the set of vertices and the capacity value is returning true. Step 721 adds to the set of vertices the vertices that are contained in each abstract node of all abstract nodes in the set of vertices that have a capacity value that is lower than the input capacity value. Step 730 adds the input set to the set of vertices. Step 735 computes the level of the BIG by determining the maximum over the capacities of the vertices of the graph. Step 740 sets the set of edges to all edges of which both endpoints (at the level of the input capacity value) are members of the set of vertices and that are at the level of the input capacity value.

The algorithm DFS( ) of FIG. 20 is a standard depth-first search algorithm (for example, as described in Jan van Leewen, *Handbook of Theoretical Computer Science*, Volume A: Algorithms and Complexity, Chapter: Graph Algorithms; Elsevier, 1990, the content of which is incorporated by reference) to compute a connected component $<V_C, \epsilon_C>$ of a graph $<V_N, \epsilon_N>$, which is adapted for handling blocking island graphs. The adaptation consists of input arguments h and b (and their usage in the method), where h and b denote the capacity level of the traversed graph -a h-BIG—and b minimal free capacity required of links to be traversed, respectively. The connected component computed depends on the vertex v—the starting point for this computation—supplied in the initial call of this recursive algorithm.

If a blocking island contains two subgraphs connected by a single network link at the bandwidth-level of the blocking island, this blocking island is split in two in the event that the free-capacity of this link is reduced. In case of a split, it is necessary to check whether abstract node containing the split abstract node is also split. This task is handled by the algorithm split( ) 800 which is described in FIGS. 21a and 21b. The split submethod takes as inputs a BICM data structure, a to-be-modified network link, a new free capacity value of the to-be-modified network link, an abstract node containing the to-be-modified link, a (from the input abstract node) removed-nodes set and returns the updated BICM data structure. The submethod carries out five steps 801, 802, 803 and 804.

In step 801, the submethod 800 performs step 803, if the input abstract node contains the to-be-modified network link. Otherwise, the submethod performs step 802. Step 803 returns false and terminates the submethod. Step 802 consists of the substeps 810, 820, 830, 840 and 850. The substep 810 consists of the subordinate steps 812 and 814. In substep 810, if the input abstract node contains no elements, the submethod 800 performs the subordinate steps 812 and 814. In subordinate step 812, the submethod deleteEmptyNode( ) is invoked for the input abstract node. In subordinate step 8114, the submethod updateLinks is invoked at 815 for the abstract node referred to by the abstract node slot of the input abstract node, if such an abstract node exists. Substep 820 initializes a set of graph edges and vertices as empty sets, defines as input function for the map submethod 800 and performs a test of whether the first argument is a set with no more than one element. Step 820 invokes the map submethod with the input abstract node, the input removed-nodes set, the input function defined in step 810, and the set of graph edges and vertices as inputs. The invoked method returns the set of vertices contained in the input abstract node and the set of edges that consists of edges that connect only vertices in the returned set of vertices (i.e., the returned graph is the BIG contained in the input node) at the level of the returned BIG. Step 830 initializes sets of edges and vertices of the to-be-computed connected component to the empty set and performs the DFS submethod at 840 (described in FIG. 20) to compute the connected component at the level of the BIG. In step 850, if the set of graph edges and the set of component edges are equal, the submethod performs step 803. Otherwise, the submethod 800 performs substep 860. The substep 860 consists of the subordinate steps 861, 862, 863, 864, 865, 866, 867, 868, 869, and 870. Subordinate step 861 computes the set of vertices of the graph the set of vertices of the first component. Subordinate step 862 computes a set of links of the graph that have one endpoint in the first component and the other endpoint in the second component. Subordinate step 863 computes the set of edges of the second component by subtracting from the set of edges of the graph the set of edges of the first component and the set of edges computed in subordinate step 862. In subordinate step 864, the network links contained in the input abstract node are partitioned into the set of edges associated with the first and second component. Subordinate step 865 computes a first and second abstract node for the first and second component, respectively. Subordinate step 866 crates an abstract link connecting the first and second abstract node, if the set of links computed in step 862 contains more than one link. Subordinate step 867 sets the abstract node slot of the first and second abstract node to the abstract node of an abstract node slot of the input abstract node. In addition, the submethod 800 adds the first and second abstract node to the abstract node of an abstract node slot of the input abstract node. Subordinate step 868 invokes the submethod updateLinks for the first and second abstract node. Subordinate step 869 invokes the submethod deleteEmptyNode for the abstract node of the abstract node slot of the input abstract node. In addition, the submethod invokes the submethod 800 for the abstract node of an abstract node slot of the input abstract node, if such a node exists that has a lower capacity value than the new capacity value. Subordinate step 870 returns true and terminates the submethod.

The most important submethods can be generalized to edges connecting n nodes, where $n \geq 2$. In all submethods, the steps carried out for aPoint( ) and zPoint( ) have to be carried out for all n endpoints of the generalized edges. In addition, it is necessary to modify merge( ) 250 so that it merges more than two abstract nodes into a single abstract node. Last but not least, split( ) 800 has to be modified in the spirit of merge( ) 250.

The submethods described above are applicable to network graphs 36 that contain vertices 84 that are connected with multiple edges 86. Multiple edges 86 are abstracted into abstract links 130.

The submethod existence-p( ), the formal description of which is provided in FIG. 22, determines whether a route 96 exists for a BICM 40 between the vertices $a_{v,f}$ and $z_{v,l}$ for the bandwidth b. For this purpose, it is necessary to determine whether the bandwidth level of the blocking island 34 in which both vertices 84 are contained is equal or larger than b. Only in this case does there exist a route 96. For Quality of Service ("QoS") routing, this submethod would serve as a first filter which is illustrated by the below explained route method (the method takes into account the bandwidth as well as another link cost factor). The submethod returns the abstract node representing the blocking islands 34 which the two endpoints a and z are contained, if there exists such an abstract node. Otherwise, the method returns nil.

Another submethod named route( ), the formal description of which is provided in FIG. 23, demonstrates that it is possible to carry out path computations with BICMs 40. The route submethod is a routing algorithm which uses a BICM. The inputs required for route( ) are a BICM data structure 160 and a demand that is specified by a starting-point a, an end-point z, and a requested bandwidth b. The submethod allocates and returns a path satisfying the demand, if one exists. These optional arguments allow users to specify particular allocation strategies, which are explained below.

Figure 24A:
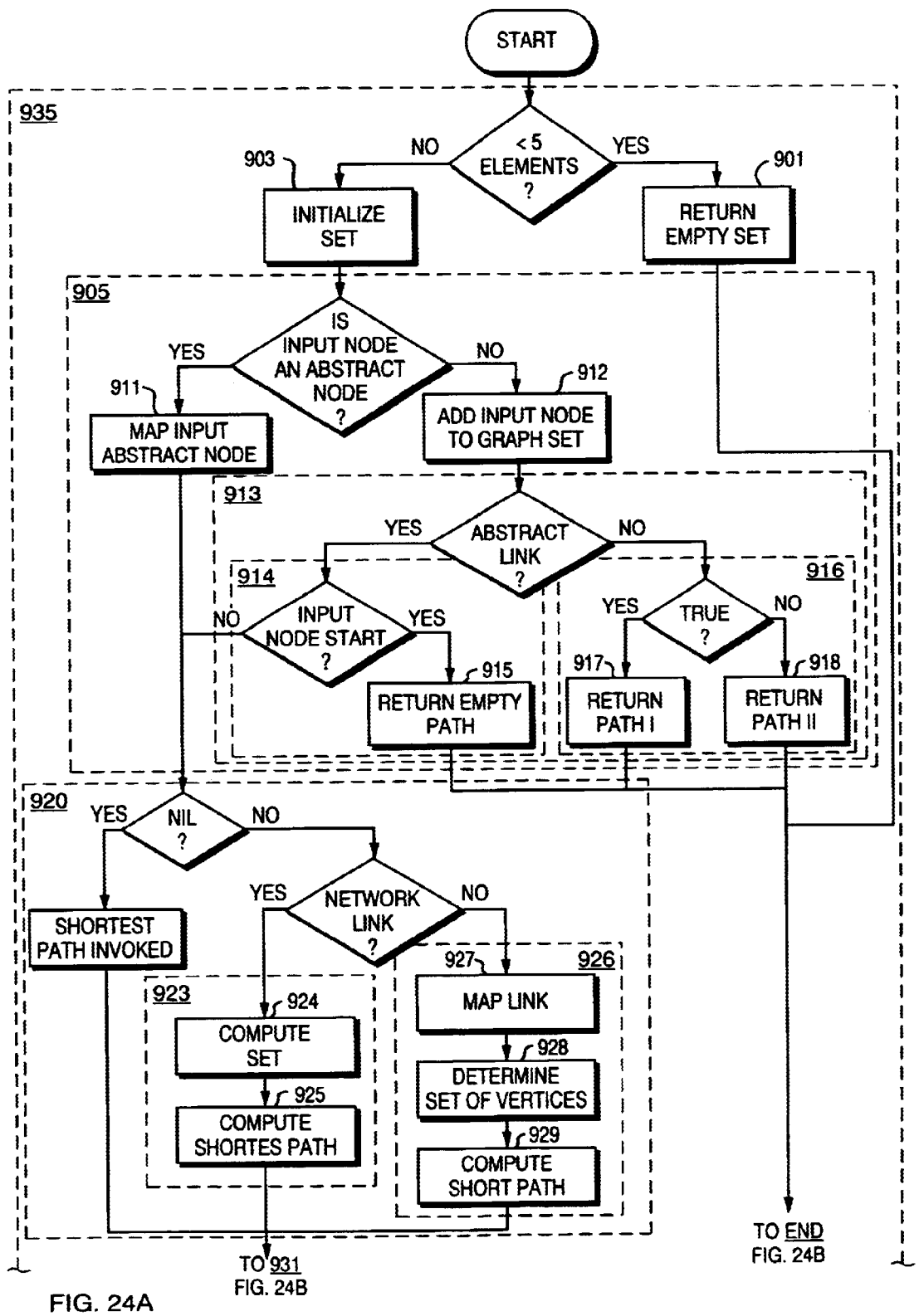
FIG. 24a is a flow diagram of the HDFSpath submethod of the invention.
Figure 24B:
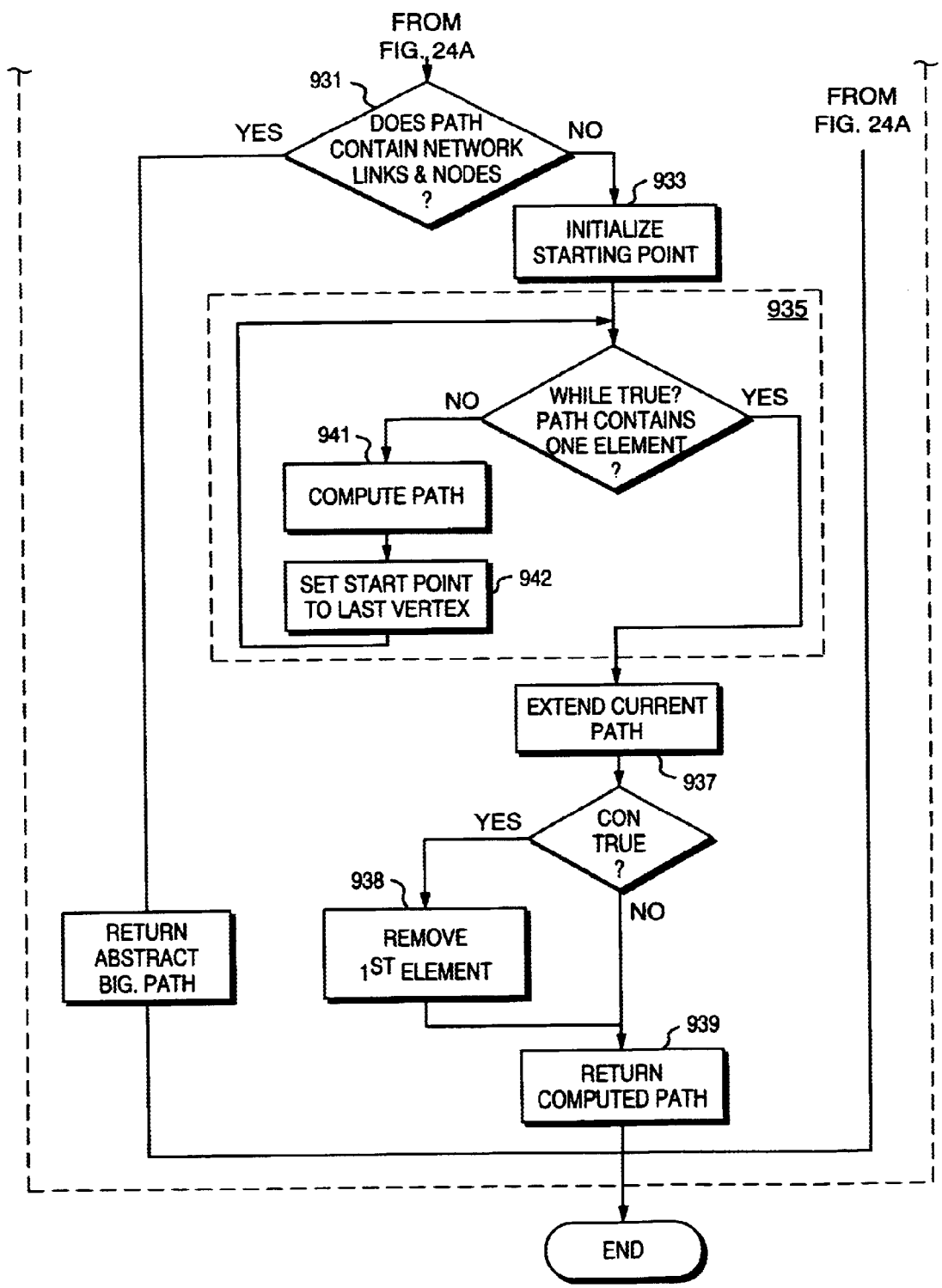

This route( ) submethod first determines the blocking island containing the two end points of the demand using the existence-p( ) submethod (described in FIG. 22). If no such island exists, the submethod terminates and returns the empty path. Otherwise, it invokes submethod HDFSpath( ) 900, shown in FIGS. 24a and 24b, to compute an optimal path within the above blocking island. Next, it allocates the bandwidth and updates the BICM data structure by invoking the modifyFrecCapacity submethod 500 for each network link of the computed path. The algorithm returns the computed path (and the modified BICM data structure) and terminates. Note that the computed path consists of a sequence of network nodes and links.

The submethod HDFSpath( ) 900 is a novel Hierarchical Depth First Search path computing method which computes an optimal path by mapping an abstract node to an appropriate BIG, calculating an optimal path within this BIG, and determining recursively paths through all blocking islands on the path computed in the previous step. The required inputs of the HDFSpath( ) submethod 900 arc a BICM data structure, an abstract node, and abstract link, a demand specified by an starting point a, and end-point z, the required bandwidth b, and a. It is important to understand that either L or z is supplied, but not both. For the one that is not supplied, nil is passed as an argument value. Optional arguments are k, lr and con, defined below. The optional argument k allows a user to control the number of mappings of abstract nodes to BIGs. The default value results in a single mapping, such that the BIG is the subnetwork of the network graph that encompasses all nodes and edges of the blocking island denoted by the mapped abstract node. Consequently, this optional parameter controls the trade-off between the computational time complexity of mapping and the size of the path computation search space. The argument lr is described below. The optional argument con is a Boolean flag that has the default value false. This Boolean flag is used for flow control purposes in recursive calls of the submethod Referring again to FIG. 24a, the HDFSpath submethod 900 carries out ten steps 901, 903, 905, 920, 931, 933, 935, 937, 938, and 939. Step 901 returns the empty step and terminates the submethod 900, if the starting point and the end point are identical. Step 903 initializes a set of edges and vertices defining a graph by setting these sets equal to the empty set. A test function is defined that evaluates whether the function's first argument, a set, contains less than k elements and is equal to the empty set after subtracting the set of network graph vertices. The level of the to-be-computed BIG is set to infinity. Step 905 carries out either the substeps 911 or the substeps 912 and 913 to map the input abstract node to a BIG, if appropriate. Substep 911 maps the input abstract node using the map submethod and the function defined in step 903, if the input abstract node is actually an abstract node. Otherwise, substep 912 and 913 are carried out. Substep 912 adds the input-abstract node, actually a network graph node, to the set of nodes of the graph initialized in step 903. Substep 913 carries out the subordinate step 914, if the input abstract link is actually an abstract link. If the input abstract link is actually a network link, substep 913 invokes the subordinate step 916. Subordinate step 914 invokes the subordinate step 915 if the input abstract node and the starting point are identical. Subordinate step 915 terminates the submethod 900 and returns the empty path. Subordinate step 916 invokes subordinate step 917, if the input Boolean flag is true. Otherwise, the subordinate step 916 invokes subordinate step 918. Subordinate step 917 terminates the submethod 900 and returns the path consisting of the abstract input link, and the abstract node that is an endpoint of the abstract input link but is not identical to the abstract input node (PATH I). Subordinate step 918 terminates the submethod 900 and returns the path (PATH II) consisting of the abstract input node, the abstract node link, and the abstract node that is an endpoint of the abstract input link but is not identical to the abstract input node. Step 920 computes the shortest BIG-path between a pair of vertices that correspond to the input endpoints in the BIG by invoking submethod shortestPath, if the value of input abstract link is nil. Otherwise, either subordinate step 923 or 926 are performed. If the input abstract link is actually a network links subordinate step 923 is performed. If the input abstract link is an abstract link, subordinate step 926 is performed. Subordinate step 923 performs the subordinate steps 924 and 925. Subordinate step 924 computes a set consisting of all endpoints of the abstract input link (actually a network link) that are not members of the set of vertices-of the graph (i.e., a BIG). Subordinate step 925 computes the shortest path for the BIG and extends it by adding the abstract input link (actually a network link) and the node contained in the set computed in subordinate substep 924. Subordinate step 926 computes the set of mapped-links by mapping the input abstract ink to the level of the BIG by performing the subordinate substeps 927, 928, and 929. In substep 926, the abstract link is mapped using a submethod mapLink, the formal description of which is provided in FIG. 25. Subordinate step 928 determines a set of all vertices at the level of the BIG that are endpoints of the links in the set of mapped links. Subordinate step 929 computes the shortest BIG-path between a vertex of the BIG containing the starting point and the vertex of the set computed in step 928 that is not a vertex of the BIG and that leads to the shortest path.

In step 931, the method terminates and returns the abstract BIG-path, if the abstract BIG-path contains only network links and nodes. Note that this is the case in the first invocation of the HDFSpath submethod with the default value for the optional argument k. Otherwise, the method continues with step 933. Step 933 initializes the current starting point by setting it to the input starting point. In addition, step 933 sets a Boolean variable to false. Step 935, performs the subordinate steps 941 and 943 until the shortest BIG-path contains one element, a node. In subordinate step 941, the current partial network-level path is extended by computing the network-level path through the next abstract node and its subsequent link (both at the level of the BIG) using the HDFSpath submethod to which the Boolean variable is passed. In subordinate step 942, the current starting point is set to the last vertex of the current partial network-level path using the last( ) operation (a mathematical operation which returns the last element of an ordered set—similar to first( ) which returns the first element). The Boolean variable is set to true. In step 937, the current partial network-level path is extended by computing the network-level path through the last vertex at the level of the BIG using the HDFSpath submethod 900. Step 938 removes the first element from the partial network-level path, using the mathematical operation pop( ), if the input flag con is true. Step 929 returns the computed network-level path.

The mapLink( )submethod inputs a BICM data structure $\Xi$ 160, a to-be-mapped abstract link l and a level h to which the link should be mapped. It simply maps abstract links L as long as their endpoints are at a higher level than the required one, i.e., the capacity values of their two endpoints are smaller than the required one. Note that $\epsilon$ denotes the set of edges of the network graph associated with $\Xi$.

Referring to FIG. 28, the shortestPath( ) submethod computes the shortest path based on the well known Dijkstra algorithm. For an explanation of the basic algorithm, see Jan van Leewen, *Handbook of Theoretical Computer Science*, Supra. The Dijkstra algorithm is basically extended by adding additional node and link cost terms based on the BICM.

The shortestPath submethod inputs as required arguments a BICM data structure $\Xi$, a graph $<V_N,\epsilon_N>$, and a demand specified by a starting point a, and a set of acceptable endpoints Z; and a bandwidth requirement b, as well as a level h. It is assumed that a is an element of $V_N$ and Z is subset of $V_N$. The level h is only necessary to ensure that endpoints of edges belong to the currently processed h-BIG. The optional argument lr, taking the values 0 or 1, is used specify whether a least-restrictive allocation strategy is employed or not. This strategy and the split-p submethod (shown in FIGS. 26a and 26b) is explained below. The shortestPath submethod returns P, the sequence of vertices and edges that define the shortest path computed. Note that the submethod tests whether the free capacity of an edge is larger than the bandwidth requirement, because a blocking island can contain such links.

Before explaining the added cost terms $\Delta$ and $\xi(n, e)$ and their meaning, the cost terms of the basic algorithm are described. The function $\mu(v)$ is used by the Dijkstra algorithm and denotes the costs to reach a node v on the shortest path defined by $\tau(v)$, $\tau(\text{first}(\tau(v)))$, and so on. The cost of a link e is $\omega(e)$, on which the notion of a shortest path is based. Note that there my be different QoS parameter (e.g., distance, delay, and so on) than bandwidth.

$\Delta$ is the cost term of the least-restrictive allocation strategy which is 0 if this strategy is disabled. As $\Delta$ is also associated with a link, it is necessary to compute the length of the vector (i.e., square root of $[\omega(e)^2+\Delta^2]$ resulting from the two orthogonal dimensions of link costs, namely, $\omega( )$ and $\Delta$). To control the relative importance of these two terms (and $\xi(n, e)$), they are normalized (and weighted), which is not shown in FIG. 28.

Now the problem of load-balancing allocation will be discussed. $\xi(n, e)$ denotes the costs for traversing a node n from $\tau(n)$ to e. If $\xi( )$ is defined to be inversely proportional to the available bandwidth in a blocking island n at the processed h-BIG (i.e., $\xi(n, e)=1/\beta(n)$), the submethod balances the allocations according to the load in the h-BIG. This definition of $\xi( )$ and hence a load-balancing allocation strategy is made possible, because a BICM represents abstract nodes N at higher levels h (i.e., $h<\beta(N)$) implicitly.

Alternatively, $\epsilon( )$ can be defined depending on the critically of the resources consumed to traverse a node. In this case, using different pairs of associated edges might result in different costs. Hence, this approach can be viewed as a refinement of the previous one. Computing these costs requires the inspection of the BIG contained in the to-be-traversed node. For a more detailed discussion, see below.

The routing submethod shown in FIG. 23 determines the path a circuit takes within a network graph 36. It is possible to optimize the routing for a given set of demands and a network path. In practice, the set of demands and the network graph 36 vary over time. In addition, future demands are very often unpredictable. Furthermore, optimizing a real-world network having hundreds or thousands of nodes is frequently impractical, because of the costs and time to reconfigure the network. In this situation, the best solution is to apply a least-restrictive allocation strategy, i.e., of the possible allocations, the one is selected that imposes minimal restrictions on future allocations. For this purpose, it is necessary to know the demand patterns (and their evolution) at a coarse granularity. This is often available, because commercial centers, large cities, and other users demand more telecommunication services than rural areas. More importantly, shifting such entities is a major undertaking so that the distribution of demand (not the quantity) is quite stable over time.

Figure 27A:
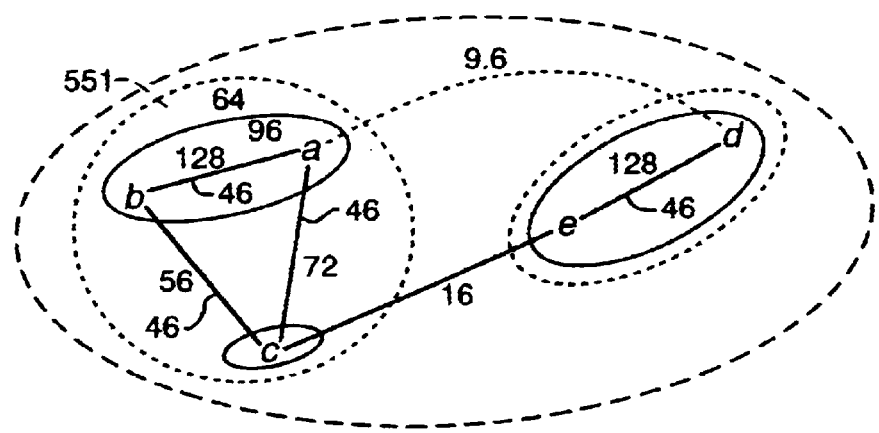
FIGS. 27a–27c are schematic diagrams illustrating an application of a least-restrictive allocation strategy for reasoning regarding circuit selection.
Figure 27B:
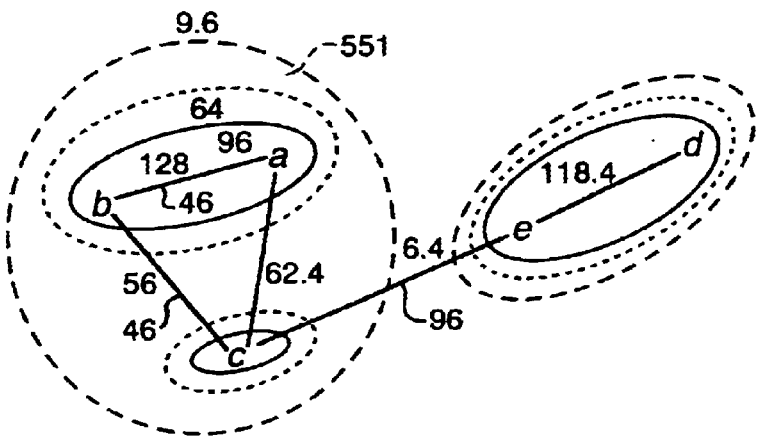
Figure 27C:
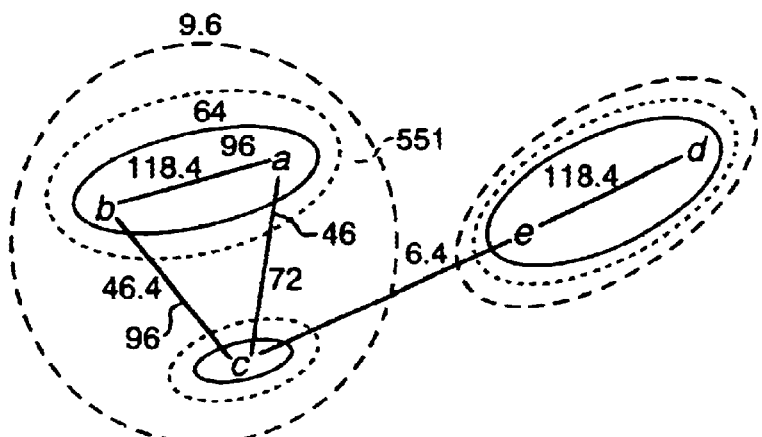

Now referring to FIGS. 27a–27c, a description of how this strategy can be utilized with a is BICM 40 is given. It is a discrete BICM 40 with the levels 9.6, 64, and 96. A course demand pattern is specified as a BI that should not be split, if possible. To be precise, such a pattern corresponds to a set of BIs that encompass a particular set of vertices, because the available bandwidth between this set of vertices might change over time. For instance, the BIs of FIG. 27a which are at the bandwidth level 64 and which encompass set of nodes {a, b, c} and {d, e} should not be split. FIG. 27a also shows a demand of 9.6 which must be allocated between the nodes a and d. FIG. 27b and FIG. 27c depict two possible allocations. The one shown on the left side splits the 64-BI 551 including the nodes {a, b, c}, whereas the one shown on the right side doesn't split a 64-BL Consequently, the solution shown in FIG. 77c is preferred under the assumption that this solution meets other. QoS specifications.

This strategy is employed by the shortestPath method, if optional argument lr is set to 1. This submethod is described in FIGS. 26a and 26b. The calculation of the required splitting costs is carried out by the split-p submethod.

Figure 26A:
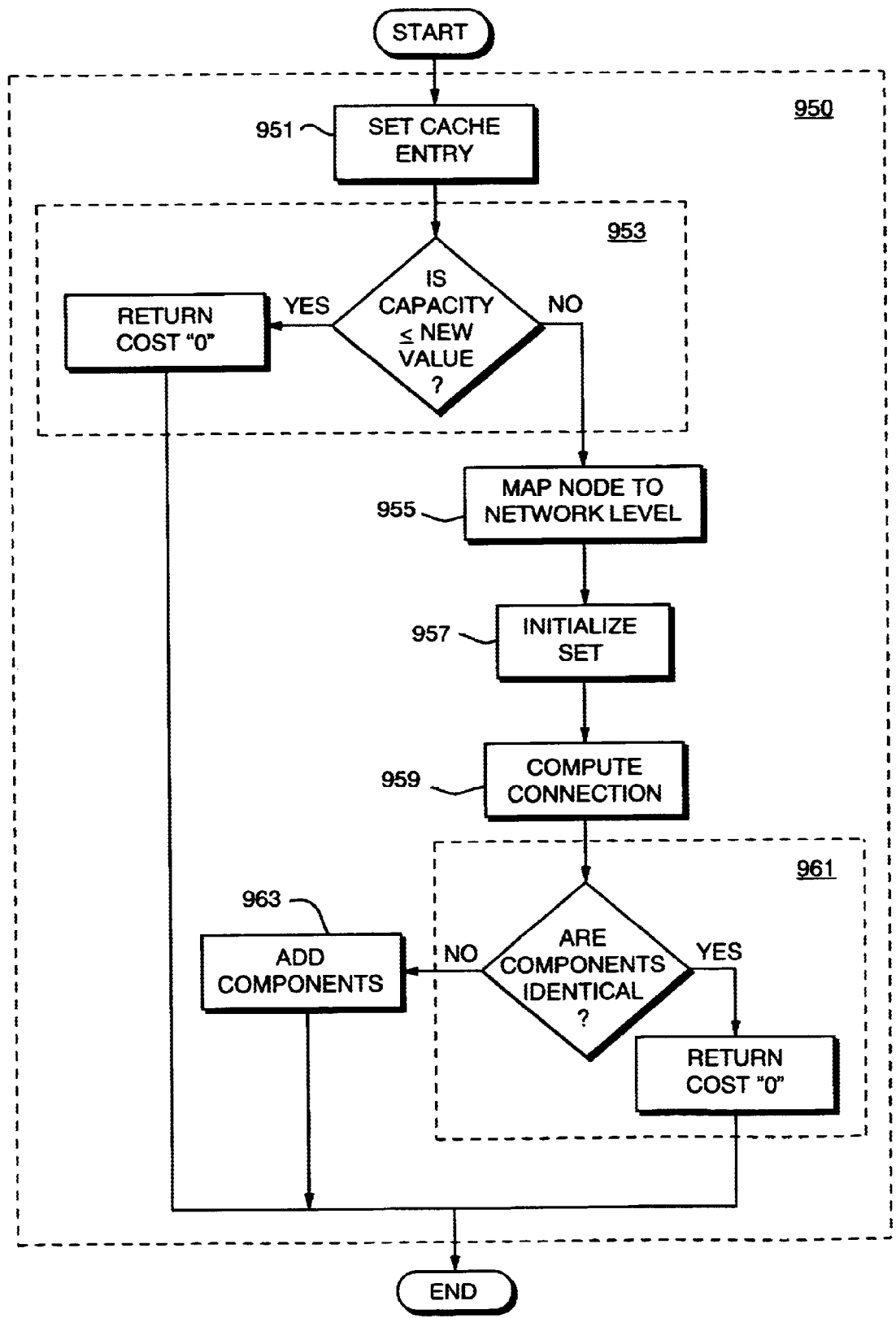
FIG. 26a is a flow diagram of the split-p submethod of the invention.

Referring now to FIGS. 26a and 26b, the split-p( ) submethod 950 computes the overall splitting-cost given a BICM data structure, a to-be-modified network-link, and its new capacity value, and a currently-processed abstract node N. The method performs seven steps 953, 959, 955 957, 959, 961 and 963. In step 951, the split-cache for the to-be-modified network-link and the currently-processed abstract node is initialized by setting its entry to the empty set. In addition, the set of nodes and edges of a network-level graph are initialized with the empty set. A test function for the map submethod is defined that returns true if the function's first input argument contains abstract nodes. Otherwise, it returns false. In step 953, the submethod 950 terminates and returns the cost 0, if the currently processed abstract node is nil or the capacity of the currently-processed abstract node is smaller or equal to the new capacity value. Step 955 maps the currently-processed abstract node to the network-level, which results in a graph defined with the set of vertices and edges initialized in step 951. Instead, at the network graph level, a BIG containing the currently processed abstract node at another level would be appropriate. Step 957 initializes the set of vertices and edges of a connected component by setting them to the empty set. Step 959 computes the connected component for some point of the network-level graph, from which the to-be-modified network link is removed for this computation. In step 961, the submethod 950 terminates and returns the cost 0, if the connected component and the network-level graph are identical, i.e., their set of vertices are the same. In step 963, the submethod adds the two connected components to the split cache and terminates by returning sum of the cost of splitting the currently-processed abstract node and the cost returned by applying the split-p submethod 950 on the abstract node denoted by the abstract node slot of the currently-processed abstract node, multiplied by a weight ∂, delta (to take into account that "higher order" splits are less important).

The cache of the split-p submethod 950 results in the optimization of the split submethod 800: instead of determining whether an abstract node is split, the submethod looks up the evaluation result of the split-p submethod 950 in the split-cache. In the event of splitting, the two connected components found in the split cache are mapped into the BIG directly included in the abstract node. Then, the steps of the split submethod 800 split the abstract node into two new abstract nodes, and so on can be used.

Costing is an important application of the method 30 of the invention. Costing refers to the determination of the costs of satisfying a demand. This might be used for actually charging and pricing network 32 usage or determining routes 96. BICMs 40 make pricing strategies possible that need not only take the edge load into consideration, but also the criticality of edges 86.

Costing subnetworks is also facilitated by the method 30 of the invention. An edge 86 is critical if the edge connects two different blocking islands 34 (that are located in an area in which a demand exists). A blocking island 34 is beneficial because all possible routes 96 are taken into consideration. Therefore, edges 86 within a blocking island 34 which are heavily loaded are uncritical. Thus, no premium need be charged for using such edges 86.

The use of a BICM 40 (e.g., FIG. 5) to solve routing and costing problems is described as follows. The capacity of a path between two nodes 90 is determined by the link 46 having the minimum capacity in this path. The maximum capacity available for a route 96 between two access points $v_i$ and $v_j$ is determined by the blocking island 34 at the highest bandwidth level that contains both vertices 84. The lower this level, the higher the criticality and, hence, the cost $c_{vi}, v_j$. These costs are calculated according to Equation 10, below:

$$c_{vi,vj} = \frac{\max\{b \mid N_b^k\} - \max\{b \mid v_j \in N_b^k \wedge v_j \in N_b^k\}}{\max\{b \mid N_k^b\}} \quad (10)$$

These costs are relative to the maximum available bandwidth in the network 32. The normalization removes the absolute value of this maximum.

Computing the costs with Equation 10 is a very simple matter because the second term on the right-hand side is β(existence-p) In addition, keeping track of the maximum available bandwidth in the network 32 poses no problem as methods of doing this are well known in the prior art.

It should also be noted that it is possible to build more complex cost models based on Equation 10. An interesting application, for example, is the abstraction of a subnetwork G (with the subnetwork access points $V_A$) for hierarchical routing. In particular, the shortestPath method, as explained above, might employ Equation 10 to determine the costs of traversing a blocking island.

BICMs 40 generalize the blocking island hierarchy introduced in the prior art. The sample applications clearly show the benefits of BICMs 40. First, the approach reduces the search space and, hence, also the computational complexity of reasoning involving routes 96. Furthermore, collaborative problem solving between humans and computers is feasible in more situations, which improves the quality of decisions. In addition, BICMs 40 facilitate the dynamic computation of routing tables and other related network management tasks in order to take into account available bandwidth capacity, among other factors. In particular, the BICM 40 tells, at each moment, whether there exists a path for a packet in transit.

Further, the method 30 provides a concise graphical display of the possible routes or paths for different amounts of bandwidth—or some other restrictive cost measure—between the vertices 84 of a network 32, as shown in FIG. 29. In this figure, a discrete BICM 40 at bandwidth levels 9.6, 64, and % is shown. This BICM 40 is based on the absolute available bandwidth of each edge, so that a blocking island 34 at a low bandwidth level indicates either a link 46 with a small capacity or a heavily loaded link with large capacity. Distinguishing these cases is achieved by encoding the capacity into the link shape.

The method 30 also determines when there is less bandwidth available between blocking islands 34. A β-blocking island 34 is split into two new blocking islands 34 when there is less than β bandwidth available between newly created blocking islands. One may monitor such splits or the rate of splitting blocking islands including a particular set of nodes (e.g., the Bis including a, b, and c in FIG. 29). If a certain threshold such as a certain number of splits per time interval is reached, the human operator would be notified. She would then initiate the extension planning process to upgrade the network 32 before it runs out of capacity.

In another embodiment of the method 30, a computer system is encoded with the method. It is a matter of routine skill to select an appropriate conventional computer system and implement the claimed process on that computer system.

An object of the method 30 of the invention is to facilitate reasoning about the selections of a route 96 in circuit- or packet-switched communication networks 32 represented by blocking island ("BI") abstraction 34.

Another object of the method 30 is to provide a means of selecting routes 96 which minimizes time and increases efficiency through the use of an abstract, aggregated network-representation that suppresses irrelevant information and highlights the important information, thus reducing thinking time and search spaces of methods.

Another object of the method 30 is to make collaborative problem solving (involving humans and computers) feasible in more situations, which can be used to improve the quality of decisions.

Another object of the method 30 is to provide a concise graphical display of the possible routes or paths for different amounts of bandwidth—or some other restrictive cost measure—between the vertices 84 of a network 32.

Another object of the method 30 is to determine when there is less bandwidth available between blocking islands 34.

Multiple variations and modifications are possible in the embodiments of the method 30 and submethods thereof, described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

INDUSTRIAL APPLICABILITY

Resource management (including routing and connection admission control) in general play an important role in network planning and control as well as fault and performance management.

BICMs 40 provide an abstract, aggregated network-representation that suppresses irrelevant information and highlights the important information, thus addressing traditional problems associated with the large amount of network data and their interdependencies which make understanding a particular situation a difficult and time consuming task (for both humans and computers). Application of the method of the invention to network management reduces thinking time and search spaces which any route determining method must scan. In addition, the invention makes collaborative problem solving (involving humans and computers) feasible in more situations, which can be used to improve the quality of decisions.

Having thus described the invention, what is claimed is:

1. A computerized method encoded in a computer readable medium, for taking a data structure of a Blocking Island Contour Map of a network graph of a network-level, a to-be-modified network-link, and a corresponding new capacity value, and a currently-processed abstract node and computing overall splitting-cost, the method comprising the steps of:

(a) terminating and returning cost of zero, if there exists no currently processed abstract node or the capacity of the currently-processed abstract node is smaller or equal to the new capacity value;

(b) initializing the split-cache for the to-be-modified network-link and the currently-processed abstract node by setting the split-cache entry to an empty set and further initializing a set of nodes and edges of a network-level graph with the empty set;

(c) mapping the currently-processed abstract node to a desired network level, which results in a graph defined with the set of nodes and edges initialized in step (b);

(d) computing a connected component for some point of the network-level graph, from which the to-be-modified network link is removed for this computation;

(e) terminating and returning a cost of zero, if the connected component and the network-level graph have the same set of vertices; and (f) terminating by returning the weighted sun of the cost of splitting the currently-processed abstract node and the cost returned by applying the method to the abstract node denoted by the abstract node slot of the currently-processed abstract node.

2. The method of claim 1, further comprising caching the connected components for later use.

* * * * *